US010187127B2

(12) United States Patent
Chamarti

(10) Patent No.: US 10,187,127 B2
(45) Date of Patent: Jan. 22, 2019

(54) AUTOMATED ANALYSIS OF MULTIPLE-INPUT, MULTIPLE-OUTPUT (MIMO) COMMUNICATIONS STREAM DISTRIBUTION TO REMOTE UNITS IN A DISTRIBUTED COMMUNICATION SYSTEM (DCS) TO SUPPORT CONFIGURATION OF INTERLEAVED MIMO COMMUNICATIONS SERVICES

(71) Applicant: Corning Research and Development Corporation, Corning, NY (US)

(72) Inventor: Aravind Chamarti, Ashburn, VA (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/689,654

(22) Filed: Aug. 29, 2017

(65) Prior Publication Data

US 2018/0351608 A1 Dec. 6, 2018

Related U.S. Application Data

(60) Provisional application No. 62/513,051, filed on May 31, 2017, provisional application No. 62/513,045, filed on May 31, 2017.

(51) Int. Cl.
*H04B 7/06* (2006.01)
*H04B 7/0413* (2017.01)
(Continued)

(52) U.S. Cl.
CPC ......... *H04B 7/0413* (2013.01); *H04B 7/0426* (2013.01); *H04B 17/336* (2015.01); *H04L 41/0806* (2013.01)

(58) Field of Classification Search
CPC .. H04B 7/0413; H04B 7/0426; H04B 7/0452; H04B 7/0495; H04B 7/06; H04B 7/0689;
(Continued)

(56) References Cited

U.S. PATENT DOCUMENTS 8,744,504 B2 * 6/2014 Faccin ................. H04B 7/0413
375/299
9,413,439 B2 8/2016 Faccin et al.
(Continued)

OTHER PUBLICATIONS http://www.commscope.com, Commscope White Paper WP-109965EN, "Interleaved MIMO: Near-full MIMO performance, nearly half the cost", 6 pages, downloaded Jul. 15, 2016.
(Continued)

*Primary Examiner* — Siu M Lee
(74) *Attorney, Agent, or Firm* — C. Keith Montgomery

(57) ABSTRACT

Distributed communications systems (DCSs) supporting automated analysis of MIMO communications stream distribution to remote units in a distributed communication system (DCS) to support configuration of interleaved MIMO communications services are disclosed. In this regard, MIMO analysis circuits can be employed to determine the actual routing of MIMO communications signals and locations of the remote units to automatedly determine any MIMO cell bonding between the remote units to determine the configured interleaved MIMO configuration in effect in the DCS. The determined interleaved MIMO configuration of the DCS infrastructure is used to determine other possible interleaved MIMO configurations and their associated performance, along with the associated configurations and changes needed to realize such possible interleaved MIMO configurations. These possible interleaved MIMO communications service configurations can then be presented to a technician or customer to determine if any of the possible
(Continued)

interleaved MIMO communication service configurations should be deployed in the DCS.

23 Claims, 27 Drawing Sheets

(51) Int. Cl.
*H04B 7/0426* (2017.01)
*H04B 17/336* (2015.01)
*H04L 12/24* (2006.01)

(58) Field of Classification Search
CPC .. H04B 7/0697; H04B 17/336; H04L 41/0806
See application file for complete search history.

(56) References Cited

U.S. PATENT DOCUMENTS

| | | | |
|---|---|---|---|
| 9,531,452 B2 | 12/2016 | George et al. | |
| 9,794,791 B2* | 10/2017 | Hasarchi | H04W 16/04 |
| 9,794,795 B1 | 10/2017 | Kruh et al. | |
| 2013/0050054 A1* | 2/2013 | Chan | H01Q 1/007 |
| | | | 343/893 |
| 2013/0188753 A1* | 7/2013 | Tarlazzi | H04B 7/024 |
| | | | 375/299 |
| 2017/0317722 A1 | 11/2017 | Lange | |

OTHER PUBLICATIONS

International Search Report and Written Opinion PCT/US2018/035103 dated Aug. 21, 2018.

* cited by examiner

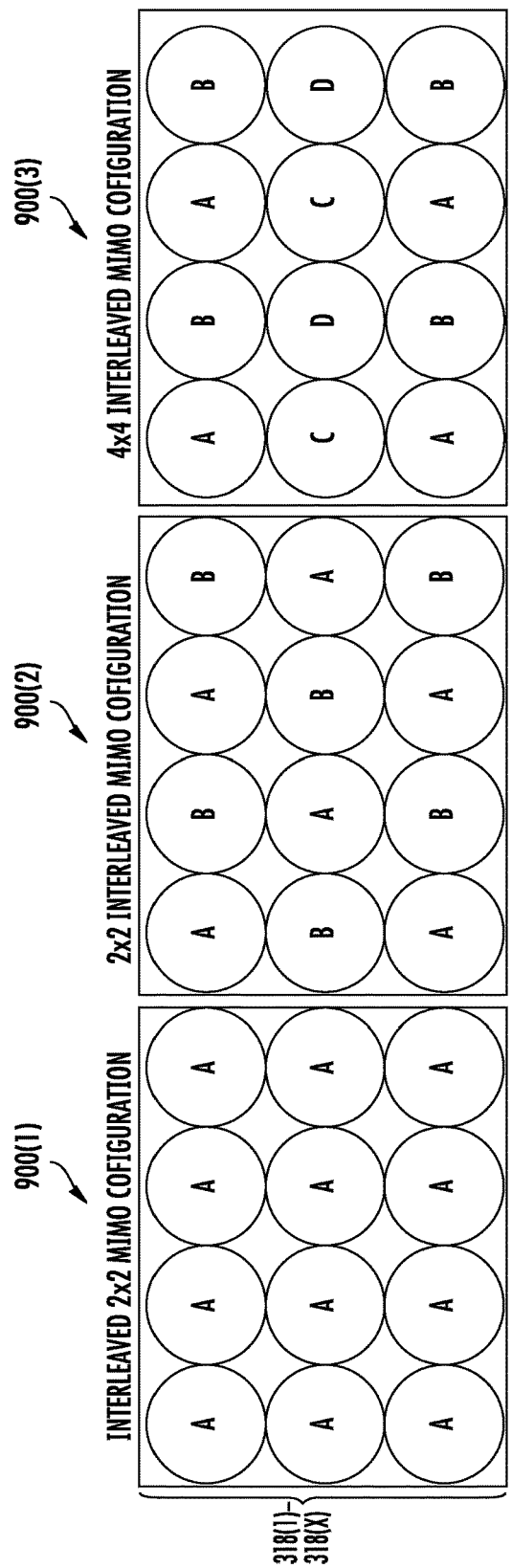

AUTOMATED ANALYSIS OF MULTIPLE-INPUT, MULTIPLE-OUTPUT (MIMO) COMMUNICATIONS STREAM DISTRIBUTION TO REMOTE UNITS IN A DISTRIBUTED COMMUNICATION SYSTEM (DCS) TO SUPPORT CONFIGURATION OF INTERLEAVED MIMO COMMUNICATIONS SERVICES

CROSS-REFERENCE TO RELATED APPLICATIONS

This application claims the benefit of priority under 35 U.S.C. § 119 of U.S. Provisional Application No. 62/513,051 filed on May 31, 2017 and Provisional Application No. 62/513,045 filed on May 31, 2017, the content of which are relied upon and incorporated herein by reference in their entireties.

BACKGROUND

The disclosure relates generally to distributed communications systems (DCSs), such as distributed antenna systems (DAS) for example, capable of distributing wireless radio-frequency (RF) communications services over wired communications mediums to remote units to provide remote communications coverage areas for distributing the RF communications services to wireless client devices.

Wireless customers are increasingly demanding wireless communications services, such as cellular communications services and Wi-Fi services. Thus, small cells, and more recently Wi-Fi services, are being deployed indoors. At the same time, some wireless customers use their wireless communication devices in areas that are poorly serviced by conventional cellular networks, such as inside certain buildings or areas where there is little cellular coverage. One response to the intersection of these two concerns has been the use of wireless distributed communications systems (DCSs), such as distributed antenna systems (DASs). DASs include remote antenna units (RAUs) configured to receive and transmit communications signals to client devices within the antenna range of the RAUs. DASs can be particularly useful when deployed inside buildings or other indoor environments where the wireless communication devices may not otherwise be able to effectively receive radio frequency (RF) signals from a source.

In this regard, FIG. 1 illustrates a wireless DCS 100 that is configured to distribute communications services to remote coverage areas 102(1)-102(N), where 'N' is the number of remote coverage areas. The wireless DCS 100 in FIG. 1 is provided in the form of a DAS 104. The DAS 104 can be configured to support a variety of communications services that can include cellular communications services, wireless communications services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) communicatively coupled to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communications signals 112D from the source transceiver 110 to be distributed to the remote units 106(1)-106(N). The downlink communications signals 112D can include data communications signals and/or communication signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over respective communications links 114(1)-114(N). The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications links 114(1)-114(N) may be a wired communications link, a wireless communications link, or an optical fiber-based communications link. Each of the remote units 106(1)-106(N) may include an RF transmitter/receiver 116(1)-116(N) and a respective antenna 118(1)-118(N) operably connected to the RF transmitter/receiver 116(1)-116(N) to wirelessly distribute the communications services to a wireless client device 120 within the respective remote coverage areas 102(1)-102(N). The remote units 106(1)-106(N) are also configured to receive uplink communications signals 112U from the wireless client device 120 in the respective remote coverage areas 102(1)-102(N) to be distributed to the source transceiver 110.

One problem that can exist with wireless communication systems, including the system 100 in FIG. 1, is the multi-path (fading) nature of signal propagation. This simply means that local maxima and minima of desired signals can exist over a picocell coverage area. A receiver antenna located at a maximum location will have better performance or signal-to-noise ratio (SNR) than a receiver antenna located in a minimum position. Signal processing techniques can be employed to improve the SNR of wireless data transmission in such wireless communication systems. For example, spatial diversity can be utilized in instances involving many access points. Other signal processing techniques include multiple-input, multiple-output (MIMO) techniques for increasing bit rates or beam forming for SNR, or wireless distance improvement. MIMO is the use of multiple antennas at both a transmitter and receiver to increase data throughput and link range without additional bandwidth or increased transmit power. MIMO technology can be employed in DASs to increase the bandwidth up to twice the nominal bandwidth.

Even with the potential doubling of bandwidth in a DCS employing MIMO technology, a client device must still be within range of two MIMO antennas to realize the full benefits of increased bandwidth of MIMO technology. Ensuring uniform MIMO coverage may be particularly important for newer cellular standards, such as Long Term Evolution (LTE), where increased bandwidth requirements are expected by users of client devices in all coverage areas.

MIMO communications services require at least two (2) communications streams being distributed in a given coverage area. For example, to provide MIMO communications services in the DAS 104 in FIG. 1, remote units 106(1)-106(N) in the DAS 104 can be co-located. For example, FIG. 2 illustrates the DAS 104 in FIG. 1 with co-located remote units 106(1), 106(2) and co-located remote units 106(3), 106(4). The co-located remote units 106(1), 106(2) are separated a distance $D_1$ from the other co-located remote units 106(3), 106(4) such that two distinct MIMO coverage areas 204(1), 204(2) are formed by the respective co-located remote units 106(1), 106(2) and co-located remote units 106(3), 106(4). Each remote unit 106(1)-106(4) has a respective radio 202(1)-202(4) configured to distribute a communication stream including one or more communications bands. Each radio 202(1)-202(4) may be configured to support the same communications bands, or a common subset of communications bands. Co-located remote units 106(1), 106(2) provide the first MIMO coverage area 204(1) by respectively receiving and distributing MIMO communications streams 200(1), 200(2). Co-located remote units 106(3), 106(4) provide the second MIMO coverage area 204(2) by also respectively receiving and distributing MIMO communications streams 200(1), 200(2). As shown in FIG. 2, a wireless client device 120 located within the first MIMO coverage area 204(1) will receive the MIMO communications streams 200(1), 200(2) for a MIMO communications service from the co-located remote units 106(1), 106(2), because the wireless client device 120 will be in communications range of both remote units 106(1), 106(2). Similarly, if the wireless client device 120 were located in the second MIMO coverage area 204(2) in range of both remote units 106(3), 106(4), the wireless client device 120 would receive MIMO communications streams 200(1), 200(2) for a MIMO communications service through remote units 106(3), 106(4). If however, the wireless client device 120 were located in a coverage area outside or on the edge of the first and second MIMO coverage areas 204(1), 204(2), the wireless client device 120 may still be in communication range of at least one of the remote units 106(1)-106(4) to receive one of the MIMO communications streams 200(1) or 200(2). However, the wireless client device 120 may not be in communication range with sufficient signal-to-noise (SNR) ratio of another remote unit 106(1)-106(4), to receive the other MIMO communications streams 200(2) or 200(1). Thus, in this example, the wireless client device 120 would only receive single input, single output (SISO) communications services in the DAS 104.

Providing co-located remote units 106(1)-106(N) in the DAS 104 can increase the MIMO coverage areas 204 provided in the DAS 104 to reduce or eliminate non-MIMO coverage areas where only SISO communications services are available. However, providing co-located remote units 106(1)-106(N) increases the number of remote units 106(1)-106(N) in the DAS 104 for the number of MIMO coverage areas 204 provided. For example, as shown in FIG. 2, two (2) remote units 106(1), 106(2) are required to be co-located to form the single MIMO coverage area 204(1). If a 4×4 MIMO communications service is desired, then four (4) remote units 106(1)-106(N) would be required to be co-located to form a single MIMO coverage area 204. Providing an increased number of remote units 106(1)-106(N) to provide MIMO communications services in the DAS 104 adds complexity and associated cost by requiring support of a greater number of remote units 106(1)-106(N) to as well as increased costs associated with providing additional communications links 114(1)-114(N) for each MIMO coverage area 204.

No admission is made that any reference cited herein constitutes prior art. Applicant expressly reserves the right to challenge the accuracy and pertinency of any cited documents.

SUMMARY

Embodiments disclosed herein include automated analysis of multiple-input, multiple-output (MIMO) communications stream distribution to remote units in a distributed communication system (DCS) to support configuration of interleaved MIMO communications services. MIMO communication services involve use of multiple antennas at both a transmitter and receiver to increase data throughput and link range to increase bandwidth up to twice nominal bandwidth. Related circuits, systems, and methods are also disclosed. In this regard, in exemplary aspects disclosed herein, DCSs are disclosed that are capable of distributing MIMO communications streams for a MIMO communications service in remote coverage areas between remote units and client devices in wireless communication range of remote units. The DCS can be configured to distribute a separate MIMO communications stream to each of multiple remote units, which in turn distribute the received MIMO communications stream in a remote MIMO coverage area to provide MIMO communications services to client devices in the remote coverage area. In this regard, an antenna of each remote unit radiates a respective received downlink MIMO communications stream received from the central unit in the overlapping MIMO coverage area. An antenna of each remote unit also receives a respective uplink MIMO communications stream received from a client device in the overlapping MIMO coverage area.

The remote units in the DCS configured to distribute MIMO communications streams for a MIMO communications service can be co-located with each other such that the remote coverage areas of each remote unit substantially overlap to form a remote MIMO coverage area. However, this requires providing multiple remote units for each desired remote MIMO coverage area, thereby increasing costs and complexity. In this regard, in aspects disclosed herein, to reduce the number of remote units in the DCS while still providing the desired remote MIMO coverage areas, the DCSs disclosed herein can be configured to provide interleaved MIMO communications services. Interleaved MIMO communications services involves configuring multiple adjacent remote units separated by a prescribed distance in the DCS and having respective, adjacent, substantially non-overlapping remote coverage areas to each receive a MIMO communications stream for a MIMO communications service to form a remote MIMO coverage area. By the multiple adjacent remote units being located at a prescribed distance from each other, each of their respective antennas are in essence "bonded" together through their distribution and reception of separate MIMO communications streams in the remote MIMO coverage area to form interleaved MIMO cell bonded remote units. The size of the remote MIMO coverage area formed by the interleaved MIMO cell bonded remote units is a function of the distance between the interleaved MIMO cell bonded remote units, because this distance affects the signal quality level required by a client device to receive the MIMO communications streams from each of the interleaved MIMO cell bonded remote units. If a client device does not have acceptable and/or higher communications signal quality with an antenna of a single remote unit, the client device will engage in MIMO communications through the interleaved MIMO cell bonded remote units. If however, a client device has acceptable and/or higher communications signal quality with a subset of the antennas of the interleaved MIMO cell bonded remote units, the client device will engage in single-input, single-output (SISO) communications through a remote unit of the interleaved MIMO cell bonded remote units. More sparse and lower cost remote unit deployments can thus provide substantially uniform high-capacity MIMO DAS coverage.

In aspects disclosed herein, to provide the desired interleaved MIMO communications services, the DCS supports automated analysis of MIMO communications stream distribution to remote units in a DCS to support configuration of interleaved MIMO communications services. MIMO analysis circuits can be employed to determine the actual routing of MIMO communications signals and locations of the remote units to automatedly determine any MIMO cell bonding between the remote units to determine the interleaved MIMO configuration in effect in the DCS, if any. The determined interleaved MIMO configuration of the existing DCS infrastructure is used to determine other possible interleaved MIMO configurations in the DCS and their associated performance, along with the associated configurations and changes needed to realize such possible interleaved MIMO configurations. As one option, the changes and optimizations required to realize the possible interleaved MIMO configurations may be determined based on using a radio frequency (RF) simulation software program, if available, to create a "heat" map of both SISO and interleaved MIMO remote coverage areas of the remote units for the possible interleaved MIMO configurations. These possible interleaved MIMO communications service configurations can then be presented to a technician or customer to determine if any of the possible interleaved MIMO communications service configurations should be deployed in the DCS. For example, one possible interleaved MIMO communications service configuration may be to change the MIMO communications services supported by a DCS from 2×2 interleaved MIMO communications services to 4×4 interleaved MIMO communications services. If the possible interleaved MIMO communications service configurations should be deployed in the DCS, the DCS can be reconfigured to support the selected interleaved MIMO communications service configurations. In this manner, interleaved MIMO communications services can be configured for a DCS using an existing infrastructure of remote units having substantially non-overlapping remote coverage areas, by directing the MIMO communications streams over the configured physical layers to be provided to the desired remote units to facilitate interleaved MIMO cell bonding of remote units.

If the infrastructure of the DCS is indicated as not being able to be changed, the possible interleaved MIMO communications service configurations presented will involve using the existing infrastructure of remote units and their locations, but with possible different physical layer assignments for distribution of MIMO communications streams to the remote units. If the infrastructure of the DCS is indicated as being able to be changed, the possible interleaved MIMO communications service configurations presented can also involve changing (e.g., adding to) the number and/or location of remote units along with possible different physical layer assignments for distribution of MIMO communications streams to the remote units.

In this regard, in one exemplary aspect, distributed communications system (DCS) is disclosed. The DCS comprises a central unit. The central unit is configured to distribute received one or more downlink communications signals over one or more downlink communications links among a plurality of downlink communications links to one or more remote units among a plurality of remote units according to a routing configuration and distribute received one or more uplink communications signals from the plurality of remote units over a plurality of uplink communications links. The central unit comprises a routing configuration assigning received one or more downlink communications signals to one or more remote units among the plurality of remote units and a central multiple-input, multiple-output (MIMO) analysis circuit configured to determine the presence of MIMO communications signals among the received one or more downlink communications signals. Each remote unit among the plurality of remote units comprises at least one antenna and is configured to distribute received uplink communications signals received over the at least one antenna over an uplink communications link among the plurality of uplink communications links to the central unit and distribute received downlink communications signals from a downlink communications link among the plurality of downlink communications links through the at least one antenna. Each remote unit among the plurality of remote units further comprising a remote MIMO analysis circuit is configured to determine the presence of MIMO communications signals among the received downlink communications signals, determine location of the remote unit, and provide MIMO analysis information comprising the presence of MIMO communications signals and the determined location of the remote unit. The central unit further comprises a controller configured to instruct the central MIMO analysis circuit to analyze the received one or more downlink communications signals to determine the presence of MIMO communications signals. The controller is also configured to instruct the plurality of remote units to cause their respective remote MIMO analysis circuit to analyze the received one or more downlink communications signals to determine the presence of MIMO communications signals. The controller is also configured to determine a routing configuration of the determined MIMO communications signals among the one or more downlink communications signals from the central unit to the plurality of remote units. The controller is also configured to receive MIMO analysis information from each remote unit among the plurality of remote units indicating the determined presence of MIMO communications signals and the location of the remote unit. In response to the determined presence of MIMO communications signals from the received MIMO analysis information the controller is configured to determine at least one interleaved MIMO configuration for the routing configuration based on the received MIMO analysis information; and configure the routing configuration based on the determined at least one interleaved MIMO configuration. The controller is also configured to assign a first MIMO communications signal among the received one or more downlink communications signals for a first MIMO communications service to a first remote unit among the plurality of remote units having a first remote coverage area and assign a second MIMO communications signal among the received one or more downlink communications signals for the first MIMO communications service to a second remote unit among the plurality of remote units having a second remote coverage area overlapping with the first remote coverage area to interleave MIMO cell bond the first remote unit and the second remote unit.

An additional aspect of the disclosure relates to method of configuring a distributed communications systems (DCS)

for providing interleaved multiple-input, multiple-output (MIMO) communications services. The method comprises instructing a central MIMO analysis circuit in a central unit of a DCS to analyze received at least one downlink communications signals to determine a presence of MIMO communications signals. The DCS comprises the central unit configured to distribute received one or more downlink communications signals over one or more downlink communications links among a plurality of downlink communications links to one or more remote units among a plurality of remote units according to a routing configuration. The central unit is also comprised to distribute received one or more uplink communications signals from the plurality of remote units over a plurality of uplink communications links. The central unit comprises a routing configuration assigning received one or more downlink communications signals to one or more remote units among the plurality of remote units and a central MIMO analysis circuit configured to determine the presence of MIMO communications signals among the received one or more downlink communications signals. Each remote unit among the plurality of remote units comprises at least one antenna and is configured to distribute received uplink communications signals over the at least one antenna over an uplink communications link among the plurality of uplink communications links to the central unit, and distribute received downlink communications signals from a downlink communications link among the plurality of downlink communications links through the at least one antenna. Each remote unit among the plurality of remote units further comprises a remote MIMO analysis circuit is configured to determine the presence of MIMO communications signals among the received downlink communications signals, determine location of the remote unit, and provide MIMO analysis information comprising the presence of MIMO communications signals and the determined location of the remote unit. The method further comprises instructing the plurality of remote units to cause their respective remote MIMO analysis circuit to analyze the received one or more downlink communications signals to determine the presence of MIMO communications signals. The method further comprises determining a routing configuration of the determined MIMO communications signals among the received one or more downlink communications signals from the central unit to the plurality of remote units. The method further comprises receiving MIMO analysis information from each remote unit among the plurality of remote units indicating the determined presence of MIMO communications signals and the location of the remote unit. In response to the determined presence of MIMO communications signals from the received MIMO analysis information, the method further comprises determining at least one interleaved MIMO configuration for the routing configuration based on the received MIMO analysis information and configuring the routing configuration based on the determined at least one interleaved MIMO configuration by assigning a first MIMO communications signal among the received one or more downlink communications signals for a first MIMO communications service to a first remote unit among the plurality of remote units having a first remote coverage area and assigning a second MIMO communications signal among the received one or more downlink communications signals for the first MIMO communications service to a second remote unit among the plurality of remote units having a second remote coverage area overlapping with the first remote coverage area to interleave MIMO cell bond the first remote unit and the second remote unit.

An additional aspect of the disclosure relates to a non-transitory computer-readable medium having stored thereon computer executable instructions which, when executed by a processor, cause the processor to instruct a central multiple-input, multiple-output (MIMO) analysis circuit in a central unit of a distributed communications system (DCS) to analyze received at least one downlink communications signals to determine a presence of MIMO communications signals. The DCS comprises a central unit. The central unit is configured to distribute received one or more downlink communications signals over one or more downlink communications links among a plurality of downlink communications links to one or more remote units among a plurality of remote units according to a routing configuration, and distribute received one or more uplink communications signals from the plurality of remote units over a plurality of uplink communications links. The central unit comprises a routing configuration assigning received one or more downlink communications signals to one or more remote units among the plurality of remote units and the central MIMO analysis circuit configured to determine the presence of MIMO communications signals among the received one or more downlink communications signals. Each remote unit among the plurality of remote units comprises at least one antenna and is configured to distribute received uplink communications signals over the at least one antenna over an uplink communications link among the plurality of uplink communications links to the central unit and distribute received downlink communications signals from a downlink communications link among the plurality of downlink communications links through the at least one antenna. Each remote unit among the plurality of remote units further comprises a remote MIMO analysis circuit configured to determine the presence of MIMO communications signals among the received downlink communications signals, determine location of the remote unit, and provide MIMO analysis information comprising the presence of MIMO communications signals and the determined location of the remote unit. The processor also instructs the plurality of remote units to cause their respective remote MIMO analysis circuit to analyze the received one or more downlink communications signals to determine the presence of MIMO communications signals. The processor also determines a routing configuration of the determined MIMO communications signals among the received one or more downlink communications signals from the central unit to the plurality of remote units. The processor also receives MIMO analysis information from each remote unit among the plurality of remote units indicating the determined presence of MIMO communications signals and the location of the remote unit. In response to the determined presence of MIMO communications signals from the received MIMO analysis information, the processor determines at least one interleaved MIMO configuration for the routing configuration based on the received MIMO analysis information, and configures the routing configuration based on the determined at least one interleaved MIMO configuration. The processor also assigns a first MIMO communications signal among the received one or more downlink communications signals for a first MIMO communications service to a first remote unit among the plurality of remote units having a first remote coverage area, and assigns a second MIMO communications signal among the received one or more downlink communications signals for the first MIMO communications service to a second remote unit among the plurality of remote units having a second remote coverage area overlapping with the first remote coverage area to interleave MIMO cell bond the first remote unit and the second remote unit.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 9A-9C are schematic diagrams illustrating different, exemplary SISO, 2×2, and 4×4 interleaved MIMO cell bonding configurations that can be configured and/or re-configured in the DCS in FIG. 5A based on configuring and/or re-configuring the distribution of MIMO communications streams to designated remote units in the DCS;

DETAILED DESCRIPTION

Figure 1:
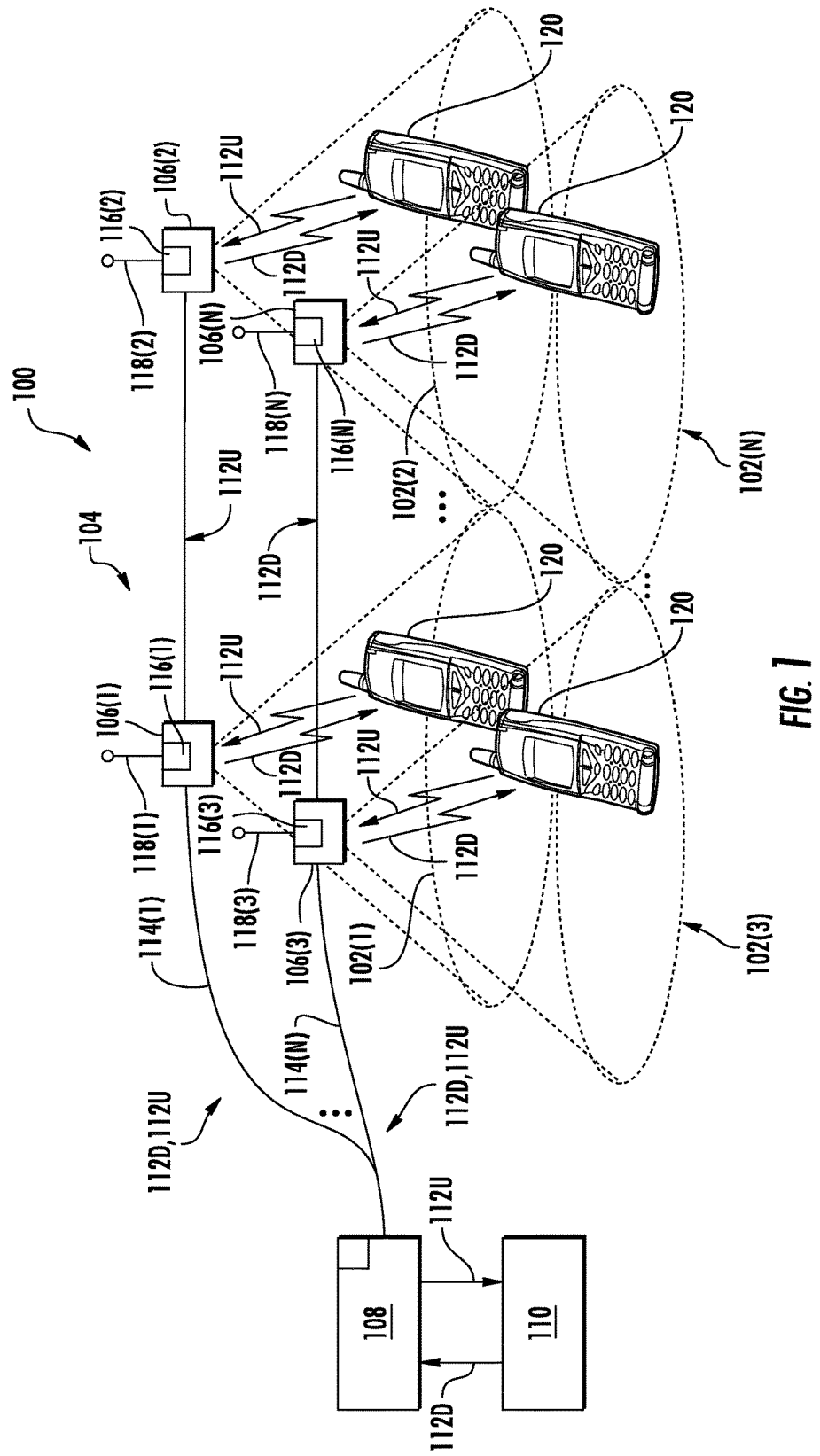
FIG. 1 is a schematic diagram of an exemplary wireless distributed communications system (DCS) in the form of a distributed antenna system (DAS)
Figure 2:
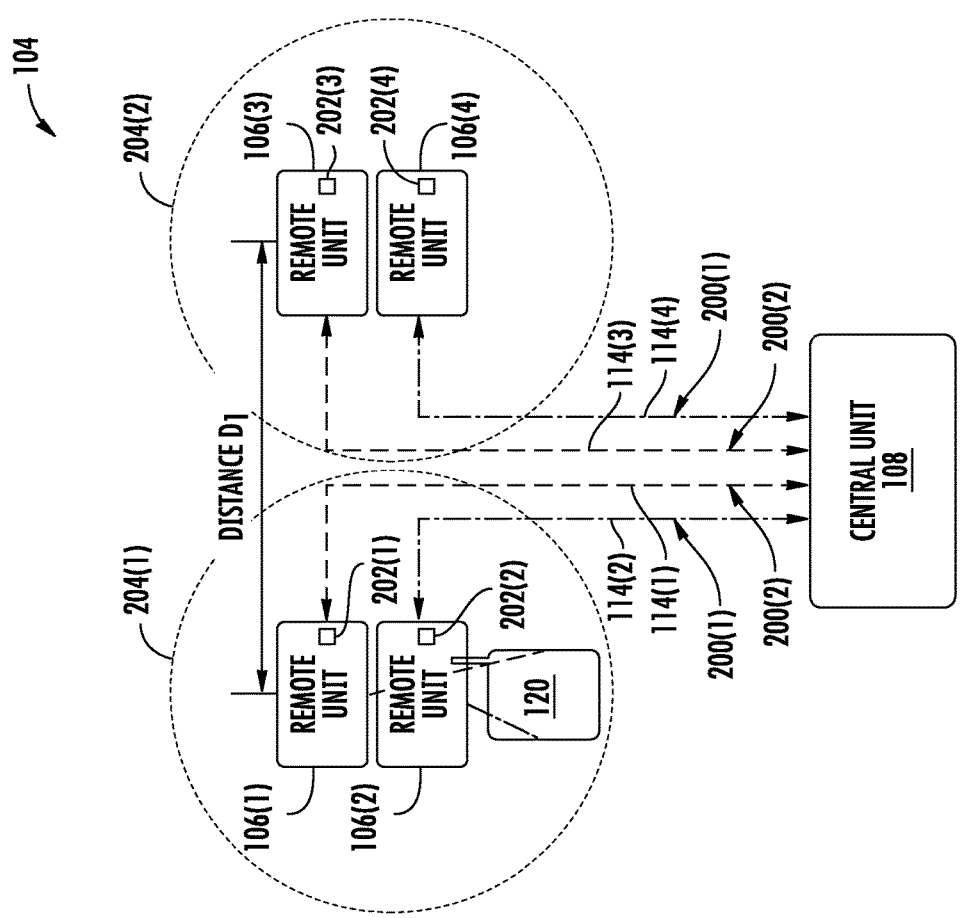
FIG. 2 is schematic diagram of two MIMO coverage areas formed in the DAS of FIG. 1 by respective co-located remote units.

Embodiments disclosed herein include automated analysis of multiple-input, multiple-output (MIMO) communications stream distribution to remote units in a distributed communication system (DCS) to support configuration of interleaved MIMO communications services. MIMO communication services involve use of multiple antennas at both a transmitter and receiver to increase data throughput and link range to increase bandwidth up to twice nominal bandwidth. Related circuits, systems, and methods are also disclosed. In this regard, in exemplary aspects disclosed herein, DCSs are disclosed that are capable of distributing MIMO communications streams for a MIMO communications service in remote coverage areas between remote units and client devices in wireless communication range of remote units. The DCS can be configured to distribute a separate MIMO communications stream to each of multiple remote units, which in turn distribute the received MIMO communications stream in a remote MIMO coverage area to provide MIMO communications services to client devices in the remote coverage area. In this regard, an antenna of each remote unit radiates a respective received downlink MIMO communications stream received from the central unit in the overlapping MIMO coverage area. An antenna of each remote unit also receives a respective uplink MIMO communications stream received from a client device in the overlapping MIMO coverage area.

The remote units in the DCS configured to distribute MIMO communications streams for a MIMO communications service can be co-located with each other such that the remote coverage areas of each remote unit substantially overlap to form a remote MIMO coverage area. However, this requires providing multiple remote units for each desired remote MIMO coverage area, thereby increasing costs and complexity. In this regard, in aspects disclosed herein, to reduce the number of remote units in the DCS while still providing the desired remote MIMO coverage areas, the DCSs disclosed herein can be configured to provide interleaved MIMO communications services. Interleaved MIMO communications services involves configuring multiple adjacent remote units separated by a prescribed distance in the DCS and having respective, adjacent, substantially non-overlapping remote coverage areas to each receive a MIMO communications stream for a MIMO communications service to form a remote MIMO coverage area. By the multiple adjacent remote units being located at a prescribed distance from each other, each of their respective antennas are in essence "bonded" together through their distribution and reception of separate MIMO communications streams in the remote MIMO coverage area to form interleaved MIMO cell bonded remote units. The size of the remote MIMO coverage area formed by the interleaved MIMO cell bonded remote units is a function of the distance between the interleaved MIMO cell bonded remote units, because this distance affects the signal quality level required by a client device to receive the MIMO communications streams from each of the interleaved MIMO cell bonded remote units. If a client device does not have acceptable and/or higher communications signal quality with an antenna of a single remote unit, the client device will engage in MIMO communications through the interleaved MIMO cell bonded remote units. If however, a client device has acceptable and/or higher communications signal quality with a subset of the antennas of the interleaved MIMO cell bonded remote units, the client device will engage in single-input, single-output (SISO) communications through a remote unit of the interleaved MIMO cell bonded remote units. More sparse and lower cost remote unit deployments can thus provide substantially uniform high-capacity MIMO DAS coverage.

In aspects disclosed herein, to provide the desired interleaved MIMO communications services, the DCS supports automated analysis of MIMO communications stream distribution to remote units in a DCS to support configuration of interleaved MIMO communications services. MIMO analysis circuits can be employed to determine the actual routing of MIMO communications signals and locations of the remote units to automatedly determine any MIMO cell bonding between the remote units to determine the configured interleaved MIMO configuration in effect in the DCS, if any. The determined interleaved MIMO configuration of the existing DCS infrastructure is used to determine other possible interleaved MIMO configurations in the DCS and their associated performance, along with the associated configurations and changes needed to realize such possible interleaved MIMO configurations. As one option, the changes and optimizations required to realize the possible interleaved MIMO configurations may be determined based on using a radio frequency (RF) simulation software program, if available, to create a "heat" map of both SISO and interleaved MIMO remote coverage areas of the remote units for the possible interleaved MIMO configurations. These possible interleaved MIMO communications service configurations can then be presented to a technician or customer to determine if any of the possible interleaved MIMO communications service configurations should be deployed in the DCS. For example, one possible interleaved MIMO communications service configuration may be to change the MIMO communications services supported by a DCS from 2×2 interleaved MIMO communications services to 4×4 interleaved MIMO communications services. If the possible interleaved MIMO communications service configurations should be deployed in the DCS, the DCS can be reconfigured to support the selected interleaved MIMO communication service configurations. In this manner, interleaved MIMO communications services can be configured for a DCS using an existing infrastructure of remote units having substantially non-overlapping remote coverage areas, by directing the MIMO communications streams over the configured physical layers to be provided to the desired remote units to facilitate interleaved MIMO cell bonding of remote units.

If the infrastructure of the DCS is indicated as not being able to be changed, the possible interleaved MIMO communications service configurations presented will involve using the existing infrastructure of remote units and their locations, but with possible different physical layer assignments for distribution of MIMO communications streams to the remote units. If the infrastructure of the DCS is indicated as being able to be changed, the possible interleaved MIMO communications service configurations presented can also involve changing (e.g., adding to) the number and/or location of remote units along with possible different physical layer assignments for distribution of MIMO communications streams to the remote units.

Figure 4A:
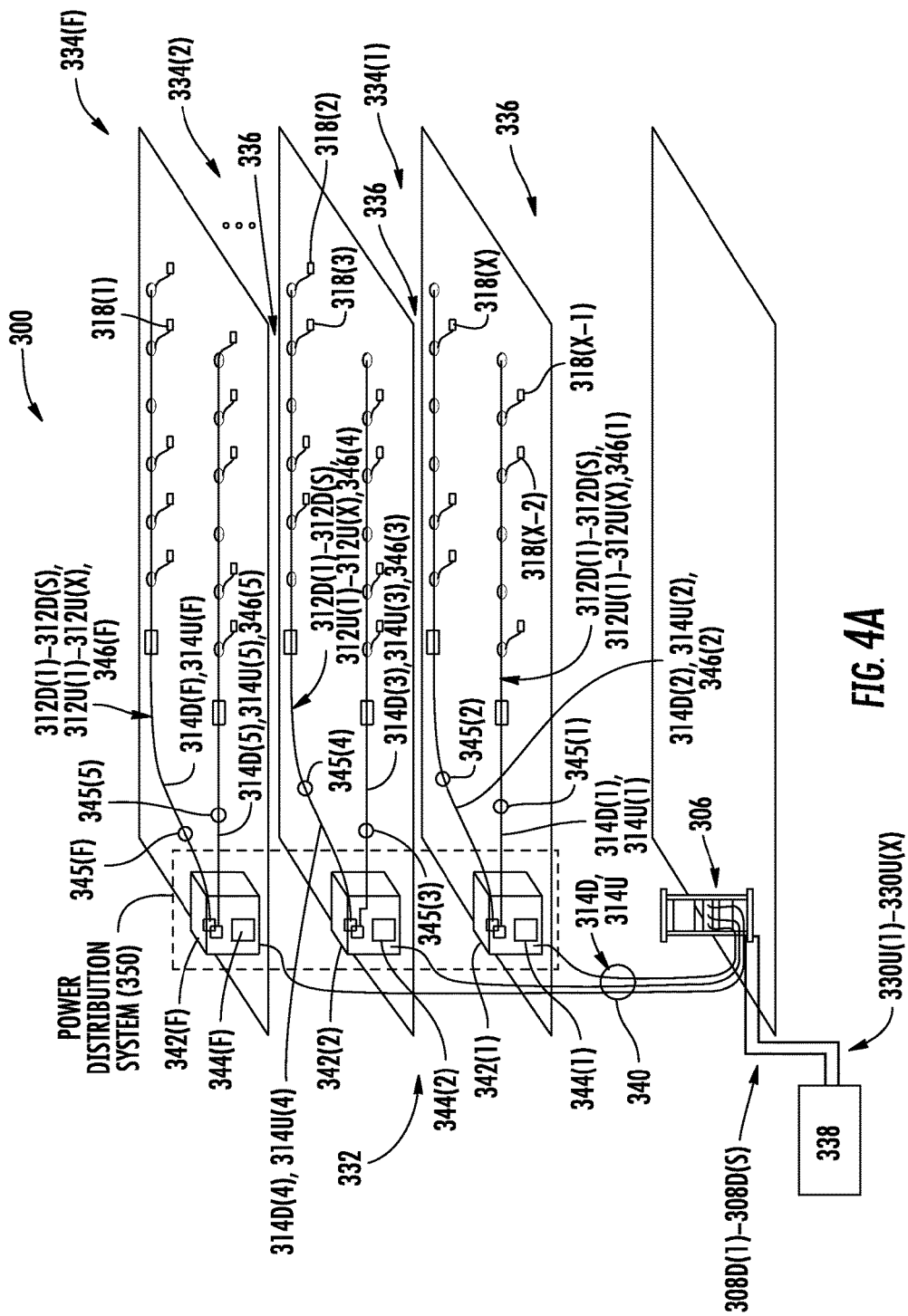
FIG. 4A is a partially schematic cut-away diagram of an exemplary building infrastructure in which a DCS in FIG. 3 can be provided.
Figure 4B:
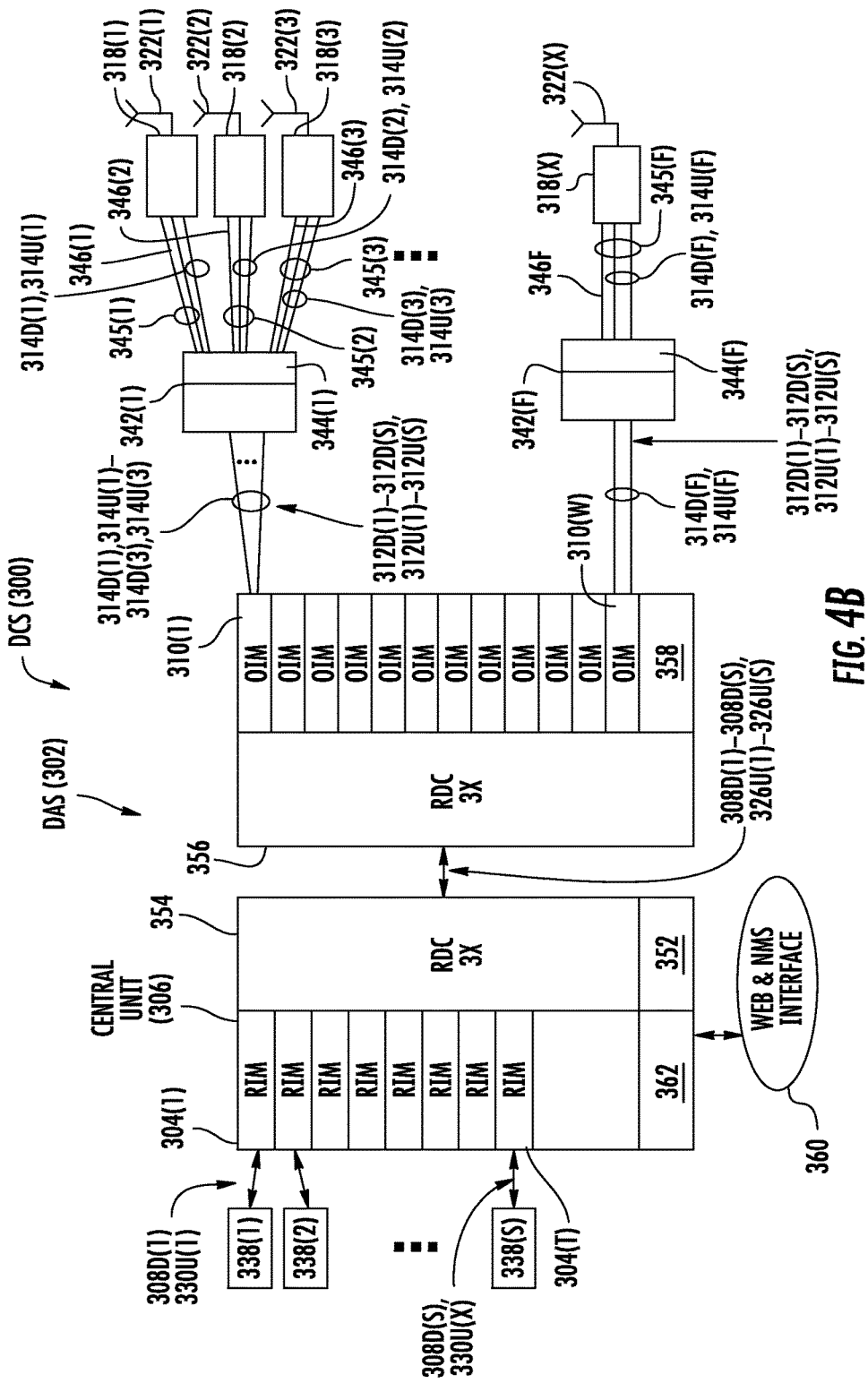
FIG. 4B is a more detailed schematic diagram of the DCS in FIG. 4A.
Figure 5A:
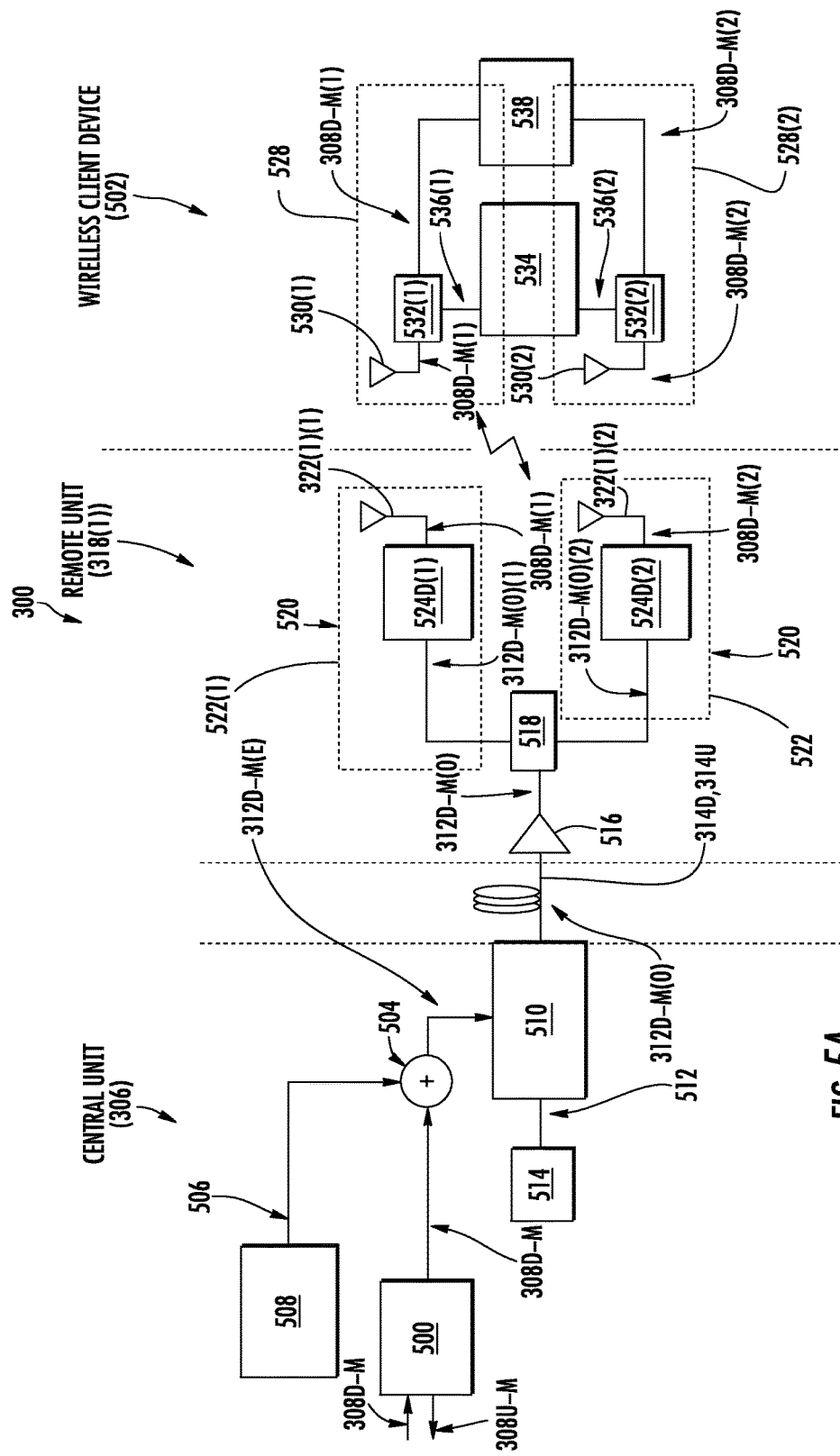
FIG. 5A is a schematic diagram of a DCS configured to support co-located MIMO communications services with client devices.
Figure 5B:
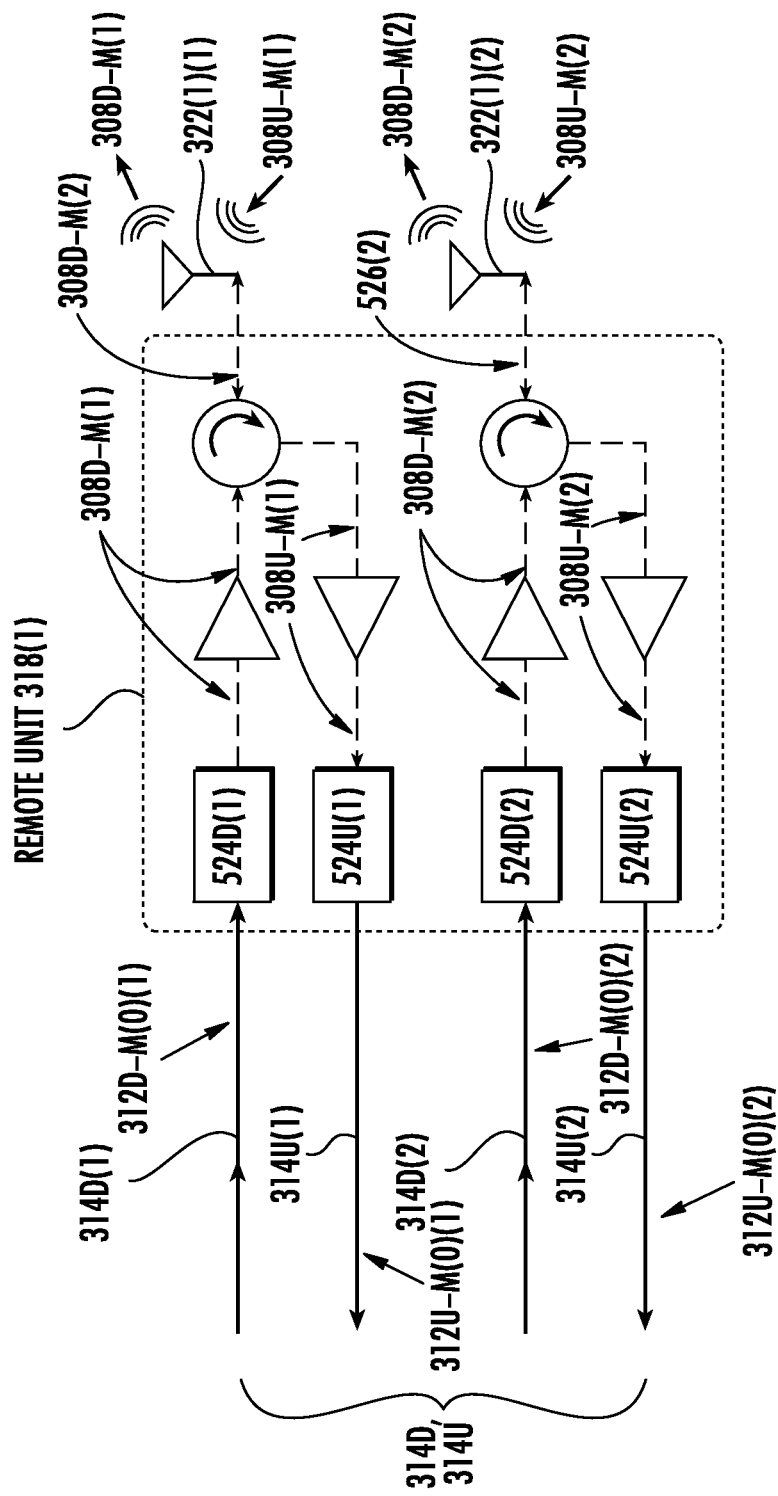
FIG. 5B is a schematic of a downlink path and uplink path and related components of the remote unit in the DCS of FIG. 5A.
Figure 6:
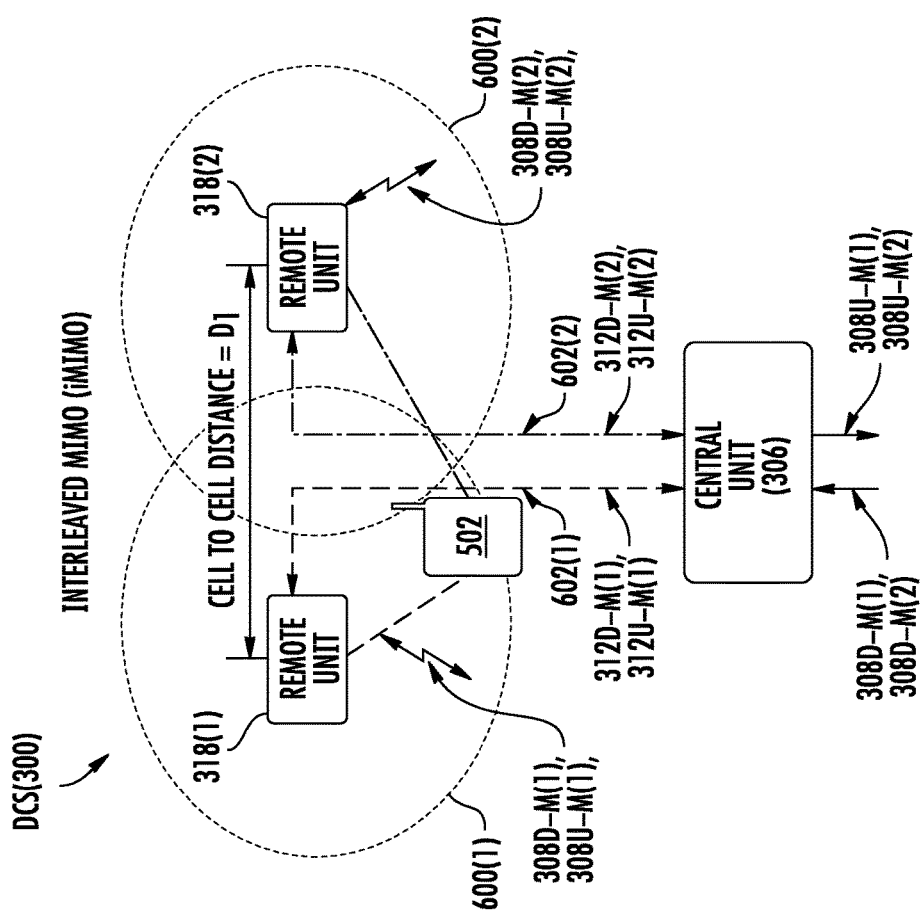
FIG. 6 is a schematic diagram of exemplary adjacent remote units in a DCS, such as the DCS in FIGS. 5A and 5B, having exemplary substantially non-overlapping remote coverage areas and located a defined distance from each other to be capable of being interleaved MIMO cell bonded together to support interleaved MIMO communications services.

Before discussing examples distributing MIMO communications streams to remote units in a DCS to support configuration and/or reconfiguration of interleaved MIMO communications services starting at FIG. 6, an exemplary DCS is described in regards to FIGS. 3-5B.

Figure 3:
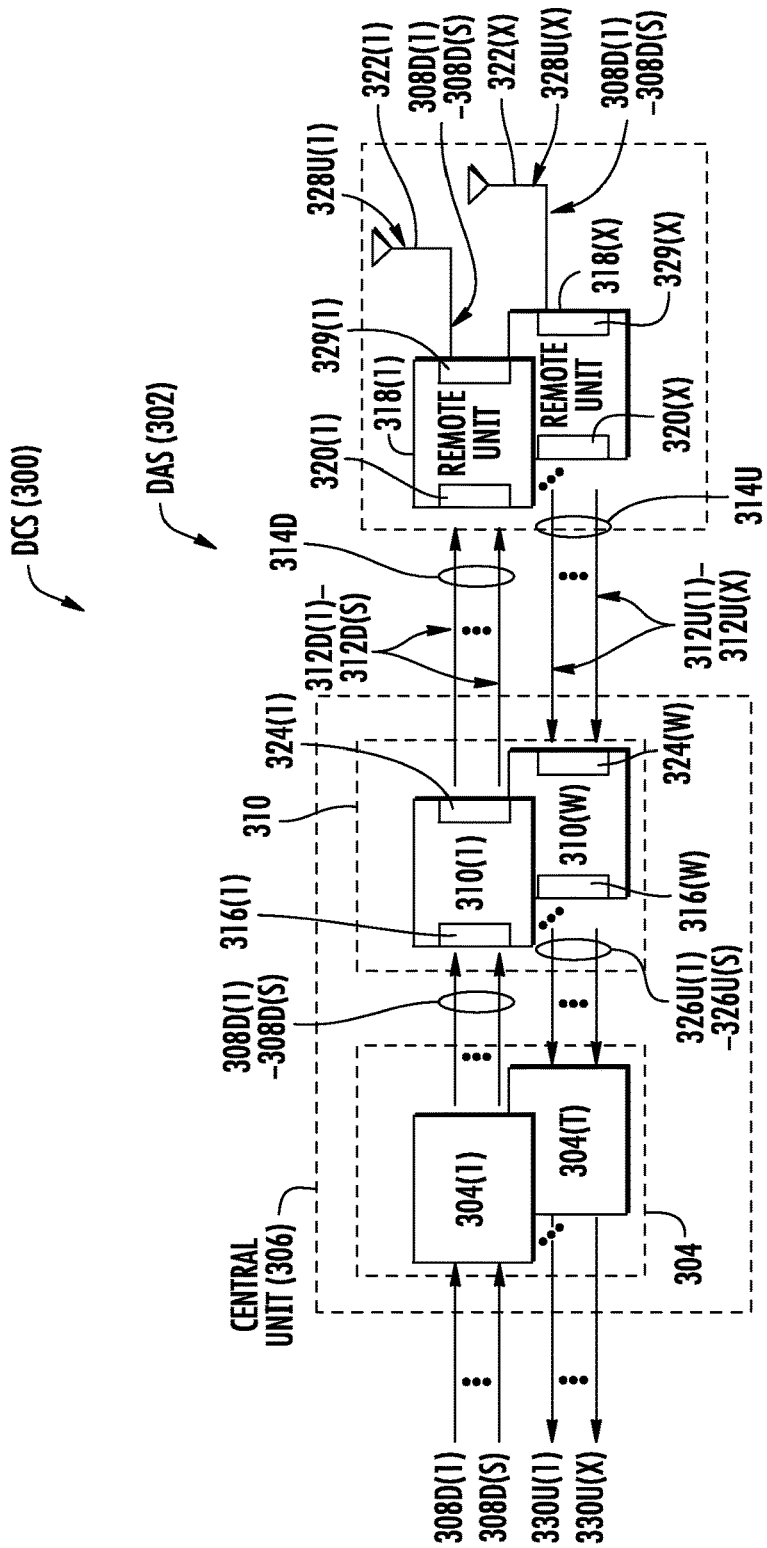
FIG. 3 is a schematic diagram of an exemplary optical fiber-based DCS in the form of a DAS configured to distribute communications signals between a central unit and a plurality of remote units, and that can include one or more power distribution systems configured to distribute power to a plurality of remote units and provide a safety power disconnect of the power source to remote units.

In this regard, FIG. 3 is a schematic diagram of such an exemplary DCS 300 in the form of a distributed antenna system (DAS) 302. A DAS is a system that is configured to distribute communications signals, including wireless communications signals, from a central unit to a plurality of remote units over physical communications media, to then be distributed from the remote units wirelessly to client devices in wireless communication range of a remote unit. The DAS 302 in this example is an optical fiber-based DAS that is comprised of three (3) main components. One or more interface circuits provided in the form of radio interface circuits 304(1)-304(T) are provided in a central unit 306 to receive and process (e.g., filter, amplify, route) downlink electrical communications signals 308D(1)-308D(S) prior to optical conversion into downlink optical communications signals. The downlink electrical communications signals 308D(1)-308D(S) may be received from a base transceiver station (BTS) or baseband unit (BBU) as examples. The downlink electrical communications signals 308D(1)-308D(S) may be analog signals or digital signals that can be sampled and processed as digital information. The radio interface circuits 304(1)-304(T) provide both downlink and uplink interfaces for signal processing. The notations "1-S" and "1-T" indicate that any number of the referenced component, 1-S and 1-T, respectively, may be provided.

With continuing reference to FIG. 3, the central unit 306 is configured to accept the plurality of radio interface circuits 304(1)-304(T) as modular components that can easily be installed and removed or replaced in a chassis. In one embodiment, the central unit 306 is configured to support up to twelve (12) radio interface circuits 304(1)-304(12). Each radio interface circuit 304(1)-304(T) can be designed to support a particular type of radio source or range of radio sources (i.e., frequencies) to provide flexibility in configuring the central unit 306 and the DAS 302 to support the desired radio sources. For example, one radio interface circuit 304 may be configured to support the Personal Communication Services (PCS) radio band. Another radio interface circuit 304 may be configured to support the 700 MHz radio band. In this example, by inclusion of these radio interface circuits 304, the central unit 306 could be configured to support and distribute communications signals, including those for the communications services and communications bands described above as examples.

The radio interface circuits 304(1)-304(T) may be provided in the central unit 306 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 3, the received downlink electrical communications signals 308D(1)-308D(S) are provided to a plurality of optical interfaces provided in the form of optical interface circuits 310(1)-310(W) in this embodiment to convert the downlink electrical communications signals 308D(1)-308D(S) into downlink optical communications signals 312D(1)-312D(S). The notation "1-W" indicates that any number of the referenced component 1-W may be provided. The optical interface circuits 310 may include one or more optical interface components (OICs) that contain electrical-to-optical (E-O) converters 316(1)-316(W) to convert the received downlink electrical communications signals 308D(1)-308D(S) into the downlink optical communications signals 312D(1)-312D(S). The optical interface circuits 310 support the radio bands that can be provided by the radio interface circuits 304, including the examples previously described above. The downlink optical communications signals 312D(1)-312D(S) are communicated over a downlink optical fiber communications link 314D to a plurality of remote units 318(1)-318(X) provided in the form of remote antenna units in this example. The notation "1-X" indicates that any number of the referenced component 1-X may be provided. One or more of the downlink optical communications signals 312D(1)-312D(S) can be distributed to each remote unit 318(1)-318(X). Thus, the distribution of the downlink optical communications signals 312D(1)-312D(S) from the central unit 306 to the remote units 318(1)-318(X) is in a point-to-multipoint configuration in this example.

With continuing reference to FIG. 3, the remote units 318(1)-318(X) include optical-to-electrical (O-E) converters 320(1)-320(X) configured to convert the one or more received downlink optical communications signals 312D(1)-312D(S) back into the downlink electrical communications signals 308D(1)-308D(S) to be wirelessly radiated through antennas 322(1)-322(X) in the remote units 318(1)-318(X) to user equipment (not shown) in the reception range of the antennas 322(1)-322(X). The optical interface circuits 310 may also include O-E converters 324(1)-324(W) to convert received uplink optical communications signals 312U(1)-312U(X) from the remote units 318(1)-318(X) into the uplink electrical communications signals 326U(1)-326U(S) as will be described in more detail below.

With continuing reference to FIG. 3, the remote units 318(1)-318(X) are also configured to receive uplink electrical communications signals 328U(1)-328U(X) received by the respective antennas 322(1)-322(X) from client devices in wireless communication range of the remote units 318(1)-318(X). The uplink electrical communications signals 328U(1)-328U(S) may be analog signals or digital signals that can be sampled and processed as digital information. The remote units 318(1)-318(X) include E-O converters 329(1)-329(X) to convert the received uplink electrical communications signals 328U(1)-328U(X) into uplink optical communications signals 312U(1)-312U(X). The remote units 318(1)-318(X) distribute the uplink optical communications signals 312U(1)-312U(X) over an uplink optical fiber communication link 314U to the optical interface circuits 310(1)-310(W) in the central unit 306. The O-E converters 324(1)-324

(W) convert the received uplink optical communications signals 312U(1)-312U(X) into uplink electrical communications signals 326U(1)-326U(X), which are processed by the radio interface circuits 304(1)-304(T) and provided as the uplink electrical communications signals 330U(1)-330U(X) to a source transceiver such as a base transceiver station (BTS) or baseband unit (BBU).

Note that the downlink optical fiber communications link 314D and the uplink optical fiber communications link 314U coupled between the central unit 306 and the remote units 318(1)-318(X) may be a common optical fiber communications link, wherein for example, wave division multiplexing (WDM) may be employed to carry the downlink optical communications signals 312D(1)-312D(S) and the uplink optical communications signals 312U(1)-312U(X) on the same optical fiber communications link. Alternatively, the downlink optical fiber communications link 314D and the uplink optical fiber communications link 314U coupled between the central unit 306 and the remote units 318(1)-318(X) may be single, separate optical fiber communications links, wherein for example, wave division multiplexing (WDM) may be employed to carry the downlink optical communications signals 312D(1)-312D(S) on one common downlink optical fiber and the uplink optical communications signals 312U(1)-312U(X) carried on a separate, only uplink optical fiber. Alternatively, the downlink optical fiber communications link 314D and the uplink optical fiber communications link 314U coupled between the central unit 306 and the remote units 318(1)-318(X) may be separate optical fibers dedicated to and providing a separate communications link between the central unit 306 and each remote unit 318(1)-318(X).

The DCS 300 in FIG. 3 can be provided in an indoor environment as illustrated in FIG. 4A. FIG. 4A is a partially schematic cut-away diagram of a building infrastructure 332 employing the DCS 300. FIG. 4B is a schematic diagram of the DCS 300 installed according to the building infrastructure 332 in FIG. 4A.

With reference to FIG. 4A, the building infrastructure 332 in this embodiment includes a first (ground) floor 334(1), a second floor 334(2), and a Fth floor 334(F), where 'F' can represent any number of floors. The floors 334(1)-334(F) are serviced by the central unit 306 to provide antenna coverage areas 336 in the building infrastructure 332. The antenna coverage area 336 is the distance in which wireless communications signals can be transmitted or otherwise distributed at a minimum signal-to-noise ratio (SNR) to achieve communications with a client device. The central unit 306 is communicatively coupled to a signal source 338, such as a BTS or BBU, to receive the downlink electrical communications signals 308D(1)-308D(S). The central unit 306 is communicatively coupled to the remote units 318(1)-318(X) to receive optical uplink communications signals 312U(1)-312U(X) from the remote units 318(1)-318(X) as previously described in FIG. 3. The downlink and uplink optical communications signals 312D(1)-312D(S), 312U(1)-312U(X) are distributed between the central unit 306 and the remote units 318(1)-318(X) over a riser cable 340 in this example. The riser cable 340 may be routed through interconnect units (ICUs) 342(1)-342(F) dedicated to each floor 334(1)-334(F) for routing the downlink and uplink optical communications signals 312D(1)-312D(S), 312U(1)-312U(X) to the remote units 318(1)-318(X). The ICUs 342(1)-342(F) may also include respective power distribution circuits 344(1)-344(F) that include power sources as part of a power distribution system 350, wherein the power distribution circuits 344(1)-344(F) are configured to distribute power remotely to the remote units 318(1)-318(X) to provide power for operating the power consuming components in the remote units 318(1)-318(X). For example, array cables 345(1)-345(F) may be provided and coupled between the ICUs 342(1)-342(F) that contain both optical fibers to provide the respective downlink and uplink optical fiber communications media 314D(1)-314D(F), 314U(1)-314U(F) and power conductors 346(1)-346(F) (e.g., electrical wire) to carry current from the respective power distribution circuits 344(1)-344(F) to the remote units 318(1)-318(X).

With reference to the DCS 300 shown in FIG. 4B, the central unit 306 may include a power supply circuit 352 to provide power to the radio interface circuits 304(1)-304(T), the optical interface circuits 310(1)-310(W), and radio distribution circuits (RDCs) 354, 356. The downlink electrical communications signals 308D(1)-308D(S) and the uplink electrical communications signals 326U(1)-326U(S) are routed from between the radio interface circuits 304(1)-304(T) and the optical interface circuits 310(1)-310(W) through RDCs 354, 356. In one embodiment, the RDCs 354, 356 can support sectorization in the DCS 300, meaning that only certain downlink electrical communications signals 308D(1)-308D(S) are routed to certain radio interface circuits 304(1)-304(T). A power supply circuit 358 may also be provided to provide power to the optical interface circuits 310(1)-310(W). An external interface 360, which may include web and network management system (NMS) interfaces, may also be provided to allow configuration and communication to the components of the central unit 306. A microcontroller, microprocessor, or other control circuitry, called a head-end controller (HEC) 362 (e.g., a controller circuit or a microprocessor) may be included in central unit 306 to provide control operations for the central unit 306 and the DCS 300.

The DCS 300 in FIGS. 3-4B can be configured to support MIMO communications services. In this regard, FIG. 5A is a schematic diagram of an exemplary the DCS 300 in FIGS. 3-4B illustrating the central unit 306 and a single remote unit 318 distributing MIMO communications streams to support 2×2 MIMO communications services. MIMO communications involves the use of multiple antennas at both a transmitter and receiver to improve communication performance. Remote unit 318(1) is shown in FIG. 5A and is used as an example to represent any of the remote units 318(1)-318(X) in the DCS 300. FIG. 5B is a schematic diagram illustrating more detail of a downlink path and uplink path and related components of the remote unit 318(1) in the DAS 300 illustrated in FIG. 5A for supporting MIMO communications services. Common components illustrated for the DCS 300 in FIGS. 5A and 5B and FIGS. 3-4B are shown with common element numbers with FIGS. 5A and 5B and thus will not be re-described.

With reference to FIG. 5A, the central unit 306 is configured to receive electrical downlink MIMO communications signals 308D-M from outside the DCS 300 in a signal processor 500. The central unit 306 is also configured to distribute electrical uplink MIMO communications signals 308U-M, received from a wireless client device 502, to other systems. The signal processor 500 may be configured to provide the electrical downlink MIMO communications signals 308D-M to a mixer 504, which may be an IQ signal mixer in this example. The mixer 504 is configured to convert the electrical downlink MIMO communications signals 308D-M to IQ signals in one example. The mixer 504 is driven by a frequency signal 506 that is provided by a local oscillator 508. Frequency conversion is optional. In this embodiment, it is desired to up-convert the frequency of the electrical downlink MIMO communications signals 308D-M to a higher frequency to provide electrical downlink MIMO communications signals 312D-M(E) to provide for a greater bandwidth capability before distributing the electrical downlink MIMO communications signals 312D-M(E) to the remote unit 318(1). For example, the up-conversion carrier frequency may be provided as an extremely high frequency (e.g., approximately 30 GHz to 300 GHz).

With continuing reference to FIG. 5A, because the communication medium between the central unit 306 and the remote unit 318(1) is the optical fiber communications medium 314D, 314U in this example, the electrical downlink MIMO communications signals 312D-M(E) are converted to optical signals by an electro-optical converter 510. The electro-optical converter 510 includes components to receive a light wave 512 from a light source 514, such as a laser. The light wave 512 is modulated by the frequency oscillations in the electrical downlink MIMO communications signals 312D-M(E) to provide optical downlink MIMO communications signals 312D-M(O) over the downlink optical fiber 314D to the remote unit 318(1). The electro-optical converter 510 may be provided so that the electrical downlink MIMO communications signals 312D-M(E) are provided as radio-over-fiber (RoF) communications signals.

With continuing reference to FIG. 5A, the optical downlink MIMO communications signals 312D-M(O) are received by an optical bi-directional amplifier 516, which is then provided to a MIMO splitter circuit 518 in the remote unit 318(1). The MIMO splitter 518 is provided so that the optical downlink MIMO communications signals 312D-M(O) can be split among two separate downlink communication paths 520(1), 520(2) to be radiated over two separate MIMO antennas 322(1)(1), 322(1)(2) provided in two separate MIMO transmitters 522(1), 522(2) configured in MIMO configuration. The MIMO antennas 322(1)(1), 322(1)(2) are configured to be bonded, meaning that both MIMO antennas 322(1)(1), 322(1)(2) are co-located within the same remote unit 318(1) to each provide substantially overlapping MIMO coverage areas designed to support MIMO communications with a particular wireless client device 502 in communications range of their MIMO coverage areas. The MIMO splitter circuit 518 in the remote unit 318(1) is an optical splitter since the received optical downlink MIMO communications signals 312D-M(O) are optical signals. In each downlink communication path 520(1), 520(2), downlink optical-to-electrical converters 524D(1), 524D(2) are provided to convert the optical downlink MIMO communications signals 312D-M(O)(1), 312D-M(O)(2) to electrical downlink MIMO communications signals 308D-M(1), 308D-M(2). The uplink path of the communications paths 520(1), 520(2) in the remote unit 318(1) is illustrated in FIG. 5B. As illustrated in FIG. 5B, uplink electrical-to-optical converters 524U(1), 524U(2) are also provided in the remote unit 318(1) to convert electrical uplink MIMO communications signals 308U-M(1), 308U-M(2) received from the wireless client device 502 to optical uplink MIMO communications signals 312U-M(O)(1), 312U-M(O)(2) to be communicated over the uplink optical fiber 314U(1), 314U(2) to the central unit 306.

With reference back to FIG. 5A, the wireless client device 502 includes two MIMO receivers 528(1), 528(2) that include MIMO receiver antennas 530(1), 530(2) also configured in MIMO configuration. The MIMO receiver antennas 530(1), 530(2) are configured to receive the electrical downlink MIMO communications signals 308D-M(1), 308D-M(2) wirelessly from the remote unit 318(1). Mixers 532(1), 532(2) are provided and coupled to the MIMO receiver antennas 530(1), 530(2), respectively, in the wireless client device 502 to provide frequency conversion of the electrical downlink MIMO communications signals 308D-M(1), 308D-M(2). A local oscillator 534 is provided that is configured to provide oscillation signals 536(1), 536(2) to the mixers 532(1), 532(2), respectively, for frequency conversion. In this embodiment, the electrical downlink MIMO communications signals 308D-M(1), 308D-M(2) are down converted back to their native frequency as received by the central unit 306. The down converted electrical downlink MIMO communications signals 308D-M(1), 308D-M(2) are then provided to a signal analyzer 538 in the wireless client device 502 for any processing desired.

Even with the potential doubling of bandwidth in the DCS 300 in FIGS. 5A and 5B by being configured to support MIMO communications services, the wireless client device 502 must still be within range of two antennas 322(1), 322(2) of a remote unit 318 (e.g., antennas 322(1)(1), 322(1)(2) of remote unit 318(1)) to properly operate in MIMO configuration with increased bandwidth. Otherwise, the full benefits of increased bandwidth of MIMO technology provided in the DCS 300 may not be realized. Ensuring uniform MIMO coverage in coverage areas of the DCS 300 may be particularly important for newer cellular standards, such as Long Term Evolution (LTE), where increased bandwidth requirements are expected by users of client devices 502 in all coverage areas. Thus, it is desired to provide uniform coverage areas in a DCS, such as DCS 300, particularly in the edges of MIMO coverage cells. However, as discussed above, providing traditional MIMO remote unit bonding between co-located remote units 318 in the DCS 300 in FIGS. 5A and 5B may still provide non-uniform MIMO coverage areas unless a high density of remote units 318 are provided, thereby increasing cost and complexity.

In this regard, FIG. 6 is a schematic diagram of exemplary adjacent remote units 318(1), 318(2) in the DCS 300 in FIGS. 5A and 5B, having exemplary substantially non-overlapping remote coverage areas 600(1), 600(2) and located a defined distance $D_1$ from each other to be capable of being interleaved MIMO cell bonded together to support interleaved MIMO communications services. For example, if a wireless client device 502 receives a downlink communications signal from a remote unit 318(1), 318(2) greater than 12 dB for example, the wireless client device 502 may engage in SISO communications with a remote unit 318(1), 318(2). However, if a wireless client device 502 receives a downlink communications signal from a remote unit 318(1), 318(2) less than 12 dB for example, the wireless client device 502 may engage in interleaved MIMO communications with the remote units 318(1), 318(2), which may be achievable at distance $D_1$ such that the remote coverage areas 600(1), 600(2) are substantially non-overlapping. Note that FIG. 6 illustrates two remote units 318(1), 318(2), but the interleaved MIMO cell bonded remote units could be any of the remote units 318(1)-318(X) in the DCS 300.

In this example, the interleaved MIMO communication services are 2×2 MIMO communications services. Interleaved MIMO communications services in this example involves configuring the adjacent remote units 318(1), 318(2) separated by the prescribed distance $D_1$ in the DCS 300 to have respective, adjacent, substantially non-overlapping remote coverage areas 600(1), 600(2) to each receive a MIMO communications stream 602(1), 602(2). The MIMO communications streams 602(1), 602(2) are MIMO communications signals that are directed to the same wireless client device 502 to provide MIMO communications services. In this regard, the MIMO communications signals distributed by the central unit 306 to the respective remote units 318(1), 318(2) include downlink optical MIMO communications signals 312D-M(1), 312D-M(2) as also previously illustrated in FIG. 5A. The remote units 318(1), 318(2) are configured to distribute the downlink optical MIMO communications signals 312D-M(1), 312D-M(2) as downlink electrical MIMO communications signals 308D-M(1), 308D-M(2) in the respective remote coverage areas 600(1), 600(2) to a wireless client device 502. The MIMO communications signals can also include uplink electrical MIMO communications signals 308U-M(1), 308U-M(2) received by the remote units 318(1), 318(2) from a wireless client device 502 to be distributed by the respective remote units 318(1), 318(2) as uplink electrical MIMO communications signals 308U-M(1), 308U-M(2) to the central unit 306. The remote unit 318(1) supports communicating the MIMO communications stream 602(1) in its remote coverage area 600(1), and the remote unit 318(2) supports communicating the MIMO communications streams 602(2) in its respective remote coverage area 600(2). If a wireless client device 502 is outside of the remote coverage area 600(1), 600(2) of one remote unit 318(1), 318(2), but not the other, the wireless client device 502 can still communicate with the in-range remote unit 318(1), 318(2) for SISO communications services.

Figure 7:
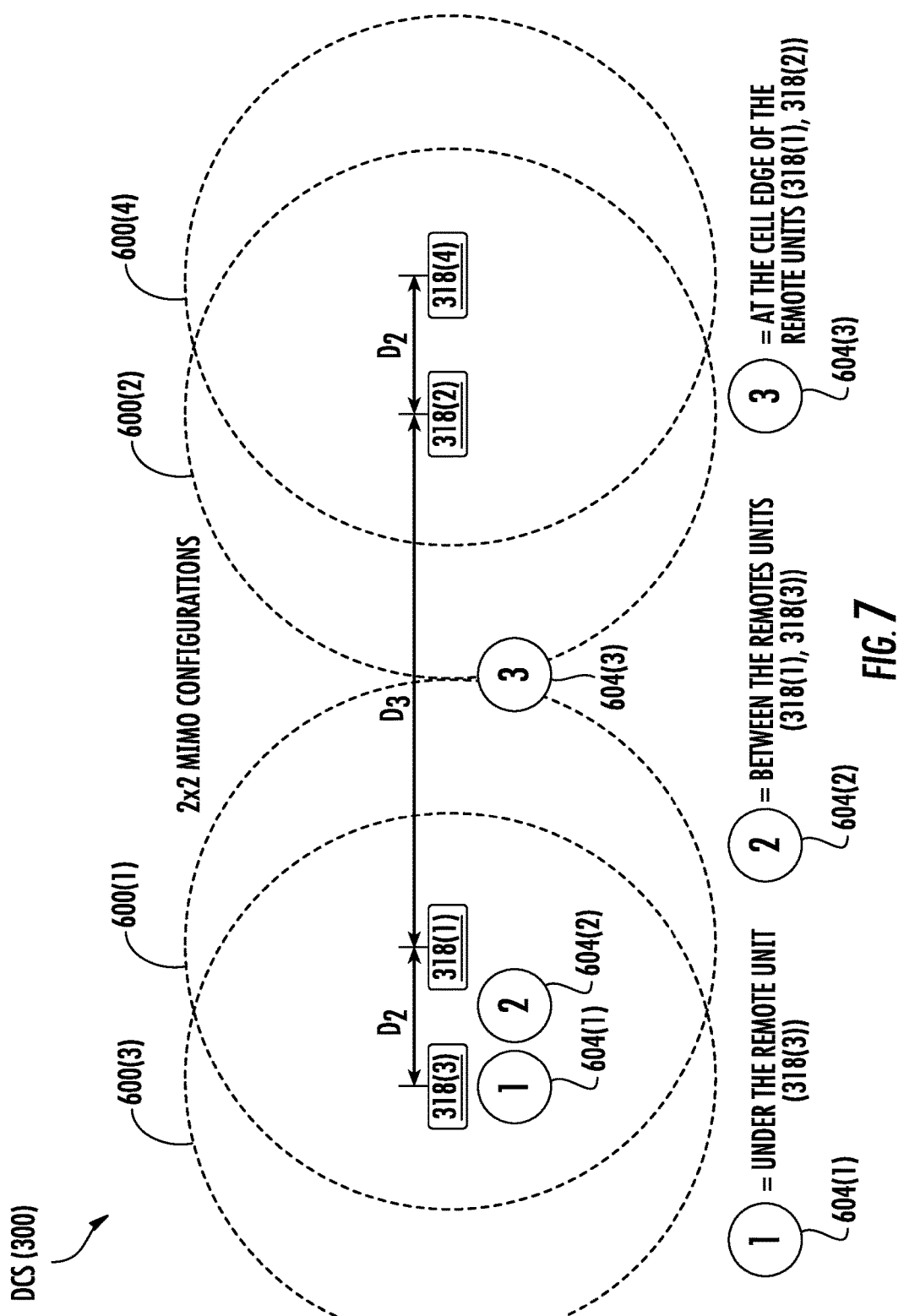
FIG. 7 is a schematic diagram of exemplary adjacent remote units in a DCS, such as the DCS in FIGS. 5A and 5B, located a defined distance from each other to show both traditional and interleaved MIMO cell bonding to support both SISO and interleaved MIMO communications services.

FIG. 7 is a schematic diagram of the adjacent remote units 318(1)-318(4) in the DCS 300 in FIG. 6 to further describe interleaved MIMO cell bonding that occurs between the remote units 318(1)-318(4) based on the distances $D_2$ and $D_3$ between the remote units 318(1)-318(4). Remote units 318(1), 318(3) are co-located with each other at distance $D_2$ such that their respective remote coverage areas 600(1), 600(3) are substantially overlapping. Remote units 318(2), 318(4) are shown co-located with each other by distance $D_2$ (e.g., within 2 meters), which is also close enough to each other such that their respective remote coverage areas 600(2), 600(4) are substantially overlapping to provide 100% MIMO coverage in this example. For example, area 604(1) is underneath remote unit 318(3), which is in both remote coverage areas 600(1), 600(3). Area 604(2) is between the remote units 318(1), 318(3), which is also in both remote coverage areas 600(1), 600(3). As an example, distance $D_2$ of six (6) meters or less may provide for the remote units 318(1), 318(3) to provide 100% MIMO coverage for client devices within their remote coverage areas 600(1), 600(3) and provide for the remote units 318(2), 318(4) to provide 100% MIMO coverage for client devices within their remote coverage areas 600(2), 600(4).

Alternatively, as another example, remote units 318(1), 318(2) can be located a distance $D_3$ (e.g., >6 meters apart) still close enough to each other such that their respective remote coverage areas 600(2), 600(4) are not substantially overlapping to still provide MIMO coverage even if less than 100% MIMO coverage. For example, assume that only remote units 318(1) and 318(2) were illustrated in FIG. 7 and located a distance $D_3$ apart from each other (e.g., >=12 meters (m)), greater than distance $D_2$ such that their respective remote coverage areas 600(1), 600(2) are overlapping, but not substantially overlapping. At this distance $D_3$, remote units 318(1), 318(2) can still achieve interleaved MIMO cell bonding, but at a reduced MIMO coverage. For example, at distance $D_3$ of approximately six (6) m to twenty-two (22) m, the remote units 318(1), 318(2) with their remote coverage areas 600(1), 600(2) may still provide 65% to 95% MIMO coverage through interleaved MIMO cell bonding even though their respective remote coverage areas 600(1), 600(2) are substantially non-overlapping. This reduced MIMO coverage may be an acceptable tradeoff to provide MIMO coverage in a DCS, such as DCS 300, with fewer remote units 318 deployed to save cost and/or complexity.

Figure 8:
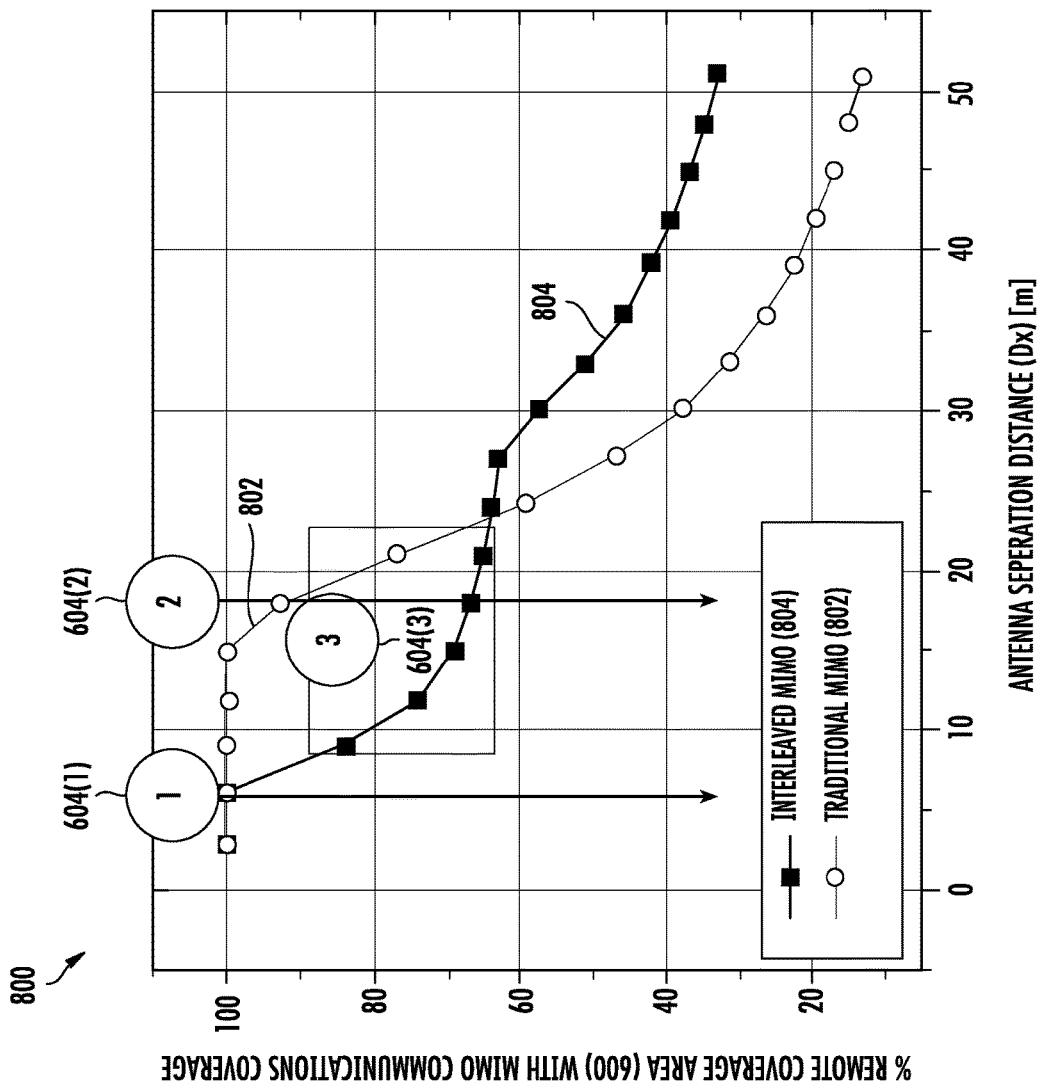
FIG. 8 is a graph illustrating an exemplary percentage of remote coverage area of the remote units in FIG. 7 supporting MIMO communications services as a function of distance between the remote units for both traditional and interleaved MIMO cell bonding.

FIG. 8 is a graph 800 that illustrates an exemplary percentage of the remote coverage area 600 for MIMO communications services as a function of distance $D_X$ between the remote units 318(1)-318(X). Line 802 shows the percentage of remote coverage area 600 supporting MIMO communications services for a traditional MIMO communications service, such as between remote units 318(1), 318(3) and between remote units 318(2), 318(4) in FIG. 7. For example, according to line 802 in FIG. 8, approximately 80% of the remote coverage areas 600(1), 600(3) support traditional MIMO communications services when the remote units 318(1), 318(3) are located from each other at distance $D_2$ within approximately six (6) meters.

With reference back to FIG. 7, it has been discovered that when remote units 318(1), 318(X), such as the remote units 318(1), 318(2) are not co-located and located further away at prescribed distance $D_3$ such that their respective remote coverage areas 600(1), 600(2) are substantially non-overlapping, interleaved MIMO communications services can still be achieved. Interleaved MIMO cell bonding occurs between the remote units 318(1), 318(2) by their remote coverage areas 600(1), 600(2) overlapping, but not substantially overlapping in this example. For example, area 604(3) is an area wherein the remote coverage areas 600(1), 600(2) overlap at the cell edge of the remote coverage areas 600(1), 600(2) of the remote units 318(1), 318(2). This is shown by example in the graph 800 in FIG. 8, where line 804 shows the percentage of remote coverage area 600 for MIMO communications services for an interleaved MIMO communications service, such as between remote units 318(1), 318(2) in FIG. 7. For example, according to line 804 in FIG. 8, approximately 65% of the remote coverage areas 600(1), 600(2) support MIMO communications services when the remote units 318(1), 318(2) are located from each other at distance $D_3$ within approximately eight (18) meters. SISO communications services are still supported by the remote units 318(1), 318(2) even for the 35% of the remote coverage areas 600(1), 600(2) that do not support MIMO communications services. The size of the remote coverage areas 600(1), 600(2) supporting interleaved MIMO communications services formed by the interleaved MIMO cell bonding between the remote units 318(1), 318(2) is a function of the distance $D_X$ between the remote units 318(1), 318(2), because this distance affects the signal quality level required by a wireless client device to receive the MIMO communications streams 600(1), 600(2). If a wireless client device does not have an acceptable and/or higher communications signal quality with the antenna of a single remote unit 318(1), 318(2), the wireless client device will engage in SISO communications with the remote unit 318(1), 318(2). However, if a wireless client device does not have acceptable and/or higher communications signal quality with a single remote unit 318(1), 318(2), the wireless client device will engage in interleaved MIMO communications through the interleaved MIMO cell bonded remote units 318(1), 318(2).

Thus, interleaved MIMO cell bonding between the remote units 318(1), 318(2) allows MIMO communications services to still be supported in the DCS 300 without having to necessarily co-locate the remote units 318(1), 318(2), or provide multiple radios in each remote unit 318(1), 318(2)

to achieve sufficient MIMO communication services, thus reducing cost and complexity. Thus, MIMO communications services can be provided in the DCS 300 with less remote units 318(1)-318(X). This also allows an existing infrastructure of installed remote units 318(1)-318(X) configured to support SISO communications, to support interleaved MIMO communication services, based on a trade-off of the number of remote units 318(1)-318(X) and distance $D_X$ therebetween versus percentage of their remote coverage areas 600 that support MIMO communications services. More sparse and lower cost remote unit deployments can still provide substantially uniform high-capacity MIMO communications coverage.

An existing infrastructure of installed remote units in a DCS configured to support SISO communications, such as the remote units 318(1)-318(X) in the DCS 300 in FIGS. 5A and 5B, can be configured or re-configured to support interleaved MIMO communication services taking the example of FIG. 6 if the DCS 300 can be configured or re-configured to route MIMO communications streams 602(1), 602(2). In this regard, FIG. 9A is a schematic diagram 900(1) illustrating a configuration of the remote units 318(1)-318(X) that can be provided in DCS 300 in FIG. 5A to support SISO communications streams to designated remote units 318(1)-318(X) in the DCS 300. Each circle 'A' represents a single remote unit 318 and its remote coverage area 600 receiving MIMO communications stream A. However, as shown in the schematic diagram 900(2) in FIG. 9B, the same number of remote units 318(1)-318(X) and their respective locations are provided, but the remote units 318(1)-318(X) are configured to support 2×2 interleaved MIMO communications services. The MIMO communications streams 'A' and 'B' are routed to the remote units 318(1)-318(X) interleaved to provide a 2×2 interleaved MIMO cell bonding configuration to support 2×2 interleaved MIMO communications services. Thus, by simply re-routing the MIMO communications streams 'A' and 'B' to the existing remote units 318(1)-318(X) in FIG. 9A, the remote units 318(1)-318(X) can be configured to migrate from only supporting SISO communications services to 2×2 interleaved MIMO communications services.

Even further, FIG. 9C is a schematic diagram 900(3) illustrating an exemplary 4×4 interleaved MIMO cell bonding configuration that can be configured and/or re-configured in the DCS 300 in FIG. 5A based on configuring and/or re-configuring the distribution of MIMO communications streams 602 to designated remote units 318(1)-318(X) in the DCS 300. Again, the same number of remote units 318(1)-318(X) and their respective locations are provided, but the remote units 318(1)-318(X) are configured to support 4×4 interleaved MIMO communications services. The MIMO communications streams 'A', B', 'C', and 'B' are routed to the remote units 318(1)-318(X) interleaved to provide a 4×4 interleaved MIMO cell bonding configuration to support 4×4 interleaved MIMO communications services. Thus, by simply re-routing the MIMO communications streams MIMO communications streams 'A', 'B', 'C', and 'D' to the existing remote units 318(1)-318(X) in FIG. 9A or 9B, the remote units 318(1)-318(X) can be configured to migrate from only supporting SISO communications services, or 2×2 interleaved MIMO communications services, to 4×4 interleaved MIMO communications services.

To configure or re-configure the DCS 300 to support the desired communications services, whether it be SISO communications services or interleaved MIMO communication services, the DCS 300 provides different physical layers that are maintained from the central unit 306 to the remote units 318(1)-318(X). In this manner, the central unit 306 can be configured or reconfigured to distribute communications signals, to the desired physical layers in the DCS 300 to in turn distribute the communications signals to the desired remote units 318(1)-318(X) to provide the desired communications services. In this manner, as an example, interleaved MIMO communications services can be configured for the DCS 300 using an existing infrastructure of remote units 318(1)-318(X) having substantially non-overlapping remote coverage areas 600(1)-600(X), by directing the MIMO communications streams over the configured physical layers to be provided to the desired remote units 318(1)-318(X) to facilitate interleaved MIMO cell bonding of adjacent remote units 318(1)-318(X). For example, substantially non-overlapping coverage areas may mean that the coverage areas do not overlap by more than 70%, 60%, 50%, or less than 50% as examples.

Figure 10A:
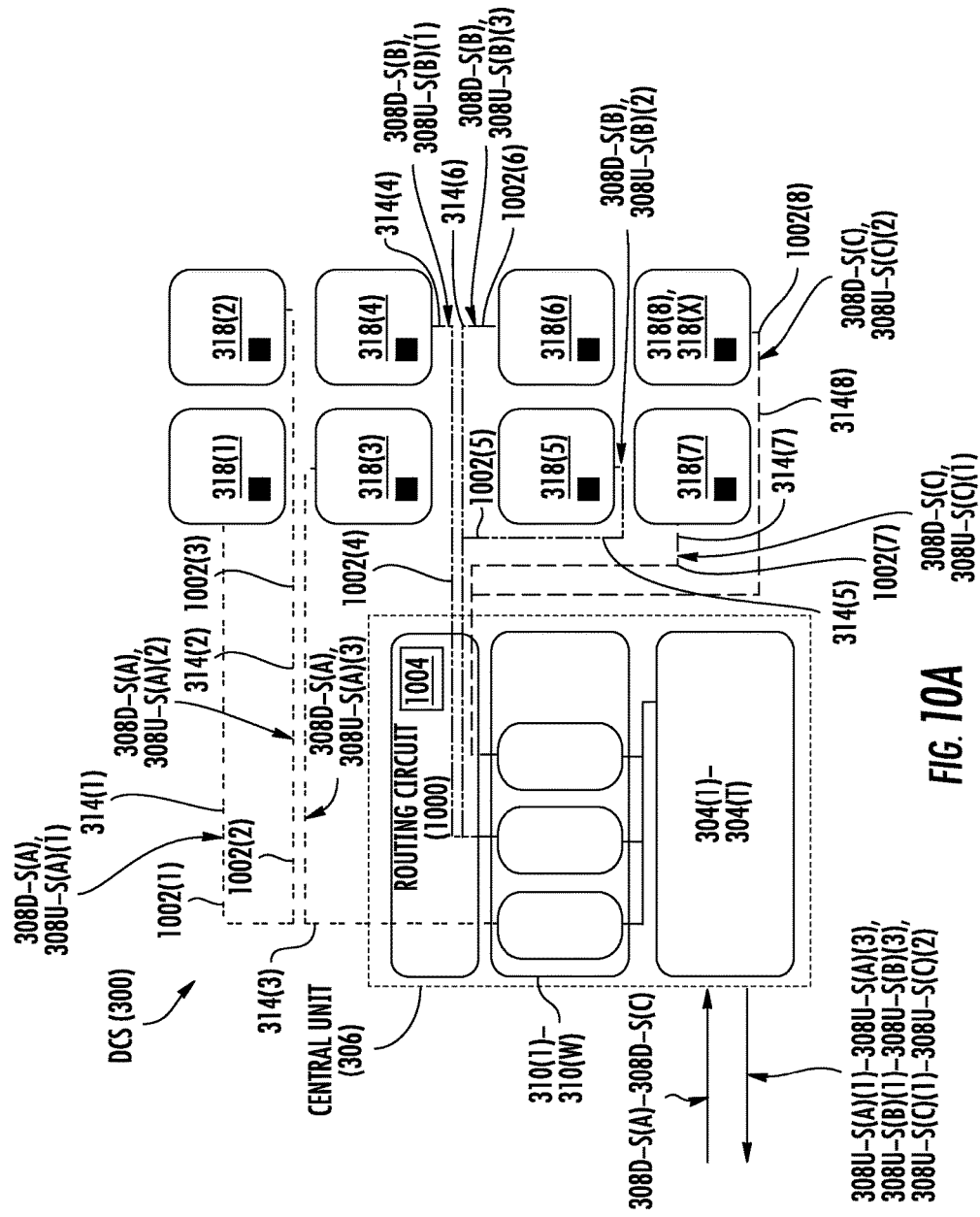
FIG. 10A is a schematic diagrams illustrating the DCS in FIGS. 5A and 5B configured to support distribution of SISO communications streams to remote units to support SISO communication services.
Figure 10B:
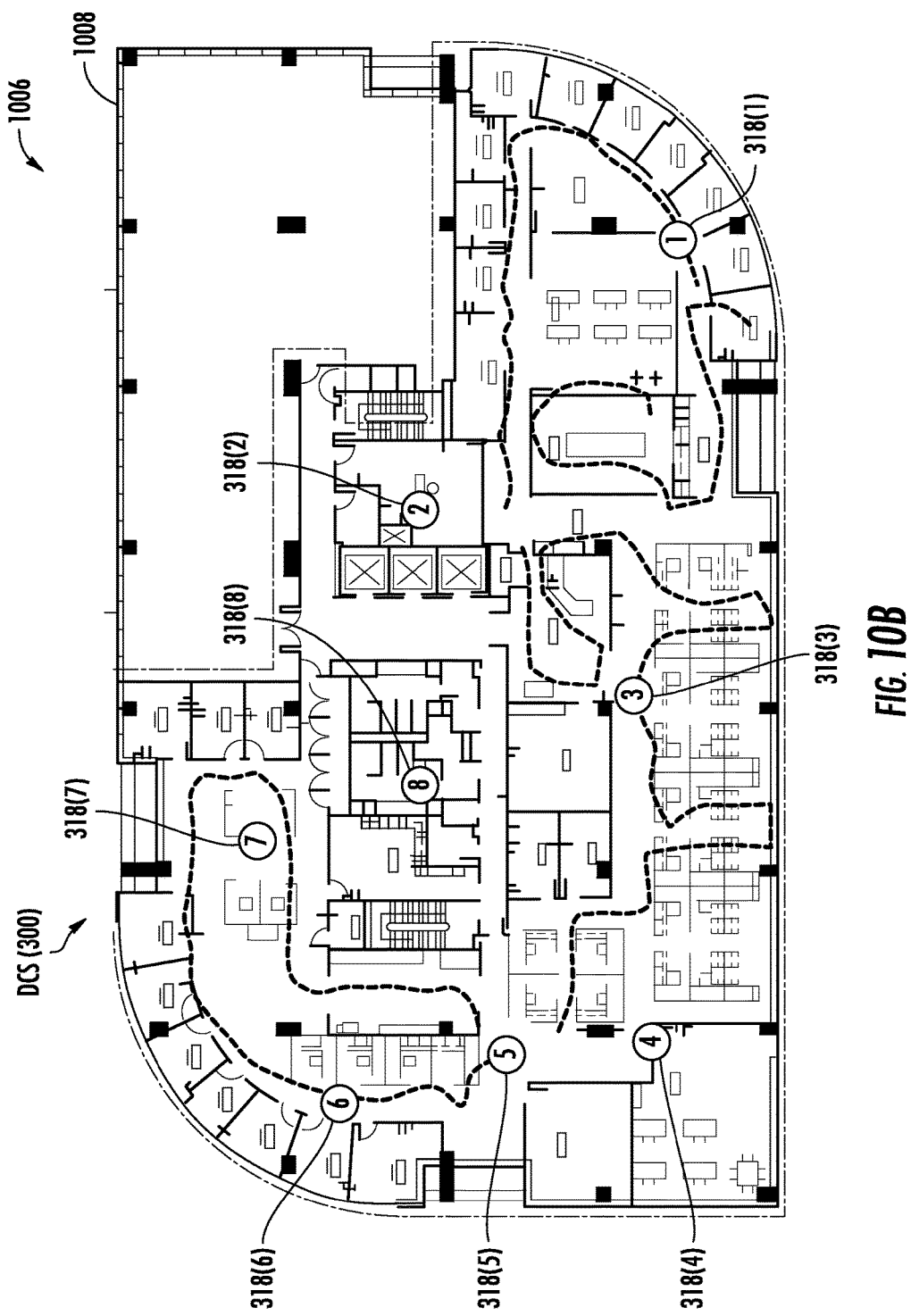
FIG. 10B is a schematic diagram of a building layout employing the DCS in FIG. 10A configured to support distribution of SISO communications streams to remote units to support SISO communication services.

In this regard, FIG. 10A is a schematic diagram illustrating the DCS 300 in FIGS. 5A and 5B configured to support distribution of SISO communications streams to remote units 318(1)-318(X), 318(8) (where 'X'=8 in this example) to support SISO communication services. The remote units 318(1)-318(8) are installed in the DCS 300 according to the desired locations and desired separation distances (e.g., between 12-15 meters) to provide the desired remote coverage areas. The central unit 306 is configured to receive downlink SISO communications signals 308D-S(A)-308D-S(C) from a signal source, such as a base transceiver station (BTS) or baseband unit (BBU) as examples, where each downlink SISO communications signals 308D-S(A)-308D-S(C) represents a particular communications band 'A', 'B', 'C' for a particular communications service. As previously discussed in regard to FIG. 3, the central unit 306 includes the radio interface circuits 304(1)-304(T) that are configured receive and process the received downlink SISO communications signals 308D-S(A)-308D-S(C). As also discussed in regard to FIG. 3, in this example, the central unit 306 also includes the optical interface circuits 310(1)-310(W) to convert the received downlink SISO communications signals 308D-S(A)-308D-S(C) into optical downlink SISO communications signals 308D-S(A)-308D-S(C). A routing circuit 1000 is also provided, which may also be in the central unit 306, to route the downlink SISO communications signals 308D-S(A)-308D-S(C) to the desired remote units 318(1)-318(8), 318(X) (where 'X'=8 in this example) according to a routing configuration 1004 for the DCS 300. In this regard, the DCS 300 includes physical layers 1002(1)-1002(8) dedicated to each of the remote units 318(1)-318(8). Each physical layer 1002(1)-1002(8) is dedicated to one remote unit 318(1)-318(8) and maintained from the central unit 306 to the remote units 318(1)-318(8) in a one-to-one connectivity in this example. In this example, the physical layers 1002(1)-1002(8) are the dedicated communications links in the form of optical fiber communications links 314(1)-314(8). The physical layers 1002(1)-1002(8) can be downlink physical layers only dedicated to carrying downlink communications signals to the remote units 318(1)-318(8) or also configured to carry uplink communications signals from the remote units 318(1)-318(8) to the central unit 306. Each optical fiber communications link 314(1)-314(8) can separate optical fiber communications links for carrying downlink and uplink communications signals separately as shown in FIG. 3, or a single optical fiber communications link for carrying uplink and downlink communications signals. For example, FIG. 10B is a schematic diagram illustrating a communications services layout 1006 of remote units 318(1)-318(8) in the DCS 300 in FIG.

10A installed in a building 1008. The remote units 318(1)-318(8) are located in building 1008 according to the desired locations to provide the desired remote coverage areas.

With reference back to FIG. 10A, the routing circuit 1000 is configured to control the routing of the optical interface circuits 310(1)-310(W) to the physical layers 1002(1)-1002(8) according to the routing configuration 1004 to control which downlink SISO communications signals 308D-S(A)-308D-S(C) are routed to the remote units 318(1)-318(8). The routing circuit 1000 controls the spatial deployment of communications signals to the remote units 318(1)-318(8). In this example, the HEC 362 as shown in FIG. 4B may be configured to program the routing configuration 1004 of the routing circuit 1000. The routing configuration 1004 may be stored in a memory or other circuit settings. In this example, the routing configuration 1004 is configured to cause the routing circuit 1000 to route the downlink SISO communications signals 308D-S(A) to remote units 318(1)-318(3), the downlink SISO communications signals 308D-S(B) to remote units 318(4)-318(6), and the downlink SISO communications signals 308D-S(C) to remote units 318(7)-318(8). The remote units 318(1)-318(8) are also configured to receive and distribute received respective uplink SISO communications signals 308U-S(A)(1)-308U-S(A)(3), 308U-S(B)(1)-308U-S(B)(3), 308U-S(C)(1)-308U-S(C)(2) over the respective dedicated physical layers 1002(1)-1002(8) to the central unit 306 to be distributed back to a network, such as BTS or BBU. The routing circuit 1000 routes the received uplink SISO communications signals 308U-S(A)(1)-308U-S(A)(3), 308U-S(B)(1)-308U-S(B)(3), 308U-S(C)(1)-308U-S(C)(2) from the dedicated physical layers 1002(1)-1002(8) to particular radio interface circuits 304(1)-304(T) according to the routing configuration 1004.

It may be desired for DCS 300 in FIG. 10A to support MIMO communications services, such as 2×2 MIMO communications services. It may be desired to configure the DCS 300 in FIG. 10A to support MIMO communications without having to change the location of the remote units 318(1)-318(X). In this regard, by changing the routing configuration 1004 to provide for interleaved MIMO cell bonding between adjacent remote units 318(1)-318(8) as previously discussed, it may be possible to re-configure the DCS 300 to support MIMO communications without having to change the location of the remote units 318(1)-318(8) or with minimal relocating or providing of additional remote units 318(1)-318(8). This provides an upgrade path for customers of the DCS 300 in FIG. 10A should, for example, only SISO communications services be initially desired to be supported, but then MIMO communications services may be desired to be supported in the future.

Figure 11A:
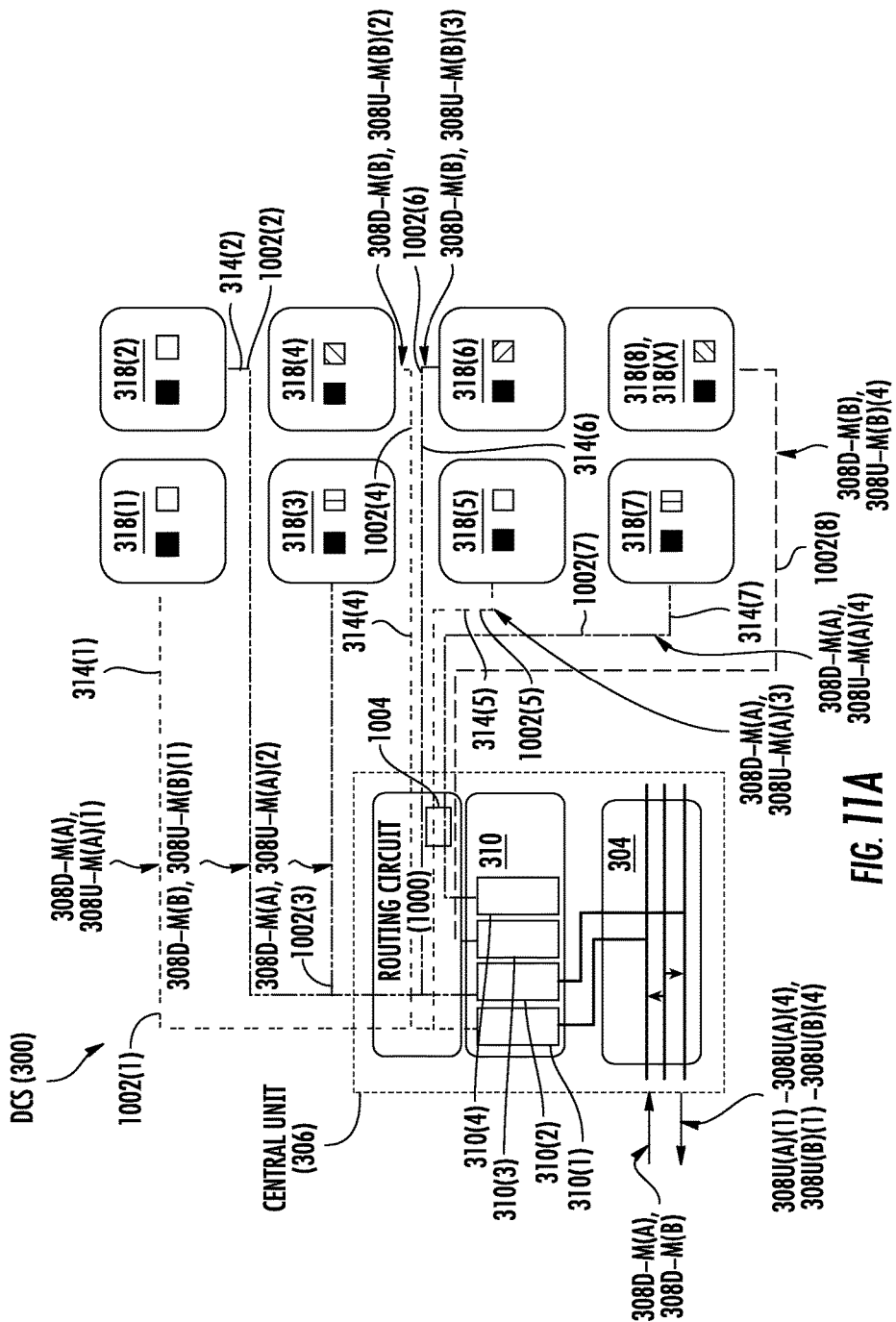
FIG. 11A is a schematic diagram illustrating the DCS in FIG. 10A re-configured to support interleaved distribution of MIMO communications streams to remote units to provide 2×2 interleaved MIMO communication services.

In this regard, FIG. 11A is a schematic diagram illustrating the DCS 300 in FIGS. 5A and 5B configured to support distribution of SISO communications streams to remote units 318(1)-318(X), 318(8) (where 'X'=8 in this example) to support MIMO communications services. The remote units 318(1)-318(8) are installed in the DCS 300 according to the desired locations and desired separation distances (e.g., between 12-15 meters) to provide the desired remote coverage areas. The central unit 306 is configured to receive downlink MIMO communications signals 308D-M(A), 308D-M(B) for MIMO communications streams 'A' and 'B', such as from a BTS or BBU as examples. Each downlink MIMO communications signals 308D-M(A), 308D-M(B) represents a particular MIMO communications stream 'A', 'B' for a communications service. As previously discussed in regard to FIG. 3, the central unit 306 includes the radio interface circuits 304 that are configured to receive and process the received downlink MIMO communications signals 308D-M(A), 308D-M(B). This processing may include splitting the downlink MIMO communications signals 308D-M(A), 308D-M(B) so that each can be deployed to multiple remote units 318(1)-318(8) according to the routing configuration 1004. As also discussed in regard to FIG. 3, in this example, the central unit 306 also includes the optical interface circuits 310 to convert the received downlink MIMO communications signals 308D-M(A), 308D-M(B) into optical downlink MIMO communications signals 308D-M(A), 308D-M(B). The routing circuit 1000 is configured to route the downlink MIMO communications signals 308D-M(A), 308D-M(B) to the desired remote units 318(1)-318(8), 318(X) (where 'X'=8 in this example) according to the routing configuration 1004 for the DCS 300. In this regard, the DCS 300 includes the physical layers 1002(1)-1002(8) dedicated to each of the remote units 318(1)-318(8). The physical layers 1002(1)-1002(8) dedicated to each of the remote units 318(1)-318(8) are maintained from the central unit 306 to the remote units 318(1)-318(8). In this example, the physical layers 1002(1)-1002(8) are the dedicated communications links in the form of optical fiber communications links 314(1)-314(8). Each optical fiber communications link 314(1)-314(8) can separate optical fiber communications links for carrying downlink and uplink communications signals separately as shown in FIG. 3, or a single optical fiber communications link for carrying uplink and downlink communications signals.

Figure 11B:
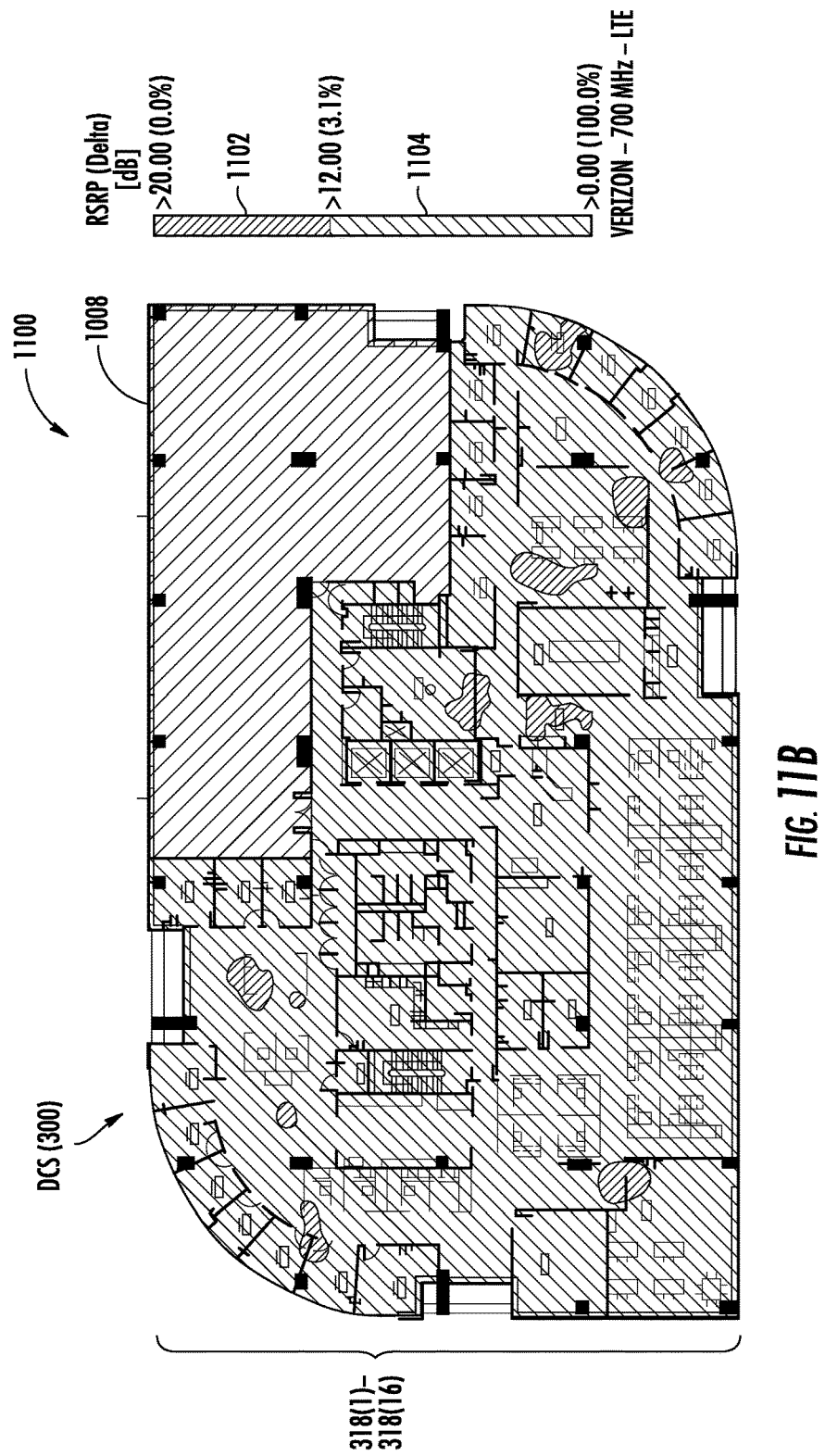
FIGS. 11B and 11C are schematic diagrams of exemplary building layouts employing the DCS in FIG. 11A configured to support interleaved distribution of MIMO communications streams to remote units to provide 2×2 interleaved MIMO communication services.

For example, FIG. 11B is a schematic diagram illustrating a communications services layout 1100 of sixteen (16) remote units 318(1)-318(16) in the DCS 300 in FIG. 11A installed in the building 1008. The remote units 318(1)-318(16) may be located in building 1008 in the same configuration as in the communications services layout 1006 in FIG. 10B. In the communications services layout 1100, the remote units 318(1)-318(16) are located approximately 6 meters from each other. Areas 1102 in the building 1008 illustrated in FIG. 11B are areas where a wireless client device can receive a downlink communications signal from a remote unit 318(1)-318(16) above a threshold signal strength (e.g., reference signal receive power (RSRP)) sufficient to engage in SISO communications (e.g., >12 dB). Areas 1104 in the building 1008 illustrated in FIG. 11B are areas where a wireless client device cannot receive a downlink communications signal from a remote unit 318(1)-318(16) above a threshold signal strength sufficient to engage in SISO communications (e.g., <12 dB), and thus 2×2 interleaved MIMO communications are supported according to the interleaved MIMO communications configuration for the DCS 300 illustrated in FIG. 11A.

Figure 11C:
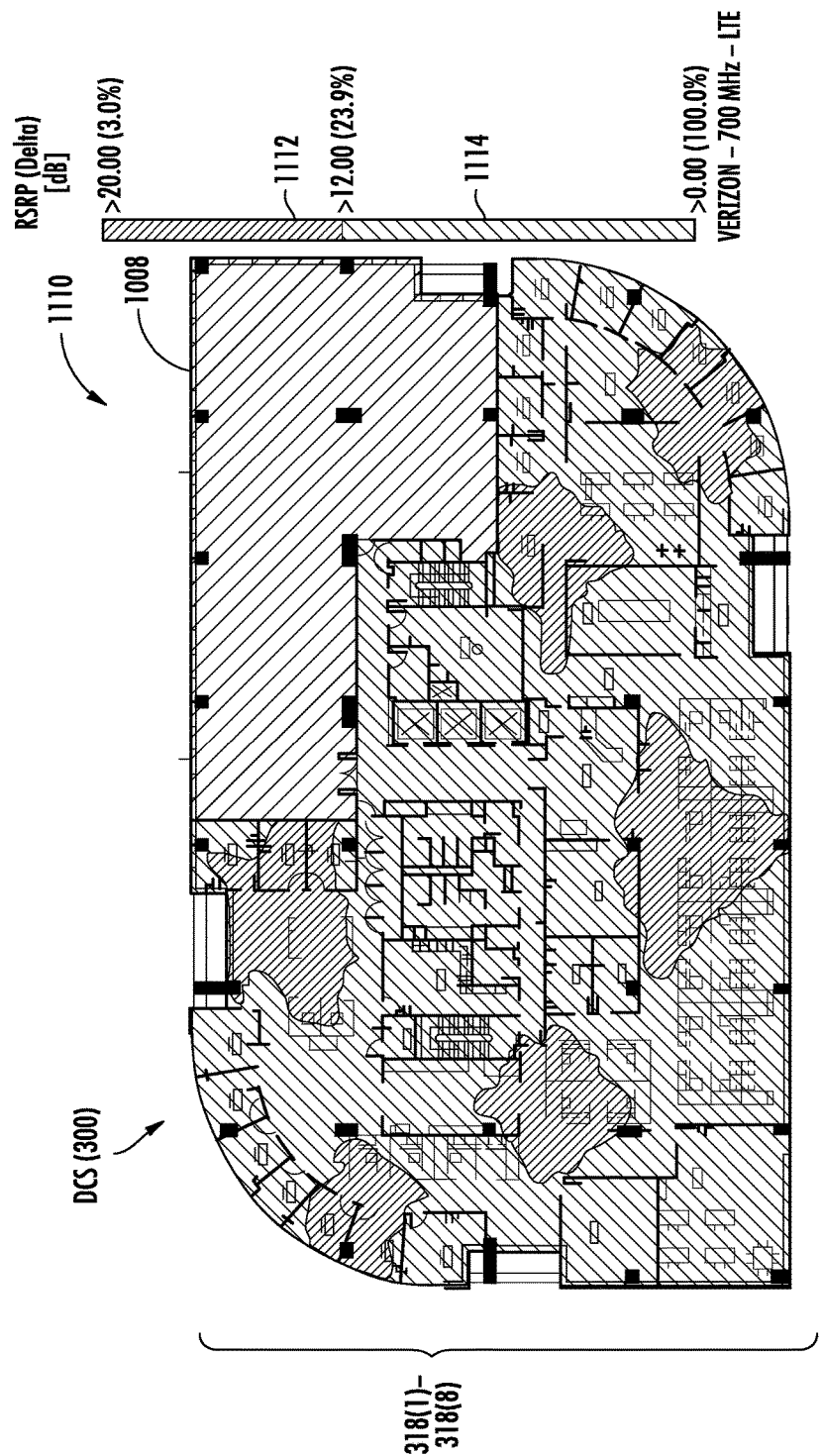

FIG. 11C is a schematic diagram illustrating another communications services layout 1110 of remote units 318(1)-318(8) in the DCS 300 in FIG. 11A installed in the building 1008. In the communications services layout 1110, the remote units 318(1)-318(8) are located approximately 12 meters from each other. Areas 1112 in the building 1008 illustrated in FIG. 11C are areas where a wireless client device can receive a downlink communications signal from a remote unit 318(1)-318(8) above a threshold signal strength (e.g., reference signal receive power (RSRP)) sufficient to engage in SISO communications (e.g., >12 dB). Areas 1114 in the building 1008 illustrated in FIG. 11C are areas where a wireless client device cannot receive a downlink communications signal from a remote unit 318(1)-318(8) above a threshold signal strength sufficient to engage in SISO communications (e.g., <12 dB), and thus 2×2 interleaved MIMO communications are supported according to the interleaved MIMO communications configuration for the DCS 300 illustrated in FIG. 11A. Note that the area 1114 in the building 1008 in FIG. 11C where 2×2 interleaved MIMO communications services are supported is smaller than the area 1104 in building 1008 in FIG. 11B, because the remote units 318(1)-318(8) are spaced farther apart in the building 1008 in FIG. 11C. For example, area 1104 in FIG. 11B wherein the 2×2 interleaved MIMO communications services is supported may be approximately 97% of the total areas 1102, 1104 where communication services are supported by the DCS 300, whereas area 1114 in FIG. 11C may be approximately 76% of the total areas 1112, 1114 where communication services are supported. Nevertheless, a 76% area supporting interleaved MIMO communications services is provided with approximately half of the number of remote units 318(1)-318(8), which may be an acceptable trade-off.

With reference back to FIG. 11A, the routing circuit 1000 is configured to control the routing of the optical interface circuits 310(1)-310(W) to the physical layers 1002(1)-1002(8) according to the routing configuration 1004 to control which downlink SISO communications signals 308D-S(A)-308D-S(C) are routed to the remote units 318(1)-318(8). In this example, the HEC 362 as shown in FIG. 4B may be configured to program the routing configuration 1004 of the routing circuit 1000. The routing configuration 1004 may be stored in a memory or other circuit settings. In this example, the routing configuration 1004 is configured to cause the routing circuit 1000 to route the downlink MIMO communications signals 308D-M(A) to remote units 318(1), 318(3), 318(5), 318(7), and the downlink MIMO communications signals 308D-M(B) to remote units 318(2), 318(4), 318(6), 318(8). In this regard, remote unit 318(1) is interleaved MIMO cell bonded to adjacent remote units 318(2), 318(3), remote unit 318(2) is interleaved MIMO cell bonded to adjacent remote units 318(1), 318(4), remote unit 318(3) is interleaved MIMO cell bonded to adjacent remote units 318(1), 318(4), as so on, as shown in FIG. 11A. The remote units 318(1)-318(8) are also configured to receive and distribute received respective uplink MIMO communications signals 308U-M(A)(1)-308U-M(A)(4), 308U-M(B)(1)-308U-M(B)(4) from the respective remote units 318(1), 318(3), 318(5), 318(7), 318(2), 318(4), 318(6), 318(8) over dedicated physical layers 1002(1)-1002(8) to the central unit 306 to be distributed back to a network, such as BTS or BBU. The routing circuit 1000 routes the received uplink MIMO communications signals 308U-M(A)(1)-308U-M(A)(4), 308U-M(B)(1)-308U-M(B)(4) from the dedicated physical layers 1002(1)-1002(8) to particular radio interface circuits 304(1)-304(T) according to the routing configuration 1004.

Note that while FIG. 11A shows downlink MIMO communications signals 308D-M(A) are routed to physical layers 1002(1), 1002(3), 1002(5), and 1002(7) distributed to to remote units 318(1), 318(3), 318(5), and 318(7), and downlink MIMO communications signals 308D-M(B) are routed to physical layers 1002(2), 1002(4), 1002(6), and 1002(8) to be distributed to remote units 318(2), 318(4), 318(6), and 318(8), it is also possible to route the same downlink MIMO communications signal (e.g., downlink MIMO communications signal 308D-M(A) and/or downlink MIMO communications signal 308D-M(B)) to the same physical layer 1002(1)-1002(8) to be routed to the same remote unit 318(1)-318(8). for example downlink MIMO communications signal 308D-M(A) and downlink MIMO communications signal 308D-M(B) could be routed to the same remote unit 318(1)-318(8) is configured to provide co-located MIMO communications services. Different groupings of downlink MIMO communications signal (e.g., downlink MIMO communications signal 308D-M(A) and/or downlink MIMO communications signal 308D-M(B)) can be routed to groupings of the remote units 318(1)-318(8).

It may also be desired for DCS 300 in FIG. 11A to support enhanced MIMO communications services, such as 4×4 MIMO communications services. It may be desired to configure the DCS 300 in FIG. 11A to support MIMO communications without having to change the location of the remote units 318(1)-318(X). In this regard, by changing the routing configuration 1004 to provide for interleaved MIMO cell bonding between adjacent remote units 318(1)-318(8) as previously discussed, it may be possible to re-configure the DCS 300 to support 4×4 MIMO communications without having to change the location of the remote units 318(1)-318(8) or with minimal relocating or providing of additional remote units 318(1)-318(8). This provides an upgrade path for customers of the DCS 300 in FIG. 11A should, for example, only 2×2 MIMO communications services be initially desired to be supported, but then 4×4 MIMO communications services may be desired to be supported in the future.

Figure 12:
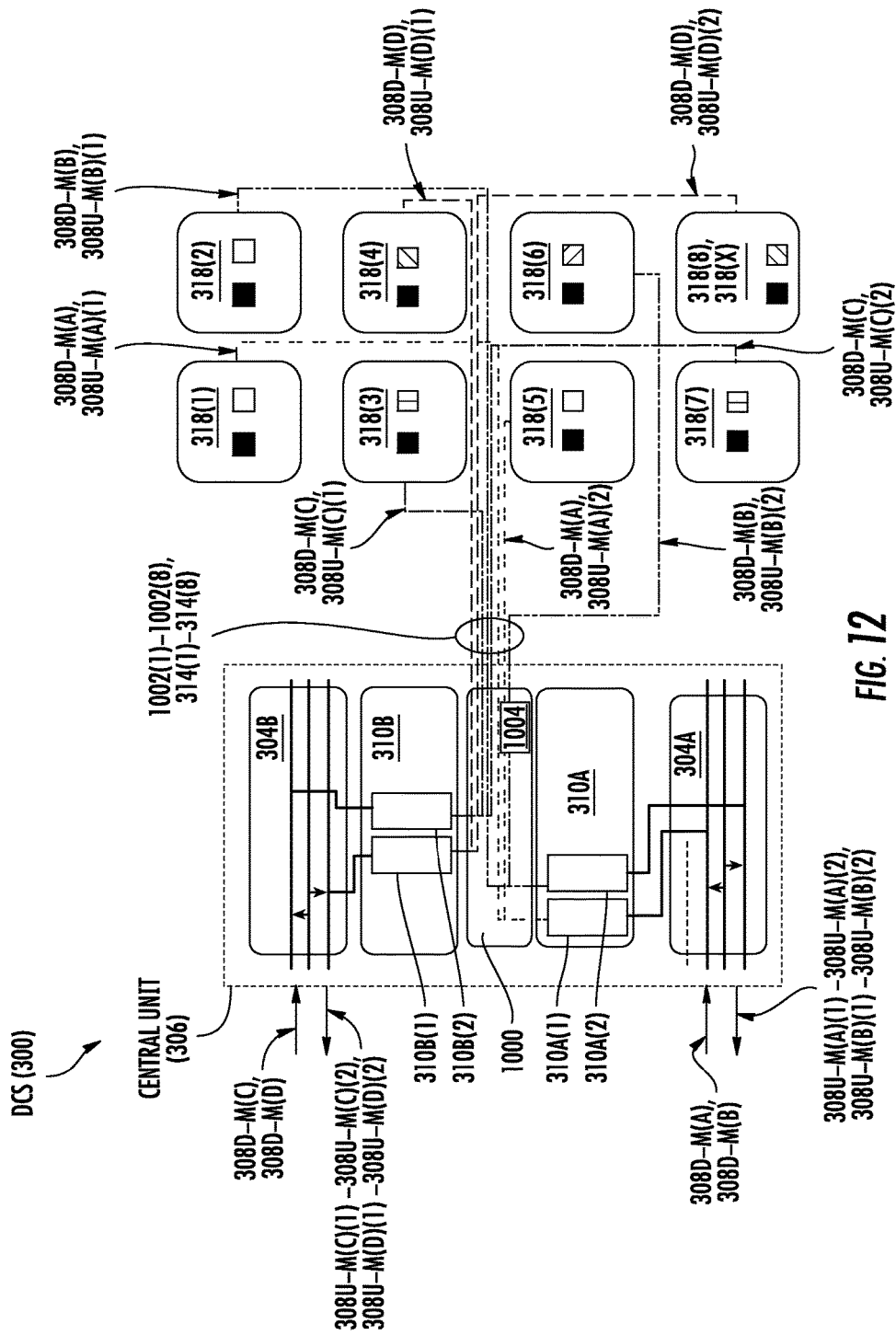
FIG. 12 is a schematic diagram illustrating the DCS in FIG. 11A re-configured to support interleaved distribution of MIMO communications streams to remote units to provide 4×4 interleaved MIMO communication services.

In this regard, FIG. 12 is a schematic diagram illustrating the DCS 300 in FIGS. 5A and 5B configured to support distribution of 4×4 interleaved MIMO communications streams to remote units 318(1)-318(X), 318(8) (where 'X'=8 in this example) to support MIMO communications services. The remote units 318(1)-318(8) are installed in the DCS 300 according to the desired locations and desired separation distances (e.g., between 12-15 meters) to provide the desired remote coverage areas. The central unit 306 is configured to receive downlink MIMO communications signals 308D-M(A)-308D-M(D) for MIMO communications streams 'A', 'B', 'C', and 'D' such as from a BTS or BBU as examples. Each downlink MIMO communications signal 308D-M(A)-308D-M(D) represents a particular MIMO communications stream 'A', 'B', 'C', and 'D' for a communications service. As shown in FIG. 12, the central unit 306 includes radio interface circuits 304A, 304B that are configured to receive and process the respective received downlink MIMO communications signals 308D-M(A), 308D-M(B) and 308D-M(C), 308D-M(D). As also illustrated in this example in FIG. 12, the central unit 306 includes the optical interface circuits 310A, 310B to convert the respective received downlink MIMO communications signals 308D-M(A), 308D-M(B), and 308D-M(C), 308D-M(D) into optical downlink MIMO communications signals 308D-M(A), 308D-M(B) and 308D-M(C), 308D-M(D). The routing circuit 1000 is configured to route the downlink MIMO communications signals 308D-M(A), 308D-M(B) and 308D-M(C), 308D-M(D) to the desired remote units 318(1)-318(8), 318(X) (where 'X'=8 in this example) according to the routing configuration 1004 for the DCS 300. In this regard, the DCS 300 includes the physical layers 1002(1)-1002(8) dedicated to each of the remote units 318(1)-318(8). The physical layers 1002(1)-1002(8) dedicated to each of the remote units 318(1)-318(8) are maintained from the central unit 306 to the remote units 318(1)-318(8). In this example, the physical layers 1002(1)-1002(8) are the dedicated communications links in the form of optical fiber communications links 314(1)-314(8). Each optical fiber communications link 314(1)-314(8) can separate optical fiber communications links for carrying downlink and uplink communications signals separately as shown in FIG. 3, or a single optical fiber communications link for carrying uplink and downlink communications signals.

With continuing reference to FIG. 12, the routing circuit 1000 is configured to control the routing of the optical interface circuits 310A, 310B to the physical layers 1002(1)-1002(8) according to the routing configuration 1004 to control which downlink MIMO communications signals 308D-M(A)-308D-M(D) routed to the remote units 318(1)-318(8). In this example, the HEC 362 as shown in FIG. 4B may be configured to program the routing configuration 1004 of the routing circuit 1000. The routing configuration 1004 may be stored in a memory or other circuit settings. In this example, the routing configuration 1004 is configured to cause the routing circuit 1000 to route the downlink MIMO communications signals 308D-M(A) to remote units 318(1) and 318(5), downlink MIMO communications signals 308D-M(B) to remote units 318(2) and 318(6), downlink MIMO communications signals 308D-M(C) to remote units 318(3) and 318(7), and downlink MIMO communications signals 308D-M(D) to remote units 318(4) and 318(8). In this regard, remote unit 318(1) is interleaved MIMO cell bonded to adjacent remote units 318(2)-318(4), remote unit 318(2) is interleaved MIMO cell bonded to adjacent remote units 318(1), 318(3), 318(4), remote unit 318(3) is interleaved MIMO cell bonded to adjacent remote units 318(1), 318(4), 318(5), and so on, as shown in FIG. 12. The remote units 318(1)-318(8) are also configured to receive and distributed received respective uplink MIMO communications signals 308U-M(A)(1)-308U-M(A)(2), 308U-M(B)(1)-308U-M(B)(2), 308U-M(C)(1)-308U-M(C)(2), and 308U-M(D)(1)-308U-M(D)(2) from the respective remote units 318(1), 318(5), 318(2), 318(6), 318(3), 318(7), 318(4), 318(8) over dedicated physical layers 1002(1)-1002(8) to the central unit 306 to be distributed back to a network, such as BTS or BBU. The routing circuit 1000 routes the received uplink MIMO communications signals 308U-M(A)(1)-308U-M(A)(2), 308U-M(B)(1)-308U-M(B)(2), 308U-M(C)(1)-308U-M(C)(2), and 308U-M(D)(1)-308U-M(D)(2) from the dedicated physical layers 1002(1)-1002(8) to particular radio interface circuits 304A, 304B according to the routing configuration 1004.

To support configuration or reconfiguration of interleaved MIMO communications services in the DCS 300, the DCS 300 can also support simulating the interleaved MIMO performance of the DCS 300 to determine possible interleaved MIMO communication service configurations to be presented to a technician or customer. In this regard, the interleaved MIMO performance of an existing DCS 300 infrastructure is simulated. This simulation can involve the use of simulation software that may be resident in the DCS 300 or located outside the DCS 300, such as in the cloud accessible to the DCS 300 to be executed by a processor circuit, such as the HEC 362. Alternatively, the simulation software may be resident and executed in a standalone computer system outside of the DCS 300. The simulated interleaved MIMO performance of an existing DCS 300 can be used to determine possible interleaved MIMO configurations in the DCS 300 along with the associated configurations and changes needed to realize such possible interleaved MIMO configurations. For example, the simulation may involve creating a "heat" map of both SISO and interleaved MIMO remote coverage areas of the remote units 318(1)-318(X) in the DCS 300 based on existing configurations for and locations of the remote units 318(1)-318(X) and the assigned routing of MIMO communications streams over the physical layers 1002(1)-1002(X) to the remote units 318(1)-318(X). These possible interleaved MIMO communications service configurations can then be presented to a technician or customer to determine if any of the possible interleaved MIMO communications service configurations should be deployed in the DCS 300. For example, one possible interleaved MIMO communication service configuration may be to change the supported MIMO communications services from 2×2 interleaved MIMO communications services to 4×4 interleaved MIMO communications services. If the possible interleaved MIMO communications service configurations should be deployed in the DCS 300, the DCS 300 can be reconfigured to support the selected interleaved MIMO communications service configurations. If the infrastructure of the DCS 300 is indicated as not being able to be changed, the possible interleaved MIMO communications service configurations presented will involve using the existing infrastructure of remote units 318(1)-318(X) and their locations, but with possible different physical layer 1002(1)-1002(X) assignments for distribution of MIMO communications streams to the remote units 318(1)-318(X). If the infrastructure of the DCS 300 is indicated as being able to be changed, the possible interleaved MIMO communications service configurations presented can also involve changing (e.g., adding to) the number and/or location remote units 318(1)-318(X) along with possible different physical layer 1002(1)-1002(X) assignments for distribution of MIMO communications streams to the remote units 318(1)-318(X).

Figure 13:
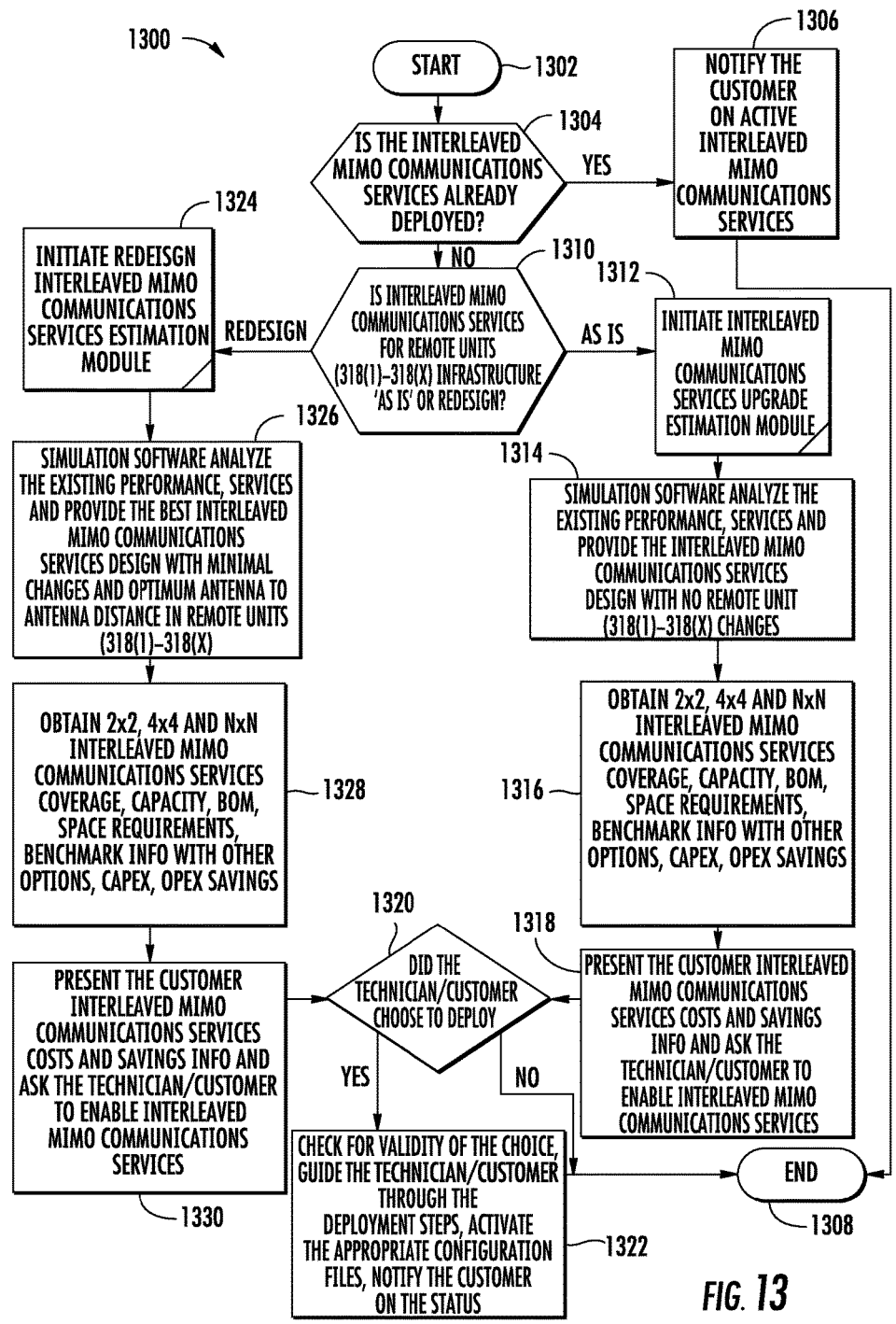
FIG. 13 is a flowchart illustrating an exemplary process of configuring and/or re-configuring the DCS in FIGS. 5A and 5B to support interleaved MIMO communications services based on the existing remote units deployed in the DCS and their installed locations to achieve a desired interleaved MIMO communications services performance in the DCS.

In this regard, FIG. 13 is a flowchart illustrating an exemplary process 1300 of configuring and/or re-configuring the DCS 300 in in FIGS. 5A and 5B to support interleaved MIMO communications services based on the existing remote units 318(1)-318(X) deployed in the DCS 300 and their installed locations to achieve a desired interleaved MIMO communications services performance in the DCS 300. The process 1300 may be represented by software instructions resident in the DCS 300 and executed by the HEC 362 as an example. The process 1300 is referenced below as being executed by the HEC 362, but such could be executed by another circuit or other computer outside of the DCS 300. The process starts (block 1302), such as by initiation by a technician or customer sending an interleaved MIMO communications service configuration request to the HEC 362. It is determined by the HEC 362 if interleaved MIMO communications are already deployed for the DCS 300 (block 1304). The HEC 362 can check the routing configuration 1004 (FIG. 10A) or other setting in the DCS 300 for example to determine if interleaved MIMO communications are already deployed for the DCS 300. If interleaved MIMO communications are already deployed for the DCS 300, the customer or technician can be notified, such as through a display or by communicating such information over the external interface 360 (FIG. 4B) to another system (block 1306). The process then ends (block 1308).

With continuing reference to FIG. 13, if in block 1304, interleaved MIMO communications are not already deployed for the DCS 300, the HEC 362 determines if configuring the DCS 300 to support interleaved MIMO communications should be for the infrastructure of existing remote units 318(1)-318(X) as they exist and are deployed in the DCS 300, or if redesigns to the number and/or location of the remote units 318(1)-318(X) in the DCS 300 are possible (block 1310). For example, a customer or technician may indicate this information via the external interface 360, such as from a keyboard input or touchscreen input on a display as examples. If the configuring of the DCS 300 to support interleaved MIMO communications should be for the infrastructure of existing remote units 318(1)-318(X) as they exist, the HEC 362 then performs an interleaved MIMO upgrade estimation to determine how the physical layers 1002(1)-1002(X) can be assigned to the remote units 318 (1)-318(X) to support interleaved MIMO communications (block 1312). A simulation software, which may be resident in the DCS 300, and is executed by the HEC 362 analyzes the existing performance of the DCS 300 and provides one or more possible interleaved MIMO communications service configurations based on the analyzed performance with no additional remote unit 318(1)-318(X) and no changes to the existing locations of the remote units 318(1)-318(X) (block 1314). The process then obtains the requirements of one or more different interleaved MIMO communication services based on the analyzed performance of the DCS 300 (block 1316). The different interleaved MIMO communications services could include 2×2 interleaved MIMO communications service, 4×4 interleaved MIMO communications service, N×N interleaved MIMO communications services. The requirements, such as coverage areas, capacity, bill of materials (BOM) space requirements, benchmark information along with other options such as CAPEX and OPEX savings, can be determined to achieve each of the different interleaved MIMO communications services (block 1318). For example, a 2×2 MIMO RF performance simulation using a given building model can estimate or predict the percentage MIMO coverage possible in a building. As an example, a BOM generation software tool can be employed to provide details of the radio interface circuits 304 required, RDCs 354, 356 or physical layers required and/or how to group communications services and on to what physical layers 1002(1)-1002(X). The HEC 362 for example may execute software instructions facilitates a step-by-step process for performing such simulation, such as on a graphical user interface (GUI). For example, a BOM software tool can be configured to interface with a database that has associated costs per the BOM generated by the BOM generator software tool. The performance, BOM, space, and cost requirements can be generated for each option including the original design. The options can be compared with the original design to understand the cost savings, performance gains, space requirements for each option The different interleaved MIMO communications services along with their determined requirements could then be presented to the technician or customer, along with the associated costs and savings information to determine if the technician or customer would like to enable a routing configuration 1004 to provide a desired interleaved MIMO communications services (block 1320). If the customer or technician does not choose to deploy a presented interleaved MIMO communications service, the process ends (block 1308). If however, the customer or technician does choose to deploy a presented interleaved MIMO communications service, the HEC 362 determines the validity of the choice and guides the technician or customer through the deployment steps, to activate the appropriate settings and files in the DCS 300 to update the routing configuration 1004, and then notifies the customer or technician (block 1322).

With continuing reference to FIG. 13, if in block 1310, it is decided that the configuring of the DCS 300 to support interleaved MIMO communications can allow redesign and/or re-configuration of the existing remote units 318(1)-318 (X) as they exist, the HEC 362 then performs an interleaved MIMO upgrade estimation to determine how the physical layers 1002(1)-1002(X) can be assigned to the remote units 318(1)-318(X) to support interleaved MIMO communications (block 1324). If the configuring of the DCS 300 to support interleaved MIMO communications can allow for a redesign of infrastructure of the remote units 318(1)-318(X), the HEC 362 then performs an interleaved MIMO upgrade estimation to determine how the physical layers 1002(1)-1002(X) can be assigned to the remote units 318(1)-318(X) to support interleaved MIMO communications based on changes to locations of the remote units 318(1)-318(X) to achieve the optimum antenna to antenna distance in the remote units 318(1)-318(X) (block 1326). A simulation software, which may be resident in the DCS 300, and is executed by the HEC 362 analyzes the existing performance of the DCS 300 and provides one or more possible interleaved MIMO communications service configurations based on the analyzed performance with no additional remote unit 318(1)-318(X) and no changes to the existing locations of the remote units 318(1)-318(X) (block 1326). The process then obtains the requirements one or more different interleaved MIMO communications services based on the analyzed performance of the DCS 300 (block 1328). The different interleaved MIMO communications services could include 2×2 interleaved MIMO communications service, 4×4 interleaved MIMO communications service, N×N interleaved MIMO communications services. The requirements, such as coverage areas, capacity, BOM space requirements, benchmark information along with other options such as CAPEX and OPEX savings, can be determined to achieve each of the different interleaved MIMO communications services (block 1328). The different interleaved MIMO communications services along with their determined requirements could then be presented to the technician or customer, along with the associated costs and savings information to determine if the technician or customer would like to enable a routing configuration 1004 to provide a desired interleaved MIMO communications service (block 1330). If the customer or technician does not choose to deploy a presented interleaved MIMO communication service, the process ends (block 1308). If however, the customer or technician does choose to deploy a presented interleaved MIMO communication service, the HEC 362 determines the validity of the choice and guides the technician or customer through the deployment steps, to activate the appropriate profile settings and files in the DCS 300 to update the routing configuration 1004, and then notifies the customer or technician (block 1322).

Figure 14:
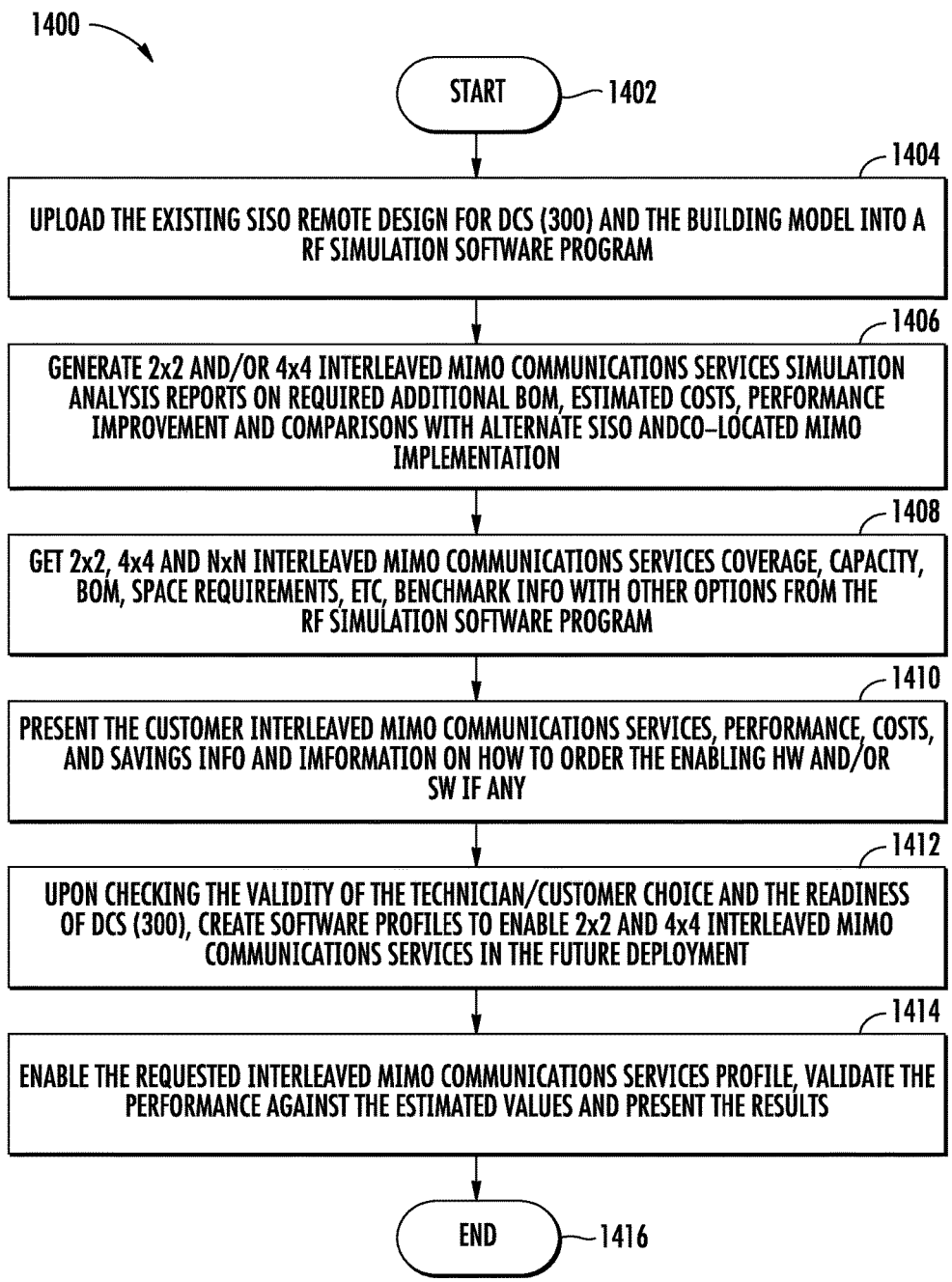
FIG. 14 is a flowchart illustrating an exemplary process of configuring and/or re-configuring the DCS in FIGS. 5A and 5B to support interleaved MIMO communications services based on the existing remote units deployed in the DCS and with repositioning installed locations of remote units and/or adding MIMO communications streams to achieve a desired interleaved MIMO communications services performance in the DCS.

FIG. 14 is a flowchart illustrating an exemplary process 1400 of configuring and/or re-configuring the DCS in in FIGS. 5A and 5B to support interleaved MIMO communications services based on the existing remote units 318(1)-318(X) deployed in the DCS 300 and with repositioning installed locations of remote units 318(1)-318(X) and/or adding MIMO communications streams to achieve a desired interleaved MIMO communications services performance in the DCS 300. The process 1400 in FIG. 14 can be employed as the processes involved in blocks 1312-1318 and 1324-1330 in FIG. 13. The process starts (block 1402), and the existing remote unit 318(1)-318(X) design for providing SISO communications services is loaded into the DCS 300 to build a model of the DCS 300 using a RF simulation software program (block 1404). For example, the RF simulation software program could generate reports on existing interleaved MIMO communications service, such as a "heat map" on required additional BIOM, costs, and performance improvements needed to achieve along with comparisons between the different interleaved MIMO communications services and SISO communications services and co-located or traditional MIMO communications services (block 1406). The user could also generate estimates on the required additional BOM, budget, performance and improvement metrics of MIMO cell bonding configuration options and compare such with alternative co-located MIMO communications services implementations using the RF simulation software program or other means. The user can then use the RF simulation software program or other program to obtain characteristics of different interleaved MIMO communications services that could include obtaining one or more performance characteristics to provide 2×2 interleaved MIMO communications service, 4×4 interleaved MIMO communications service, N×N interleaved MIMO communications services by the RF simulation software program (block 1408). These requirements, such as coverage areas, capacity, BOM space requirements, benchmark information along with other options such as CAPEX and OPEX savings, can be determined to achieve each of the different interleaved MIMO communications services (block 1408). The different interleaved MIMO communications services and their performance along with their determined requirements could then be presented to the technician or customer, along with the associated costs and savings information to determine if the technician or customer would like to enable a routing configuration 1004 to provide a desired interleaved MIMO communication service (block 1410). The validity of the selected MIMO communications service along with the ability of the DCS 300 and remote units 318(1)-318(X) to achieve is then determined along with the necessary profiles, settings, and routing configuration 1004 to enable the selected interleaved MIMO communications service for a future deployment, if desired (block 1412). Optionally, on the user request, the user can interface with the RF simulation software program to navigate through equipment installation steps, to enable the requested MIMO cell bonding profile, validate the performance of selected interleaved MIMO communications against the estimated results and present the results, such as through a GUI or other display. The HEC 362 then enables the selected interleaved MIMO communications service, and validates the performance against the estimated performance to present the result to the technician or user (block 1414), and the process ends (block 1416).

As discussed above, to provide options for supporting interleaved MIMO communication services in the DCS 300, an analysis of the configuration profiles for the DCS 300 can be performed. However, an analysis of the configuration profiles for the DCS 300 does not necessarily mean that the communications performance of DCS 300 can exactly be determined. It may be desired to determine the actual communications performance of DCS 300 as part of support configuration and reconfiguration of the DCS 300 to support interleaved MIMO communications services.

Figure 15A:
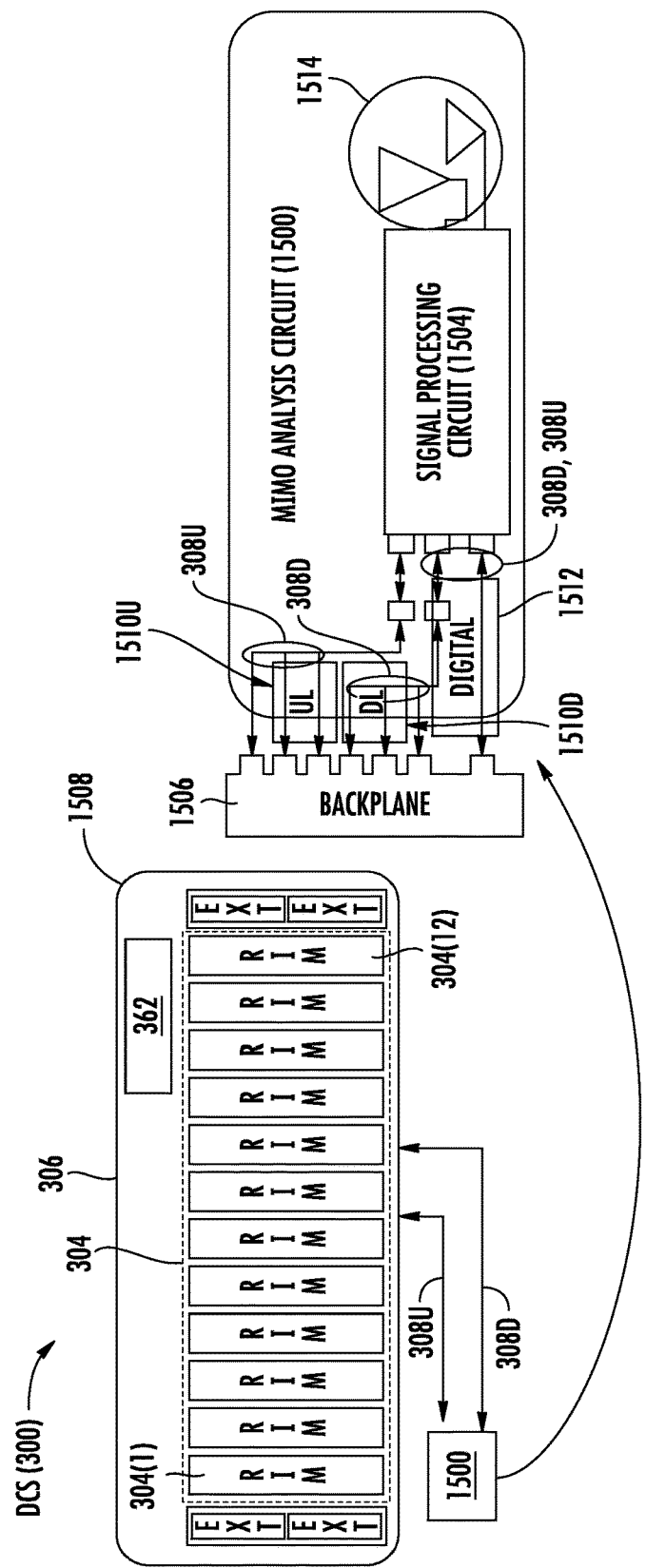
FIGS. 15A and 15B are schematic diagrams of the DCS in FIGS. 5A and 5B with additional MIMO analysis circuits employed in the head-end unit to determine the actual routing of MIMO communications signals and locations of the remote units in the DCS to allow for automatedly determining any MIMO cell bonding between the remote units to determine the configuration interleaved MIMO configuration in effect in the DCS.
Figure 15B:
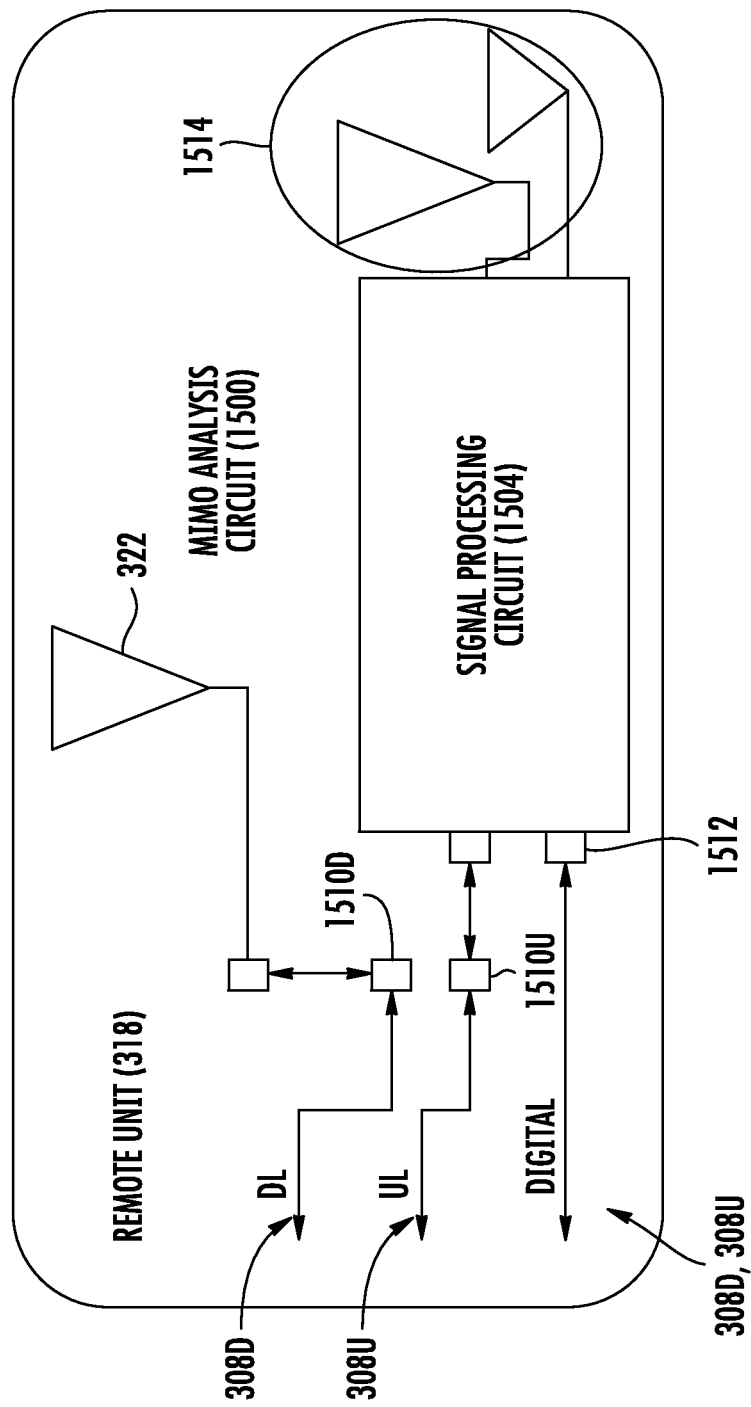

In this regard, FIG. 15A is a schematic diagram of the DCS 300 in FIGS. 5A and 5B with an additional central MIMO analysis circuit 1500 that can be employed in the central unit 306 to determine the actual routing of MIMO communications signals to the remote units 318(1)-318(X) in the DCS 300. FIG. 15B is a schematic diagram of a remote unit 318 in the DCS 300 in FIGS. 5A and 5B with an additional MIMO analysis circuit 1500 to determine the actual routing of MIMO communications signals to the remote units 318 and the location of the remote unit 318 in the DCS 300. The MIMO analysis circuit 1500 can be deployed as a remote MIMO analysis circuit in each remote unit 318(1)-318(X) in FIGS. 5A and 5B. As will be discussed in more detail below, the MIMO analysis circuit 1500 allows for automatedly determining any MIMO cell bonding between the remote units 318(1)-318(X) to determine the communications services in effect in the DCS 300 for further analysis.

With reference to FIGS. 15A and 15B, the MIMO analysis circuit 1500 includes a signal processing circuit 1504 that is configured to receive downlink and uplink communications signals 308D, 308U from the central unit 306. For example, the MIMO analysis circuit 1500 may couple to a backplane 1506 of a chassis 1508 in which the central unit 306, such as the radio interface circuits 304(1)-304(12) are located, to receive the communications signals 308D, 308U distributed by and received by the radio interface circuits 304(1)-304(12). The MIMO analysis circuit 1500 may include a downlink input interface 1510D to receive analog downlink communications signals 308D and an uplink input interface 1510U to receive analog uplink communications signals 308U. The MIMO analysis circuit 1500 may also include a digital signal interface 1512 to receive digital downlink and uplink communications signals 308D, 308U. The MIMO analysis circuit 1500 in this example also includes one or more antennas 1514 to be able to receive signals used to determine location of the MIMO analysis circuit 1500. For example, WiFi, satellite, and/or cellular communications signals may be used to determine the location of the MIMO analysis circuit 1500. The signal processing circuit 1504 can be configured to use the reception of such signals from the antennas 1514 to determine the location of the MIMO analysis circuit 1500. This may be particularly important for MIMO analysis circuit 1500 included in a remote unit 318, because part of the analysis and configuration of communications services of the DCS 300 involves the location of the remote units 318(1)-318(X) and their relative distance from other remote units 318(1)-318(X) to determine possible interleaved MIMO cell bonding between the remote units 318(1)-318(X).

Figure 16:
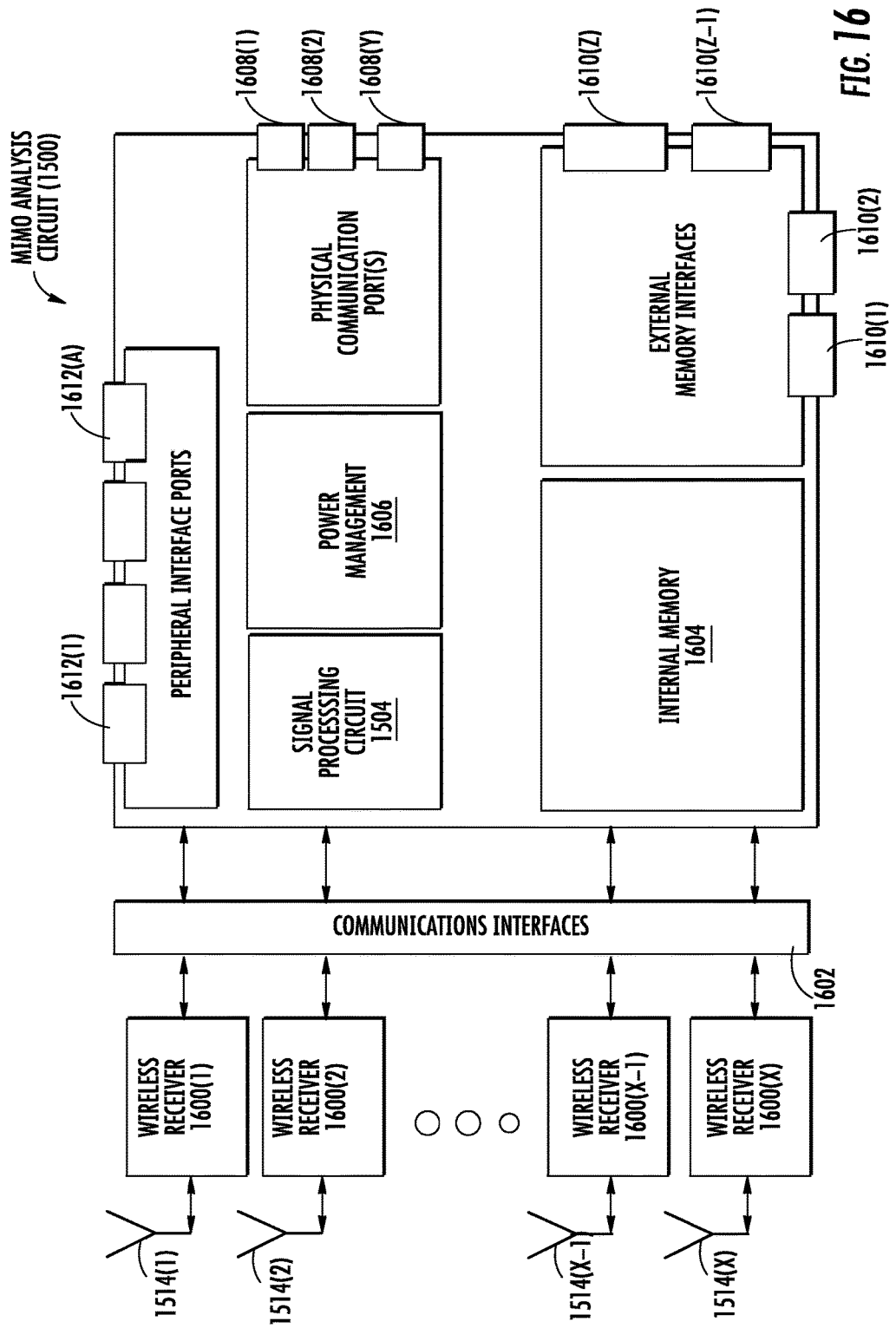
FIG. 16 is a schematic diagram of exemplary components that can be included in the MIMO analysis circuit in FIGS. 15A and 15B.

FIG. 16 is a schematic diagram of exemplary components that can be included in the MIMO analysis circuit 1500 in FIGS. 15A and 15B. As illustrated in FIG. 16, the MIMO analysis circuit 1500 can include a series of wireless receivers 1600(1)-1600(X) that are configured to transmit local wireless communications signals over respective antennas 1514(1)-1514(X). As discussed above, the wireless receivers 1600(1)-1600(X) can include a WiFi transmitter and/or Bluetooth transmitter that are configured to receive wireless communications signals to be used to determine the location of the MIMO analysis circuit 1500. The MIMO analysis circuit 1500 also includes the signal processing circuit 1504, which may be provided in the form of a processor, such as a digital signal processor (DSP), where application layer applications reside and are executed. The application layer applications can allow handling of functions of the MIMO analysis circuit 1500, such as configuration, setting the identification information, and control of reception of wireless communications signals by communication through the communications interfaces 1602. The application layer applications to be executed by the signal processing circuit 1504 can be stored in internal memory 1604. The application level applications can also be stored in the internal memory 1604. The MIMO analysis circuit 1500 can also include a power management module 1606 to manage power consumption. The MIMO analysis circuit 1500 can also include one or more physical communications ports 1608(1)-1608(Y) to receive the downlink and uplink communications signals 308D, 308U for analyzing communications services. The MIMO analysis circuit 1500 may also include one or more external memory interfaces 1610(1)-1610(Z), such as memory card ports, USB ports, etc. for storing data from internal memory 1604, including application level information. The MIMO analysis circuit 1500 may also include one or more peripheral interface ports 1612(1)-1612(A) for connecting other peripheral devices.

Figure 17:
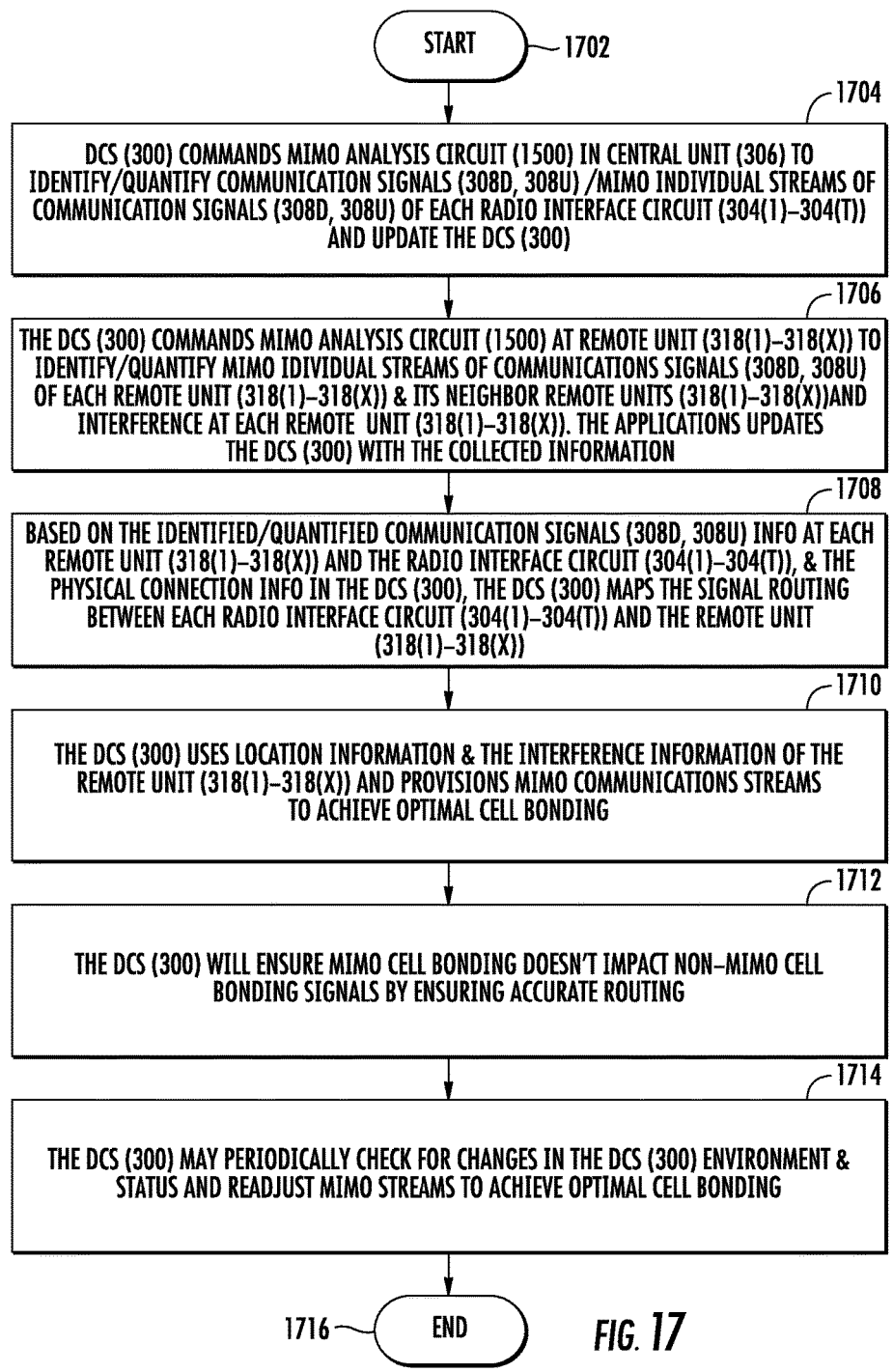
FIG. 17 is a flowchart illustrating an exemplary process of automatedly determining the actual routing of MIMO communications signals and locations of the remote units in the DCS and any MIMO cell bonding between the remote units to determine the configured interleaved MIMO configuration in effect in the DCS, and re-configuring the DCS to provide the desired interleaved MIMO configuration in response to the determined interleaved MIMO configuration in the DCS.

FIG. 17 is a flowchart illustrating an exemplary process 1700 of automatedly determining the actual routing of MIMO communications signals and locations of the remote units 318(1)-318(X) in the DCS 300 and any MIMO cell bonding between the remote units 318(1)-318(X) to determine the configured interleaved MIMO configuration in effect in the DCS 300. The DCS 300 can then be reconfigured if desired to provide the desired interleaved MIMO configuration in response to the determined interleaved MIMO configuration in the DCS 300. In this regard, the process 1700 starts (block 1702), and the HEC 362 in the DCS 300 commands the MIMO analysis circuit 1500 in the central unit 306 to identify and quantify the streams of communications signals 308D, 308U, including any MIMO communications streams of each radio interface circuit 304(1)-304(T) (block 1704). The DCS 300 is updated with the determined information. The DCS 300 then commands the MIMO analysis circuits 1500 in the remote units 318(1)-318(X) to identify and quantify the streams of communications signals 308D, 308U, including any MIMO communications streams of each remote unit 318(1)-318(X) and the neighboring, adjacent remote units 318(1)-318(X) (block 1706). The interference at each remote unit 318(1)-318(X) is also determined. The DCS 300 is updated with the determined information. Based on the identified and quantified information determined by the MIMO analysis circuits 1500 at each remote unit 318(1)-318(X) and the radio interface circuits 304(1)-304(T), and the physical connection information based on the routing configuration 1004, the HEC 362 maps the signal routing between each radio interface circuit 304(1)-304(T) and the remote units 318(1)-318(X) (block 1708). The DCS 300 uses the location information and the interference information from the MIMO analysis circuits 1500 in the remote units 318(1)-318(X) to provision MIMO communications streams in a routing configuration 1004 to achieve the interleaved MIMO cell bonding between remote units 318(1)-318(X) to achieve interleaved MIMO communications services (block 1710). The HEC 362 then determines if the routing configuration 1004 will provide for the interleaved MIMO cell bonding to not impact non-MIMO cell bonded remote units 318(1)-318(X) by ensuring accurate routing (block 1712). The HEC 362 may then periodically check for changes in the environment and status to then readjust the routing of downlink communications signals 308D to achieve the desired interleaved MIMO cell bonding between remote units 318(1)-318(X) to achieve interleaved MIMO communications services (block 1714), and the process ends (block 1716).

Figure 18:
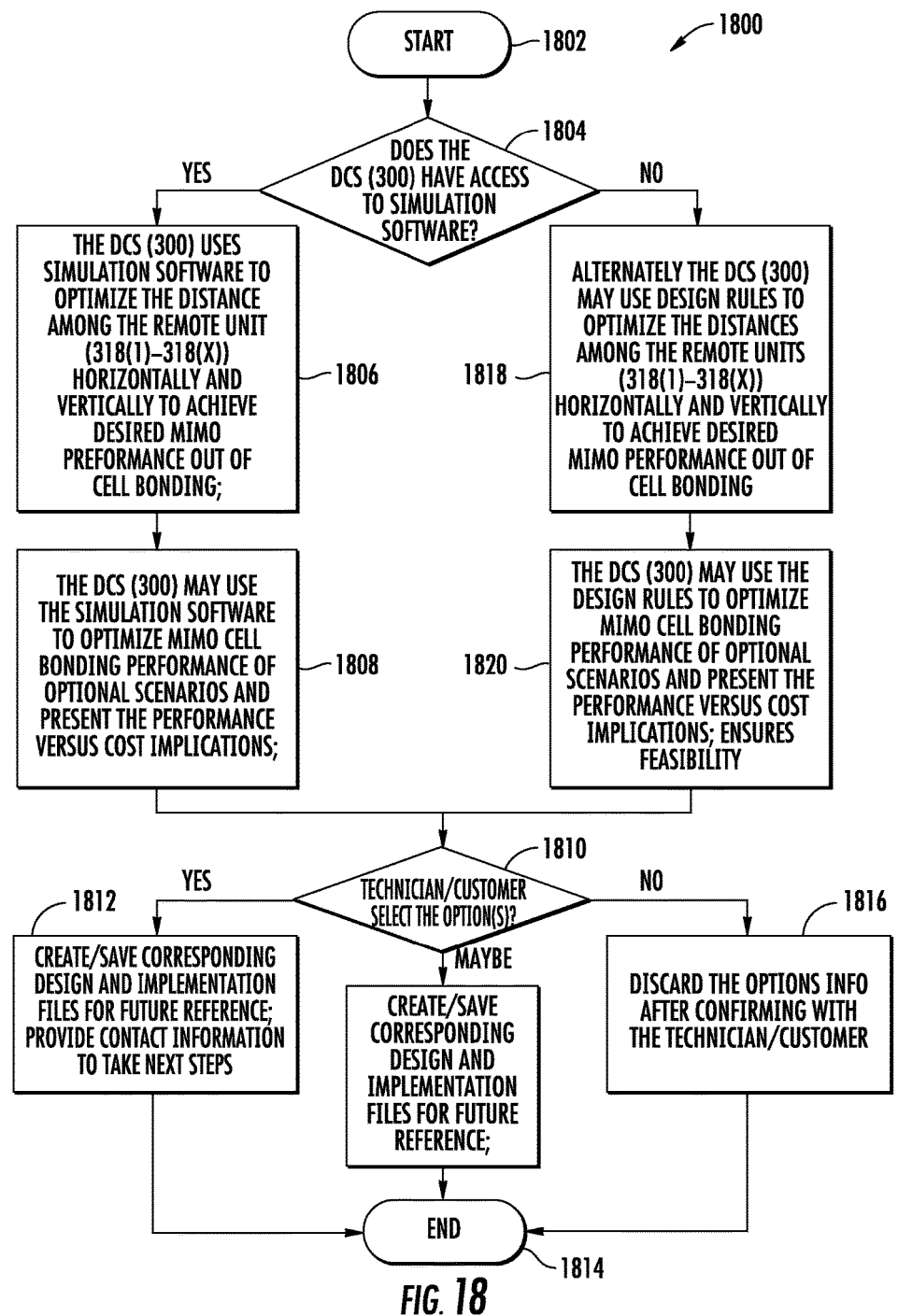
FIG. 18 is a flowchart illustrating an exemplary process of routing of MIMO communications signals and locations of the remote units in the DCS, automatedly determining any MIMO cell bonding between the remote units to determine the configured interleaved MIMO configuration in effect in the DCS, and re-configuring the DCS to provide the desired interleaved MIMO configuration.

FIG. 18 is a flowchart illustrating an exemplary process 1800 for determining the MIMO cell bonding in the DCS 300 to provide the desired interleaved MIMO configuration and communications services in the DCS 300. The process 1800 in FIG. 18 can be employed in block 1710 in the process 1700 in FIG. 17. The process 1800 starts (block 1802) by the HEC 362 determining if the DCS 300 has access to simulation software to simulate the communications performance of the DCS 300 (block 1804). If so, the DCS 300 (e.g., HEC 362) uses the simulation software to optimize the distance between the remote units 318(1)-318(X) horizontally and vertically to achieve the desired MIMO communications performance from interleaved MIMO cell bonding (block 1806). The DCS 300 may use the simulation software to optimize interleaved MIMO cell bonding performance and present these performances versus their cost implication to a customer or technician (block 1808). If the technician or customer desires to employ one of the simulated options (block 1810), the DCS 300 creates and saves the corresponding design information and routing configuration 1004 needed to deploy the chosen option and provides contact information to determine next steps for making physical changes to the DCS 300 (block 1812), and the process ends (block 1814). If the technician or customer does not desire to employ one of the simulated options (block 1810), the DCS 300 discards corresponding design information and routing configuration 1004 needed to deploy the chosen option (block 1816), and the process ends (block 1814).

If in block 1804, the HEC 362 determines that the DCS 300 does not have access to simulation software to simulate the communications performance of the DCS 300, the DCS 300 may alternatively use design rules to optimize the distances among the remote units 318(1)-318(X) horizontally and vertically to achieve the desired MIMO communications performance from interleaved MIMO cell bonding (block 1818). The DCS 300 may use the design rules to optimize interleaved MIMO cell bonding performance and present these performances versus their cost implication to a customer or technician (block 1820). If the technician or customer desires to employ one of the design options (block 1810), the DCS 300 creates and saves the corresponding design information and routing configuration 1004 needed to deploy the chosen option and provides contact information to determine next steps for making physical changes to the DCS 300 (block 1812), and the process ends (block 1814). If the technician or customer does not desire to employ one of the simulated options (block 1810), the DCS 300 discards corresponding design information and routing configuration 1004 needed to deploy the chosen option (block 1816), and the process ends (block 1814).

Figure 19A:
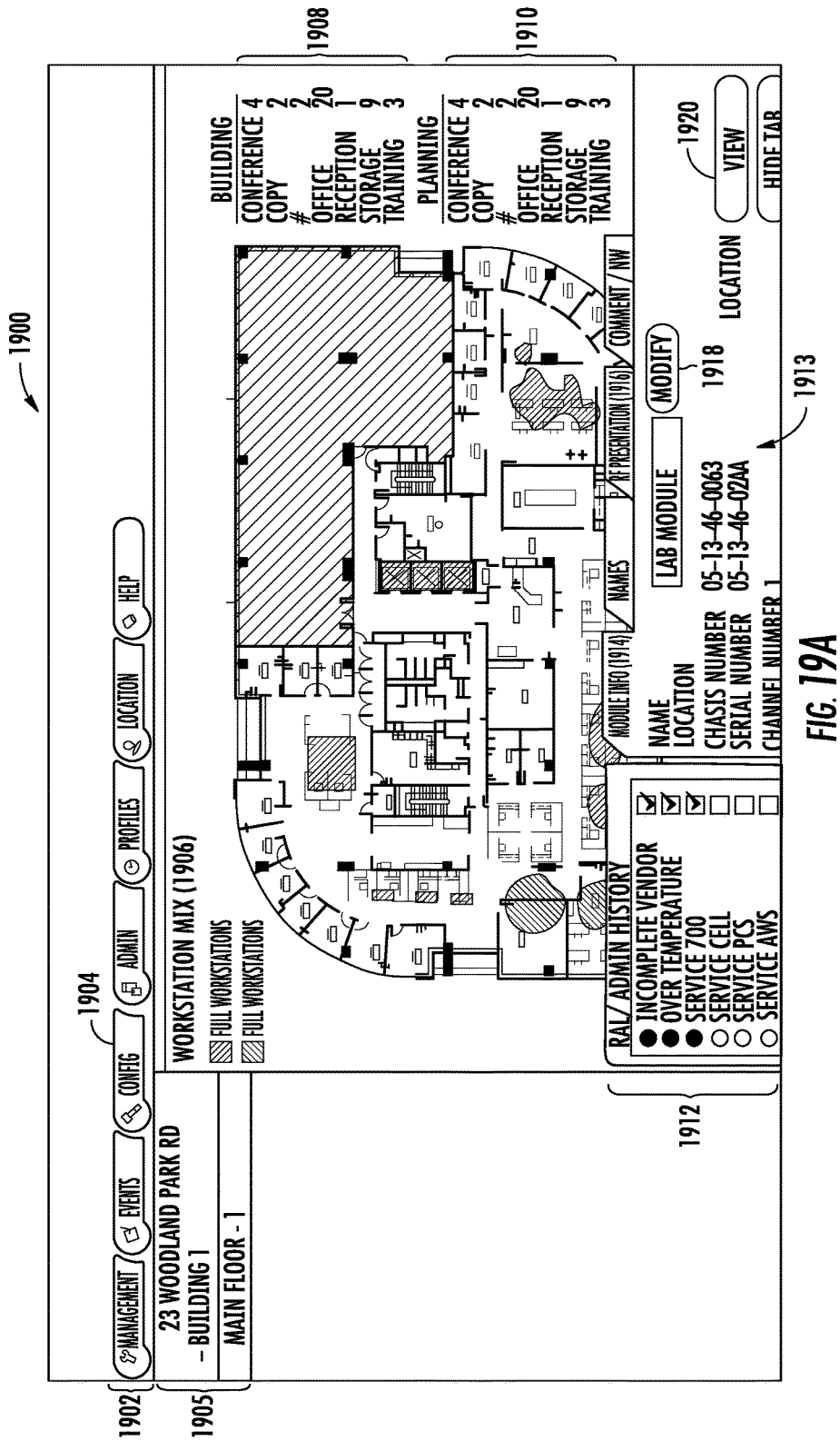
FIGS. 19A and 19B are diagrams of exemplary graphical user interfaces (GUI) that facilitate configuring and/or reconfiguring distribution of MIMO communications streams in a DCS, such as the DCS in FIGS. 15A and 15B and according to any of the exemplary interleaved MIMO communications services discussed herein, displayed on a display in a computer system in response to a processor executing of software instructions.
Figure 19B:
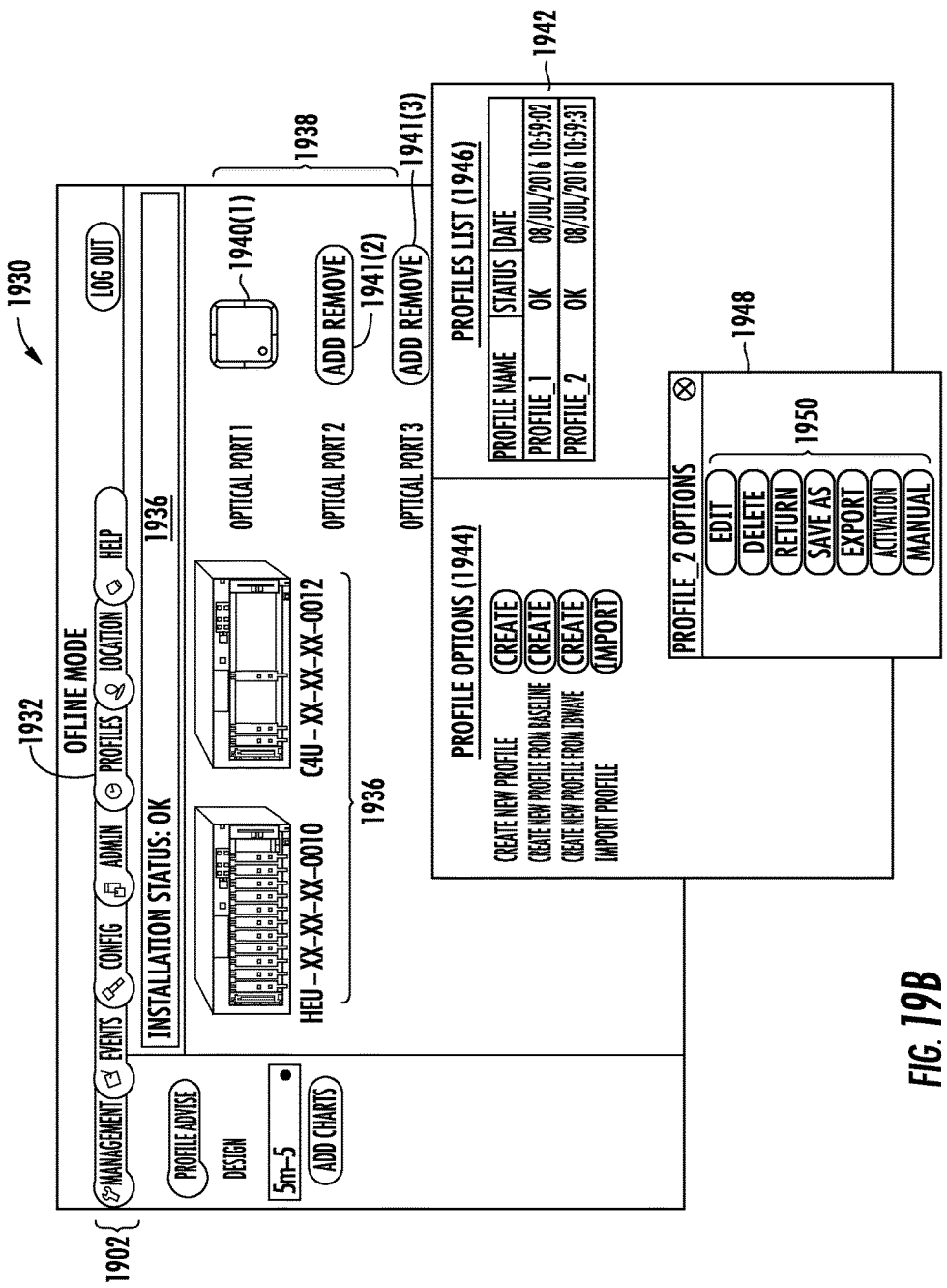

FIGS. 19A and 19B are diagrams of exemplary graphical user interfaces (GUI) 1900, 1930 that facilitate configuring and/or reconfiguring distribution of MIMO communications streams in a DCS, such as the DCS 300 in FIGS. 5A and 5B and according to any of the exemplary interleaved MIMO communications services discussed herein. The HEC 362 for example may execute software instructions that generate the GUIs 1900, 1930 to be displayed on a display in a computer system to a customer or technician in response to a processor executing of software instructions. In this regard, as shown in FIG. 19A, the GUI 1900 includes a main menu 1902 of options to manage the configuration and settings of the DCS 300 to provide the desired communications services. For example, a user can select the CONFIG tab 1904 to review and edit the configuration settings for the DCS 300. The DCS 300 selected is shown in the DCS identification section 1905. A workstation mix area 1906 is presented to the user that includes a floor plan layout of a building in which the DCS 300 is installed. Details of the existing rooms and planned rooms for the building in which the DCS 300 is installed as shown in building and planning areas 1908, 1910. The administration history of the DCS 300 is displayed in an administration history area 1912. The module information on the modules in the DCS 300 is shown in a modulation information area 1913 in response to selection of the module information tab 1914. The RF presentation of the DCS 300 to show a heat map of the DCS 300 can be initiated by selecting the RF presentation tab 1916. The module configuration in the DCS 300 can be modified by selecting the modify button 1918 and viewed by selecting the view button 1920.

FIG. 19B illustrates another GUI 1930 that is based on selected the profiles tab 1932 in the main menu 1902. As discussed above, profiles store configuration information for configuring the DCS 300 to provide the desired communications services. The central unit 306 configuration of the DCS 300 is shown in area 1936. The optical ports of the DCS 300 for the selected optical interface circuit 310 are shown in area 1938, where optical port 1 1940(1) is shown as being configured. Optical ports 2 and 3 can be added or removed by selecting the add remove buttons 1941(2), 1941(3). A profile list 1946 of the DCS 300 is shown with the names of profiles 1942 that can be configured for the DCS 300 to achieve different communications services. For a selected profile 1942 in the profiles list 1946, profile options 1944 are provided for creating, importing profiles, including from third party software such as IBWave for example. These profiles 1942 can be imported to configure the DCS 300. A selected profile 1942 can also be modified by selecting a button 1950 in a profile options window 1948. These modifications can include editing, deleting, returning, saving, exporting, and activation of a selected profile 1942.

The software executed to perform the processes in FIGS. 17 and 18, and generate the GUIs 1900, 1930 in FIGS. 19A and 19B could be provided by the RF simulation software program discussed in U.S. patent application Ser. No. 15/332,603, entitled "Implementing A Live Wireless Distribution System (WDS) Configuration From A Virtual WDS Design Using An Original Equipment Manufacturer (OEM) Specific Software System In A WDS," which is incorporated by reference herein in its entirety.

Figure 20:
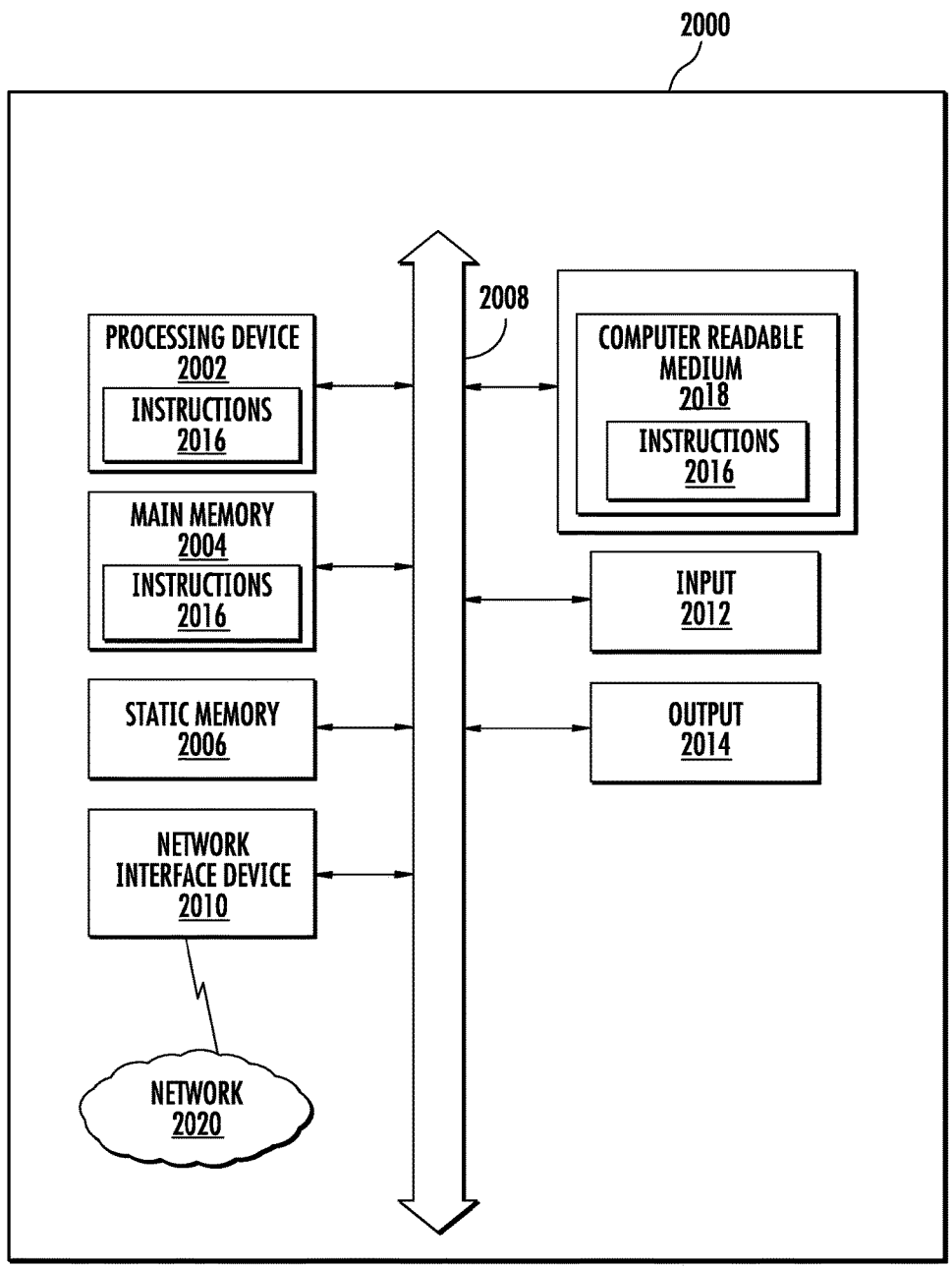
FIG. 20 is a schematic diagram of an exemplary computer system that can be included in any component in a DCS, including but not limited to the DCS in FIGS. 15A and 15B, wherein the computer system includes a processor that is configured to software execute instructions to support configuring and/or reconfiguring distribution of MIMO communications streams in a DCS, such as the DCS in FIGS. 15A and 15B.

FIG. 20 is a schematic diagram representation of additional detail illustrating a computer system 2000 that could be employed in any component in the DCS 300 in FIGS. 15A and 15B, including but not limited to the MIMO analysis circuit 1500 (FIGS. 15A-16) the routing circuit 1000 (FIGS. 10A, 11A and 12), and the HEC 362 (FIG. 4B) to support configuring and/or reconfiguring distribution of MIMO communications streams to support interleaved MIMO communications services. The computer system 2000 can be configured to support programming a routing configuration 1004, and/or to support providing GUI to a display, as shown in FIGS. 19A and 19B for example. In this regard, the computer system 2000 is adapted to execute instructions from an exemplary computer-readable medium to perform these and/or any of the functions or processing described herein. The computer system 2000 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 2000 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 2000 in this embodiment includes a processing device or processor 2002, a main memory 2004 (e.g., read-only memory (ROM), flash memory, dynamic random access memory (DRAM), such as synchronous DRAM (SDRAM), etc.), and a static memory 2006 (e.g., flash memory, static random access memory (SRAM), etc.), which may communicate with each other via a data bus 2008. Alternatively, the processor 2002 may be connected to the main memory 2004 and/or static memory 2006 directly or via some other connectivity means. The processor 2002 may be a controller, and the main memory 2004 or static memory 2006 may be any type of memory. For example, the routing configuration 1004 may be stored in the main memory 2004 and loaded into static memory 2006 when being programmed, changed, or otherwise accessed, and then reloaded into main memory 2004.

The processor 2002 represents one or more general-purpose processing devices, such as a microprocessor, central processing unit, or the like. More particularly, the processor 2002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 2002 is configured to execute processing logic in instructions for performing the operations and steps discussed herein.

The computer system 2000 may further include a network interface device 2010. The computer system 2000 also may or may not include an input 2012, configured to receive input and selections to be communicated to the computer system 2000 when executing instructions. The computer system 2000 also may or may not include an output 2014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 2000 may or may not include a data storage device that includes instructions 2016 stored in a computer-readable medium 2018. The instructions 2016 may also reside, completely or at least partially, within the main memory 2004 and/or within the processor 2002 during execution thereof by the computer system 2000, the main memory 2004 and the processor 2002 also constituting computer-readable medium. The instructions 2016 may further be transmitted or received over a network 2020 via the network interface device 2010.

While the computer-readable medium 2018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed communications system (DCS), comprising:
   a central unit configured to:
      distribute received one or more downlink communications signals over one or more downlink communications links among a plurality of downlink communications links to one or more remote units among a plurality of remote units according to a routing configuration; and
      distribute received one or more uplink communications signals from the plurality of remote units over a plurality of uplink communications links; and
   the central unit comprising:
      a routing configuration assigning the received one or more downlink communications signals to one or more remote units among the plurality of remote units; and a central multiple-input, multiple-output (MIMO) analysis circuit configured to determine a presence of MIMO communications signals among the received one or more downlink communications signals;

each remote unit among the plurality of remote units comprising at least one antenna and configured to:
   distribute received uplink communications signals received over the at least one antenna over an uplink communications link among the plurality of uplink communications links to the central unit; and
   distribute received downlink communications signals from a downlink communications link among the plurality of downlink communications links through the at least one antenna;

each remote unit among the plurality of remote units further comprising
   a remote MIMO analysis circuit configured to:
      determine a presence of MIMO communications signals among the received downlink communications signals;
      determine location of the remote unit; and
      provide MIMO analysis information comprising the presence of MIMO communications signals and the determined location of the remote unit;

the central unit further comprising a controller configured to:
   instruct the central MIMO analysis circuit to analyze the received one or more downlink communications signals to determine the presence of MIMO communications signals;
   instruct the plurality of remote units to cause their respective remote MIMO analysis circuit to analyze the received one or more downlink communications signals to determine the presence of MIMO communications signals;
   determine a routing configuration of the determined MIMO communications signals among the one or more downlink communications signals from the central unit to the plurality of remote units;
   receive MIMO analysis information from each remote unit among the plurality of remote units indicating the determined presence of MIMO communications signals and the location of the remote unit;
   in response to the determined presence of MIMO communications signals from the received MIMO analysis information;
   determine at least one interleaved MIMO configuration for the routing configuration based on the received MIMO analysis information; and
   configure the routing configuration based on the determined at least one interleaved MIMO configuration:
      assign a first MIMO communications signal among the received one or more downlink communications signals for a first MIMO communications service to a first remote unit among the plurality of remote units having a first remote coverage area; and
      assign a second MIMO communications signal among the received one or more downlink communications signals for the first MIMO communications service to a second remote unit among the plurality of remote units having a second remote coverage area overlapping with the first remote coverage area to interleave MIMO cell bond the first remote unit and the second remote unit.

2. The DCS of claim 1, wherein the controller is further configured to determine an existing performance of the plurality of remote units to provide interleaved MIMO communications services based on the received MIMO analysis information.

3. The DCS of claim 2, wherein the controller is further configured to determine the existing performance of the plurality of remote units to provide interleaved MIMO communications services by being configured to:
   simulate at least one interleaved MIMO communications service for the DCS based on the existing plurality of remote units; and
   determine at least one performance characteristic of the simulated at least one interleaved MIMO communications service for the DCS based on the existing plurality of remote units.

4. The DCS of claim 1, wherein the controller is configured to instruct the plurality of remote units to cause their respective remote MIMO analysis circuit to analyze their received one or more downlink communications signals to determine the presence of MIMO communications signals by being configured to:
   instruct each remote unit among the plurality of remote units to cause its respective remote MIMO analysis circuit to analyze the received one or more downlink communications signals to determine the presence of MIMO communications signals; and
   instruct each adjacent remote unit among the plurality of remote units to the remote unit to cause its respective remote MIMO analysis circuit to analyze the received one or more downlink communications signals to determine the presence of MIMO communications signals.

5. The DCS of claim 1, wherein each remote MIMO analysis circuit is further configured to:
   Determine radio frequency (RF) interference information; and
   provide the MIMO analysis information comprising the presence of MIMO communications signals, and the determined location of the remote unit, and the RF interference information.

6. The DCS of claim 1, wherein in response to the determined presence of MIMO communications signals from the received MIMO analysis information, the controller is further configured to configure the routing configuration based on distances between adjacent remote units among the plurality of remote units.

7. The DCS of claim 1, wherein the controller is further configured to:
   send the determined at least one interleaved MIMO configuration for the routing configuration over an external interface;
   receive an indication of an acceptance of the at least one interleaved MIMO configuration; and
   configure the routing configuration based on the determined at least one interleaved MIMO configuration based on the received indication of the acceptance of the at least one interleaved MIMO configuration.

8. The DCS of claim 1, wherein:
   the central MIMO analysis circuit is further configured to determine a presence of MIMO communications signals among the received one or more uplink communications signals;
   the remote MIMO analysis circuit in each remote unit among the plurality of remote units is configured to determine the presence of MIMO communications signals among the received uplink communications signals; and the controller is further configured to:
instruct the central MIMO analysis circuit to analyze the received one or more uplink communications signals to determine the presence of MIMO communications signals;
instruct the plurality of remote units to cause their respective remote MIMO analysis circuit to analyze the received one or more uplink communications signals to determine the presence of MIMO communications signals;
determine a routing configuration of the determined MIMO communications signals among the one or more uplink communications signals from the central unit to the plurality of remote units.

9. The DCS of claim 1, wherein the controller is further configured to configure the routing configuration based on the determined at least one interleaved MIMO configuration to:
assign a third MIMO communications signal among the received one or more downlink communications signals for the first MIMO communications service to a third remote unit among the plurality of remote units having a third remote coverage area overlapping with the first remote coverage area and the second remote coverage area to interleave MIMO cell bond the third remote unit to the first remote unit and the second remote unit; and
assign a fourth MIMO communications signal among the received one or more downlink communications signals for the first MIMO communications service to a fourth remote unit among the plurality of remote units having a fourth remote coverage area overlapping with the first remote coverage area, the second remote coverage area, and the third remote coverage area to interleave MIMO cell bond the fourth remote unit to the first remote unit, the second remote unit, and the third remote unit.

10. The DCS of claim 1, wherein the controller is further configured to configure the routing configuration based on the determined at least one interleaved MIMO configuration to:
assign a third MIMO communications signal among the received one or more downlink communications signals for a second MIMO communications service to a third remote unit among the plurality of remote units having a third remote coverage area; and
assign a fourth MIMO communications signal among the received one or more downlink communications signals for the second MIMO communications service to a fourth remote unit among the plurality of remote units having a fourth remote coverage area overlapping with the third remote coverage area to interleave MIMO cell bond the third remote unit and the fourth remote unit.

11. The DCS of claim 10, wherein the controller is further configured to configure the routing configuration based on the determined at least one interleaved MIMO configuration to:
assign a fifth MIMO communications signal among the received one or more downlink communications signals for the second MIMO communications service to a fifth remote unit among the plurality of remote units having a fifth remote coverage area; and
assign a sixth MIMO communications signal among the received one or more downlink communications signals for the second MIMO communications service to a sixth remote unit among the plurality of remote units having a sixth remote coverage area overlapping with the fifth remote coverage area to interleave MIMO cell bond the fifth remote unit and the sixth remote unit.

12. The DCS of claim 1, wherein the controller is further configured to configure the routing configuration based on the determined at least one interleaved MIMO configuration to:
split the first MIMO communications signal into at least two first split MIMO communications signals;
split the second MIMO communications signal into at least two second split MIMO communications signals;
the central unit configured to configure the routing configuration to:
assign a first split MIMO communications signal of the at least two first split MIMO communications signals for the first MIMO communications service to the first remote unit among the plurality of remote units having the first remote coverage area; and
assign a second split MIMO communications signal of the at least two first split MIMO communications signals for the first MIMO communications service to the second remote unit among the plurality of remote units having the second remote coverage area overlapping with the first remote coverage area to interleave MIMO cell bond the first remote unit and the second remote unit;
assign a first split MIMO communications signal of they at least two second split MIMO communications signals for the first MIMO communications service to a third remote unit among the plurality of remote units having a third remote coverage area; and
assign a second split MIMO communications signal of the at least two second split MIMO communications signals for the first MIMO communications service to a fourth remote unit among the plurality of remote units having a fourth remote coverage area overlapping with the third remote coverage area to interleave MIMO cell bond the third remote unit and the fourth remote unit.

13. The DCS of claim 1, wherein the central unit comprises at least one MIMO splitter circuit configured to:
split the first MIMO communications signal into at least two first split MIMO communications signals.

14. The DCS of claim 1, wherein the plurality of downlink communications links and the plurality of uplink communications links are the same respective communications links.

15. The DCS of claim 1, wherein the first remote unit is located within at least 20 meters of the second remote unit.

16. The DCS of claim 1, wherein the first remote unit is located within at least 12 meters of the second remote unit.

17. A method of configuring a distributed communications systems (DCS) for providing interleaved multiple-input, multiple-output (MIMO) communications services, comprising:
instructing a central MIMO analysis circuit in a central unit of the DCS to analyze received at least one downlink communications signals to determine a presence of MIMO communications signals, the DCS comprising:
the central unit configured to:
distribute received one or more downlink communications signals over one or more downlink communications links among a plurality of downlink communications links to one or more remote units among a plurality of remote units according to a routing configuration; and distribute received one or more uplink communications signals from the plurality of remote units over a plurality of uplink communications links; and the central unit comprising:
a routing configuration assigning the received one or more downlink communications signals to one or more remote units among the plurality of remote units; and a central MIMO analysis circuit configured to determine the presence of MIMO communications signals among the received one or more downlink communications signals;

each remote unit among the plurality of remote units comprising at least one antenna and configured to:
distribute received uplink communications signals over the at least one antenna over an uplink communications link among the plurality of uplink communications links to the central, unit; and distribute received downlink communications signals from a downlink communications link among the plurality of downlink communications links through the at least one antenna;

each remote unit among the plurality of remote units further comprising a remote MIMO analysis circuit configured to:
determine the presence of MIMO communications signals among the received downlink communications signals;
determine location of the remote unit; and
provide MIMO analysis information comprising the presence of MIMO communications signals and the determined location of the remote unit;

instructing the plurality of remote units to cause their respective remote MIMO analysis circuit to analyze the received one or more downlink communications signals to determine the presence of MIMO communications signals;

determining a routing configuration of the determined MIMO communications signals among the received one or more downlink communications signals from the central unit to the plurality of remote units;

receiving MIMO analysis information from each remote unit among the plurality of remote units indicating the determined presence of MIMO communications signals and the location of the remote unit;

in response to the determined presence of MIMO communications signals from the received MIMO analysis information;

determining at least one interleaved MIMO configuration for the routing configuration based on the received MIMO analysis information; and configuring the routing configuration based on the determined at least one interleaved MIMO configuration by:
assigning a first MIMO communications signal among the received one or more downlink communications signals for a first MIMO communications service to a first remote unit among the plurality of remote units having, a first remote coverage area; and assigning a second MIMO communications signal among the received one or more downlink communications signals for the first MIMO communications service to a second remote unit among the plurality of remote units having a second remote coverage area overlapping with the first remote coverage area to interleave MIMO cell bond the first remote unit and the second remote unit.

18. The method of claim 17, further comprising determining an existing performance of the plurality of remote units to provide interleaved MIMO communications services based on the received MIMO analysis information.

19. The method of claim 18, further comprising determining the existing performance of the plurality of remote units to provide interleaved MIMO communications services by:
simulating at least one interleaved MIMO communications service for the DCS based on the existing plurality of remote units; and
determining at least one performance characteristic of the simulated at least one interleaved MIMO communications service for the DCS based on the existing plurality of remote units.

20. The method of claim 17, comprising instructing the plurality of remote units to cause their respective remote MIMO analysis circuit to analyze the received one or more downlink communications signals to determine the presence of MIMO communications signals by:
instructing each remote unit among the plurality of remote units to cause its respective remote MIMO analysis circuit to analyze the received one or more downlink communications signals to determine the presence of MIMO communications signals; and
instructing each adjacent remote unit among the plurality of remote units to the remote unit to cause its respective remote MIMO analysis circuit to analyze the received one or more downlink communications signals to determine the presence of MIMO communications signals.

21. The method of claim 17, further comprising each remote MIMO analysis circuit configured to:
determine radio frequency (RF) interference information; and
provide the MIMO analysis information comprising the presence of MIMO communications signals, and the determined location of the remote unit, and the RF interference information.

22. The method of claim 17, wherein in response to the determined presence of MIMO communications signals from the received MIMO analysis information, configuring the routing configuration based on distances between adjacent remote units among the plurality of remote units.

23. The method of claim 17, further comprising:
sending the determined at least one interleaved MIMO configuration for the routing configuration over an external interface;
receiving an indication of an acceptance of the at least one interleaved MIMO configuration; and
configuring the routing configuration based on the determined at least one interleaved MIMO configuration based on the received indication of the acceptance of the at least one interleaved MIMO configuration.

* * * * *

UNITED STATES PATENT AND TRADEMARK OFFICE
CERTIFICATE OF CORRECTION

PATENT NO. : 10,187,127 B2
APPLICATION NO. : 15/689654
DATED : January 22, 2019
INVENTOR(S) : Aravind Chamarti Page 1 of 1

It is certified that error appears in the above-identified patent and that said Letters Patent is hereby corrected as shown below:

In the Claims

In Column 40, Line 38, Claim 5, delete "Determine" and insert -- determine --, therefor.

In Column 42, Line 30, Claim 12, delete "they" and insert -- the --, therefor.

In Column 43, Line 22, Claim 17, delete "central," and insert -- central --, therefor.

In Column 43, Line 64, Claim 17, delete "having," and insert -- having --, therefor.

Signed and Sealed this
Thirty-first Day of March, 2020

Andrei Iancu
*Director of the United States Patent and Trademark Office*